United States Patent
Tsuzaki et al.

(10) Patent No.: US 12,372,966 B2
(45) Date of Patent: Jul. 29, 2025

(54) MOVING APPARATUS AND MOVING APPARATUS CONTROL METHOD

(71) Applicant: SONY GROUP CORPORATION, Tokyo (JP)

(72) Inventors: Ryoichi Tsuzaki, Tokyo (JP); Noriaki Takasugi, Tokyo (JP); Toshimitsu Kai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 90 days.

(21) Appl. No.: 18/260,697

(22) PCT Filed: Dec. 24, 2021

(86) PCT No.: PCT/JP2021/048262
§ 371 (c)(1),
(2) Date: Jul. 7, 2023

(87) PCT Pub. No.: WO2022/153842
PCT Pub. Date: Jul. 21, 2022

(65) Prior Publication Data
US 2024/0061436 A1  Feb. 22, 2024

(30) Foreign Application Priority Data

Jan. 18, 2021 (JP) ................. 2021-005544

(51) Int. Cl.
*G05D 1/02* (2020.01)
*B62D 57/02* (2006.01)
*G05D 1/00* (2006.01)

(52) U.S. Cl.
CPC .......... *G05D 1/0223* (2013.01); *B62D 57/02* (2013.01); *G05D 1/0246* (2013.01); *G05D 1/0274* (2013.01)

(58) Field of Classification Search
CPC .. G05D 1/0223; G05D 1/0246; G05D 1/0274; B62D 57/02

(Continued)

(56) References Cited

U.S. PATENT DOCUMENTS

| 2005/0067993 A1* | 3/2005 | Kato | B62D 57/02 |
| | | | 318/568.12 |
| 2013/0178983 A1* | 7/2013 | Watabe | G05D 3/12 |
| | | | 700/258 |

(Continued)

FOREIGN PATENT DOCUMENTS

| JP | 2002-144278 A | 5/2002 |
| JP | 2005-121445 A | 5/2005 |

(Continued)

OTHER PUBLICATIONS

International Search Report and Written Opinion of PCT Application No. PCT/JP2021/048262, issued on Mar. 8, 2022, 09 pages of ISRWO.

*Primary Examiner* — Mahmoud S Ismail
(74) *Attorney, Agent, or Firm* — CHIP LAW GROUP

(57) ABSTRACT

Provided is a data processing unit that analyzes detection information of a visual sensor and determines a movement route of the moving apparatus, and the data processing unit generates traveling surface shape data such as three-dimensional point cloud data that enables analysis of a shape of a traveling surface of the moving apparatus. The data processing unit selects a generation target region of the traveling surface shape data on the basis of the target movement route information of the moving apparatus and a predetermined search range region, generates the traveling surface shape data in the selection region selected, and determines a movement route such as a foot placement position of the moving apparatus with reference to the generated traveling surface shape data.

15 Claims, 40 Drawing Sheets

(58) Field of Classification Search
USPC .......................................................... 701/23
See application file for complete search history.

(56) References Cited

U.S. PATENT DOCUMENTS

2016/0347386 A1* 12/2016 Matsunami ............ G01B 11/24
2022/0398806 A1* 12/2022 Arksey ................ G08G 5/0039

FOREIGN PATENT DOCUMENTS

| JP | 2007-007803 A | 1/2007 |
| JP | 2009-223628 A | 10/2009 |
| JP | 2013-141715 A | 7/2013 |
| JP | 2015-175664 A | 10/2015 |

* cited by examiner

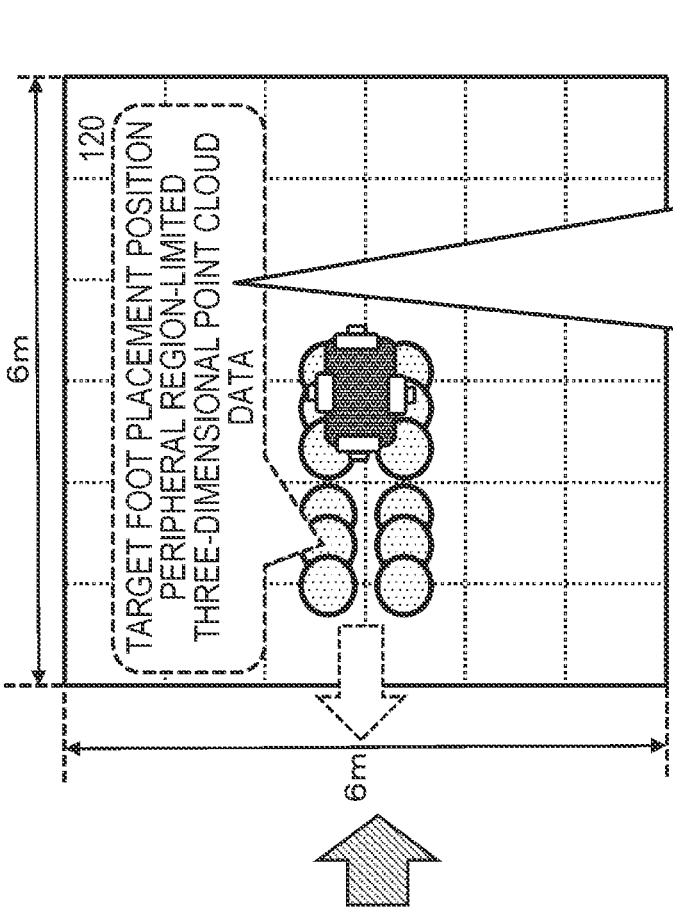
FIG. 11B  OUTPUT DATA TO FOOT PLACEMENT PLANNING UNIT IN CASE WHERE CONFIGURATION OF PRESENT DISCLOSURE IS APPLIED
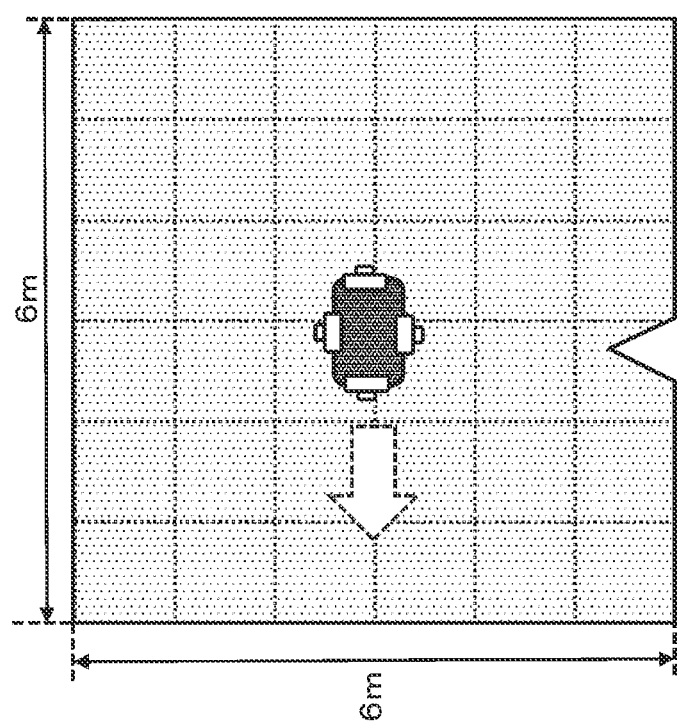
FIG. 11A  OUTPUT DATA TO CONVENTIONAL FOOT PLACEMENT PLANNING UNIT

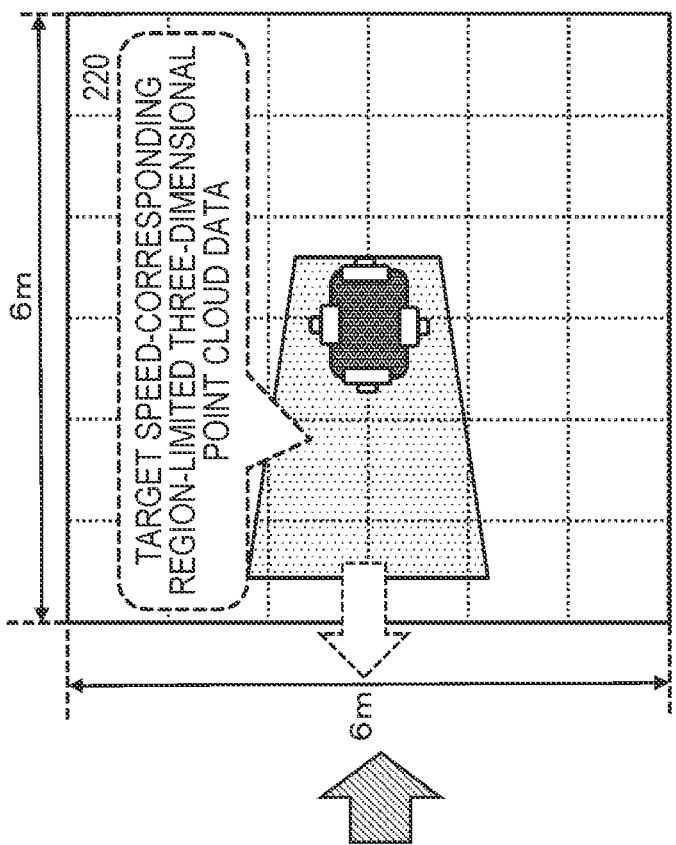
FIG. 22B OUTPUT DATA TO FOOT PLACEMENT PLANNING UNIT IN CASE WHERE CONFIGURATION OF SECOND EMBODIMENT OF PRESENT DISCLOSURE IS APPLIED
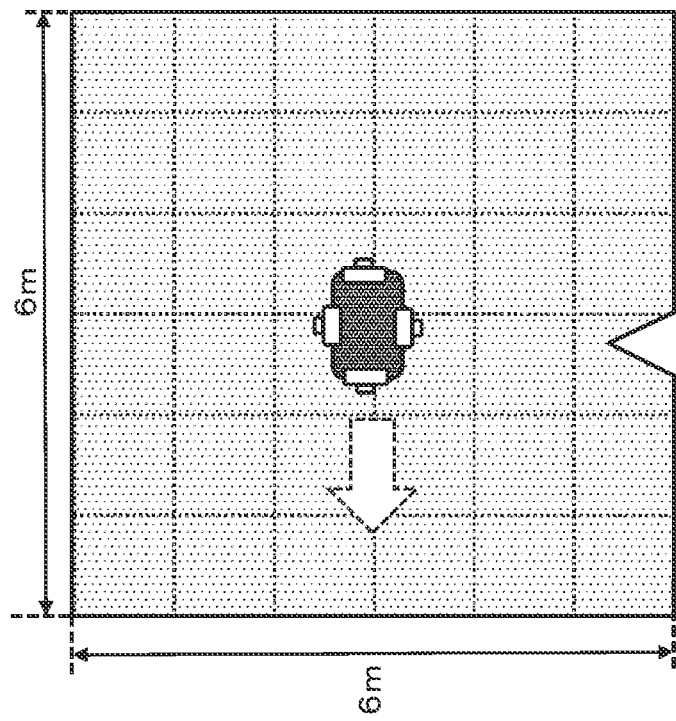
FIG. 22A OUTPUT DATA TO CONVENTIONAL FOOT PLACEMENT PLANNING UNIT

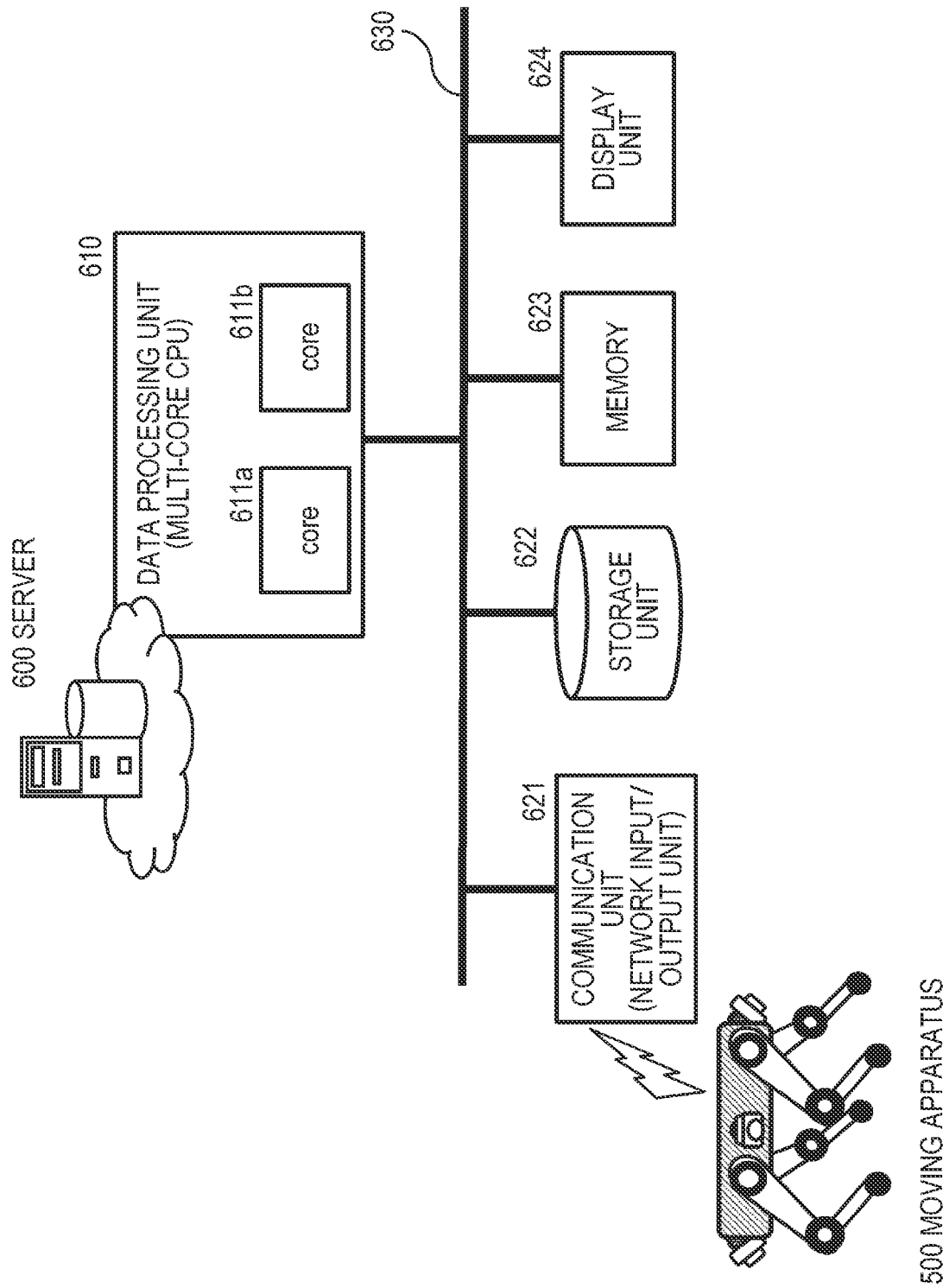

MOVING APPARATUS AND MOVING APPARATUS CONTROL METHOD

CROSS REFERENCE TO RELATED APPLICATIONS

This application is a U.S. National Phase of International Patent Application No. PCT/JP2021/048262 filed on Dec. 24, 2021, which claims priority benefit of Japanese Patent Application No. JP 2021-005544 filed in the Japan Patent Office on Jan. 18, 2021. Each of the above-referenced applications is hereby incorporated herein by reference in its entirety.

TECHNICAL FIELD

The present disclosure relates to a moving apparatus and a moving apparatus control method. Specifically, the present disclosure relates to a moving apparatus such as a walking type robot that moves by controlling a plurality of legs or a wheel driving type robot that moves by rotating wheels, and a moving apparatus control method.

BACKGROUND ART

In recent years, autonomous traveling type robots such as walking type robots that move by controlling a plurality of legs and wheel driving type robots that move by rotating wheels are used in various fields.

The robot can perform various operations even at disaster sites or the like where people are difficult to enter, for example.

However, in order for the walking type robots and the wheel traveling type robots to stably move, it is necessary to grasp obstacles in a traveling direction, a walking surface, and unevenness, inclination, and the like of a traveling surface, identify a route on which stable walking or traveling is possible, and further perform landing of a foot or wheel traveling according to a shape of the walking surface or the traveling surface.

For example, when a foot of a walking type robot is placed on a surface with severe unevenness or a surface with large inclination, there is a possibility that the robot falls down and cannot move forward.

In order to prevent such a problem, many autonomous traveling type robots are mounted with sensors such as cameras for recognizing the environment around the robot, and execute control to select and move on a route for performing stable walking or traveling using sensor detection information.

For example, processing of generating an environmental map including three-dimensional shape data of the surroundings using data obtained from the sensors and determining a movement route with reference to the generated environmental map or the like is performed.

However, in a case where the processing of creating the environmental map using the data obtained from the sensors and the processing of analyzing the created environmental map are performed in this manner, an increase in a calculation load due to a large amount of data, an increase in a communication load, or the like occurs, and as a result, problems such as occurrence of a processing delay (latency) and an increase in a necessary storage unit and memory capacity occur.

Note that, as a conventional technique that discloses a configuration for solving such a problem, there are, for example, Patent Document 1 (Japanese Patent Application Laid-Open No. 2005-121445), Patent Document 2 (Japanese Patent Application Laid-Open No. 2009-223628), and the like.

Patent Document 1 (Japanese Patent Application Laid-Open No. 2005-121445) discloses a car navigation device of a vehicle, and discloses a configuration in which a route to a destination of the vehicle is selected, and map information limited only to a periphery of the selected route is generated and displayed, thereby reducing a data amount and reducing a data processing load.

In addition, Patent Document 2 (Japanese Patent Application Laid-Open No. 2009-223628) discloses a configuration in which local detailed map data is generated and analyzed only in a case where an obstacle is detected at a planned landing position of a foot of a walking type robot.

However, the car navigation device described in Patent Document 1 is configured to use a map that has already been created, and cannot be applied to a robot that travels in an unknown region.

In addition, the configuration described in Patent Document 2 requires two-stage processing of first creating a wide range map according to a robot planned travel route as a first step, and then creating a local high definition map in a case where an obstacle is detected at a planned landing position of a foot on the basis of the generated wide range map, and there is a concern that a processing load and a processing data amount increase conversely in an environment with many obstacles.

CITATION LIST

Patent Document

Patent Document 1: Japanese Patent Application Laid-Open No. 2005-121445
Patent Document 2: Japanese Patent Application Laid-Open No. 2009-223628

SUMMARY OF THE INVENTION

Problems to be Solved by the Invention

The present disclosure has been made in view of the above problems, for example, and an object of the present disclosure is to provide a moving apparatus such as an autonomous moving type robot and a moving apparatus control method capable of performing safe walking and traveling by reducing a processing load and a processing data amount.

Solutions to Problems

A first aspect of the present disclosure is
a moving apparatus including
a data processing unit that analyzes detection information of a visual sensor and executes movement control of the moving apparatus,
in which the data processing unit is configured to:
generate traveling surface shape data that enables analysis of a shape of a traveling surface of the moving apparatus;
execute region selection processing of selecting a generation target region of the traveling surface shape data on the basis of target movement route information of the moving apparatus;
generate traveling surface shape data in a selection region selected in the region selection processing; and determine a movement route or a moving direction of the moving apparatus with reference to the traveling surface shape data generated.

Further, a second aspect of the present disclosure is a moving apparatus control method for executing movement control of a moving apparatus, in which a data processing unit of the moving apparatus is configured to:

execute region selection processing of selecting a generation target region of traveling surface shape data that enables analysis of a shape of a traveling surface of the moving apparatus on the basis of target movement route information of the moving apparatus;

generate traveling surface shape data of a selection region using detection information of a visual sensor attached to the moving apparatus; and determine a movement route or a moving direction of the moving apparatus with reference to the traveling surface shape data generated.

Other objects, features, and advantages of the present disclosure will become apparent from a more detailed description based on embodiments of the present disclosure described below and the accompanying drawings. Note that a system in the present specification is a logical set configuration of a plurality of devices, and is not limited to one in which devices with respective configurations are in the same housing.

According to the configuration of one embodiment of the present disclosure, the traveling surface shape data of only the selection region selected on the basis of the target foot placement information of the moving apparatus and the search range region is generated and the foot placement position and the like of the moving apparatus are determined, so that the processing load is reduced and high-speed processing is enabled.

Specifically, for example, a data processing unit that analyzes detection information of a visual sensor and determines a movement route of the moving apparatus is provided, and the data processing unit generates traveling surface shape data such as three-dimensional point cloud (PC) data that enables analysis of a shape of a traveling surface of the moving apparatus. The data processing unit selects a generation target region of the traveling surface shape data on the basis of the target movement route information of the moving apparatus and a predetermined search range region, generates the traveling surface shape data in the selection region selected, and determines a movement route such as a foot placement position of the moving apparatus with reference to the generated traveling surface shape data.

With this configuration, the traveling surface shape data of only the selection region selected on the basis of the target foot placement information of the moving apparatus and the search range region is generated and the foot placement position and the like of the moving apparatus are determined, so that the processing load is reduced and high-speed processing is enabled.

Note that the effects described herein are only examples and are not limited thereto, and additional effects may also be present.

BRIEF DESCRIPTION OF DRAWINGS

FIGS. 11A and 11B are diagrams for explaining processing executed by a three-dimensional point cloud (PC) retransformation unit.

FIGS. 22A and 22B are diagrams for explaining processing executed by a three-dimensional point cloud (PC) retransformation unit.

FIG. 40 is a diagram for explaining a hardware configuration example of the server in the system configuration including the moving apparatus of the present disclosure and the server.

MODE FOR CARRYING OUT THE INVENTION

Hereinafter, details of a moving apparatus and a moving apparatus control method of the present disclosure will be described with reference to the drawings. Note that the description will be given according to the following items.
1. Overview of Moving Apparatus of Present Disclosure
2. (First Embodiment) Details of Moving Apparatus and Moving Apparatus Control Method of First Embodiment of Present Disclosure
3. Modifications of First Embodiment
4. (Second Embodiment) Details of Moving Apparatus and Moving Apparatus Control Method of Second Embodiment of Present Disclosure
5. (Third Embodiment) Details of Moving Apparatus and Moving Apparatus Control Method of Third Embodiment of Present Disclosure
6. (Fourth Embodiment) Details of Moving Apparatus and Moving Apparatus Control Method of Fourth Embodiment of Present Disclosure
7. (Fifth Embodiment) Details of Moving Apparatus and Moving Apparatus Control Method of Fifth Embodiment of Present Disclosure
8. Hardware Configuration Example of Moving Apparatus or the Like of Present Disclosure
9. Summary of Configuration of Present Disclosure 1. Overview of Moving Apparatus of Present Disclosure First, an overview of a moving apparatus of the present disclosure will be described with reference to FIG. 1 and so on.

Figure 1:
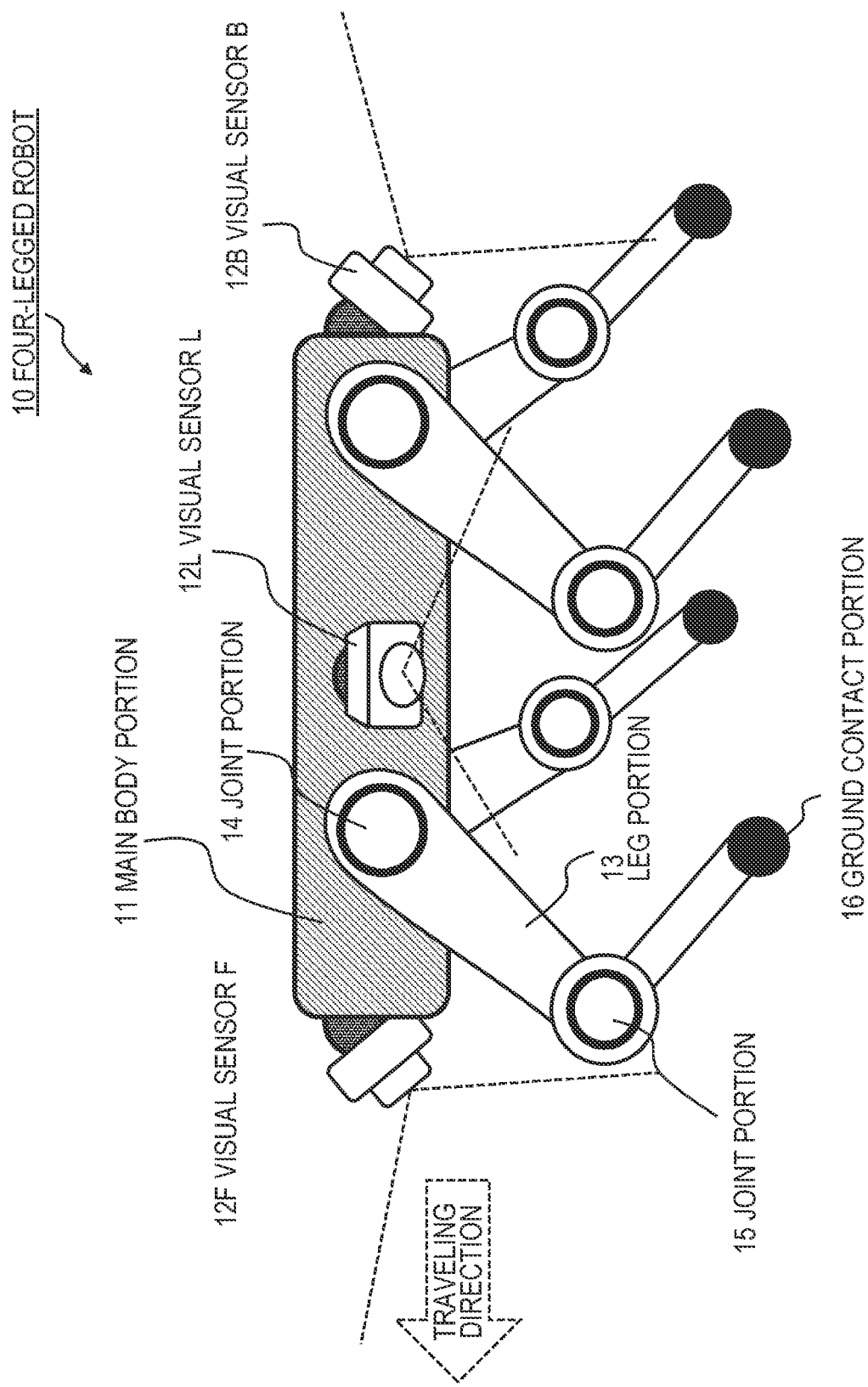
FIG. 1 is a diagram for explaining a configuration example of a four-legged robot which is an example of a moving apparatus of the present disclosure.

FIG. 1 is a diagram illustrating a four-legged robot 10 which is an example of a moving apparatus of the present disclosure.

The four-legged robot 10 is a walking type robot that moves by moving four legs back and forth.

As illustrated in FIG. 1, the four-legged robot 10 includes a main body portion 11, a visual sensor 12 for recognizing the surrounding environment of the robot, and a leg portion 13 for moving.

In the configuration illustrated in FIG. 1, the visual sensor 12 includes the following four visual sensors that individually perform environment recognition in four directions of front, back, left, and right of the four-legged robot 10.

Visual sensor F (front) 12F for environment recognition in a robot traveling direction (forward direction)

Visual sensor B (back) 12B for environment recognition in a backward direction

Visual sensor L (Left) 12L for environment recognition in a left direction

Visual sensor R (Right) 12R for environment recognition in a right direction

Note that the drawing does not illustrate the visual sensor R (Right) 12R for environment recognition in the right direction.

The visual sensor 12 is only required to have a configuration capable of acquiring information for checking an obstacle in a traveling direction, a situation of a ground contact surface of a foot, and the like, for example, three-dimensional shape information of surrounding objects, for the four-legged robot 10 to safely travel, and for example, a stereo camera, an omnidirectional camera, a light detection and ranging (LiDAR), a time of flight (TOF) sensor, and the like can be used.

Note that both the LiDAR and TOF sensors are sensors capable of measuring an object distance.

The example illustrated in FIG. 1 is an example in which four visual sensors are provided, but the configuration is only required to be able to acquire environmental information (three-dimensional position and three-dimensional shape) around the four-legged robot 10, and for example, a configuration using one omnidirectional camera, a configuration using a combination of one omnidirectional camera and one LiDAR, and the like are also possible.

The leg portion 13 includes joint portions 14 and 15 and a ground contact portion 16.

Each of the joint portions 14 and 15 includes, for example, an actuator, an encoder for detecting the position of the actuator, a speed reducer, a torque sensor for detecting torque on the output shaft side, and the like.

Figure 2:
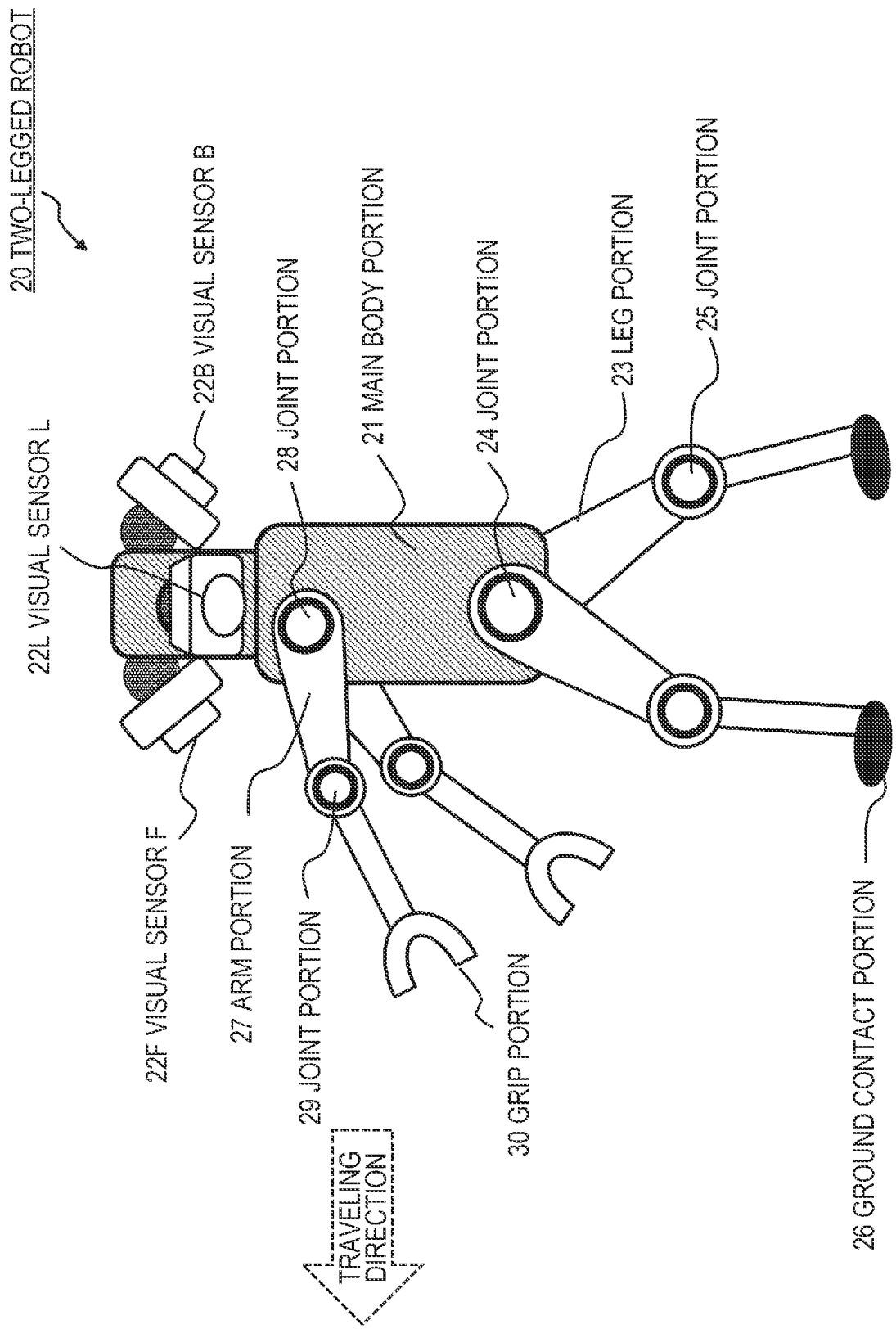
FIG. 2 is a diagram for explaining a configuration example of a two-legged robot which is an example of a moving apparatus of the present disclosure.

FIG. 2 is a diagram illustrating a two-legged robot 20 which is another example of the moving apparatus of the present disclosure.

The two-legged robot 20 is a walking type robot that moves by moving two legs back and forth.

As illustrated in FIG. 2, the two-legged robot 20 includes a main body portion 21, a visual sensor 22 for recognizing the surrounding environment of the robot, a leg portion 23 for moving, and an arm portion 27.

In the configuration illustrated in FIG. 2, the visual sensor 22 includes the following four visual sensors that individually perform environment recognition in four directions of front, back, left, and right on the head of the two-legged robot 20.

Visual sensor F (front) 22F for environment recognition in a robot traveling direction (forward direction)

Visual sensor B (back) 22B for environment recognition in a backward direction

Visual sensor L (Left) 22L for environment recognition in a left direction

Visual sensor R (Right) 22R for environment recognition in a right direction

Note that the drawing does not illustrate the visual sensor R (Right) 22R for environment recognition in the right direction.

The visual sensor 22 is only required to have a configuration capable of acquiring information for checking an obstacle in a traveling direction, a situation of a ground contact surface of a foot, and the like, for example, three-dimensional shape information of surrounding objects, for the two-legged robot 20 to safely travel, and as described with reference to FIG. 1, for example, a stereo camera, an omnidirectional camera, a LiDAR, a TOF sensor, and the like can be used.

Note that, as described with reference to FIG. 1, the visual sensor is only required to be set to be able to acquire environment information (three-dimensional position and three-dimensional shape) around the two-legged robot 20, and for example, a configuration using one omnidirectional camera, a configuration using a combination of one omnidirectional camera and one LiDAR, or the like are also possible.

The leg portion 23 includes joint portions 24 and 25 and a ground contact portion 26.

Each of the joint portions 24 and 25 includes, for example, an actuator, an encoder for detecting the position of the actuator, a speed reducer, a torque sensor for detecting torque on the output shaft side, and the like.

The arm portion 27 includes joint portions 28 and 29 and a grip portion 30. The joint portions 28 and 29 and the grip portion 30 of the arm portion 27 also include, for example, an actuator, an encoder for detecting the position of the actuator, a speed reducer, a torque sensor for detecting torque on the output shaft side, and the like.

Note that, although a plurality of embodiments related to the moving apparatus and the moving apparatus control method of the present disclosure will be described below, the configuration and processing of the present disclosure are not limited to the four-legged robot 10 and the two-legged robot 20, and can also be applied to a wheel driving type robot, a caterpillar driving type robot, or the like depending on the embodiment.

Note that, hereinafter, an embodiment to which the four-legged robot 10 described with reference to FIG. 1 is applied will be described as a representative example of the moving apparatus of the present disclosure.

A specific example of a case where the four-legged robot 10 illustrated in FIG. 1 autonomously travels will be considered.

Figure 3:
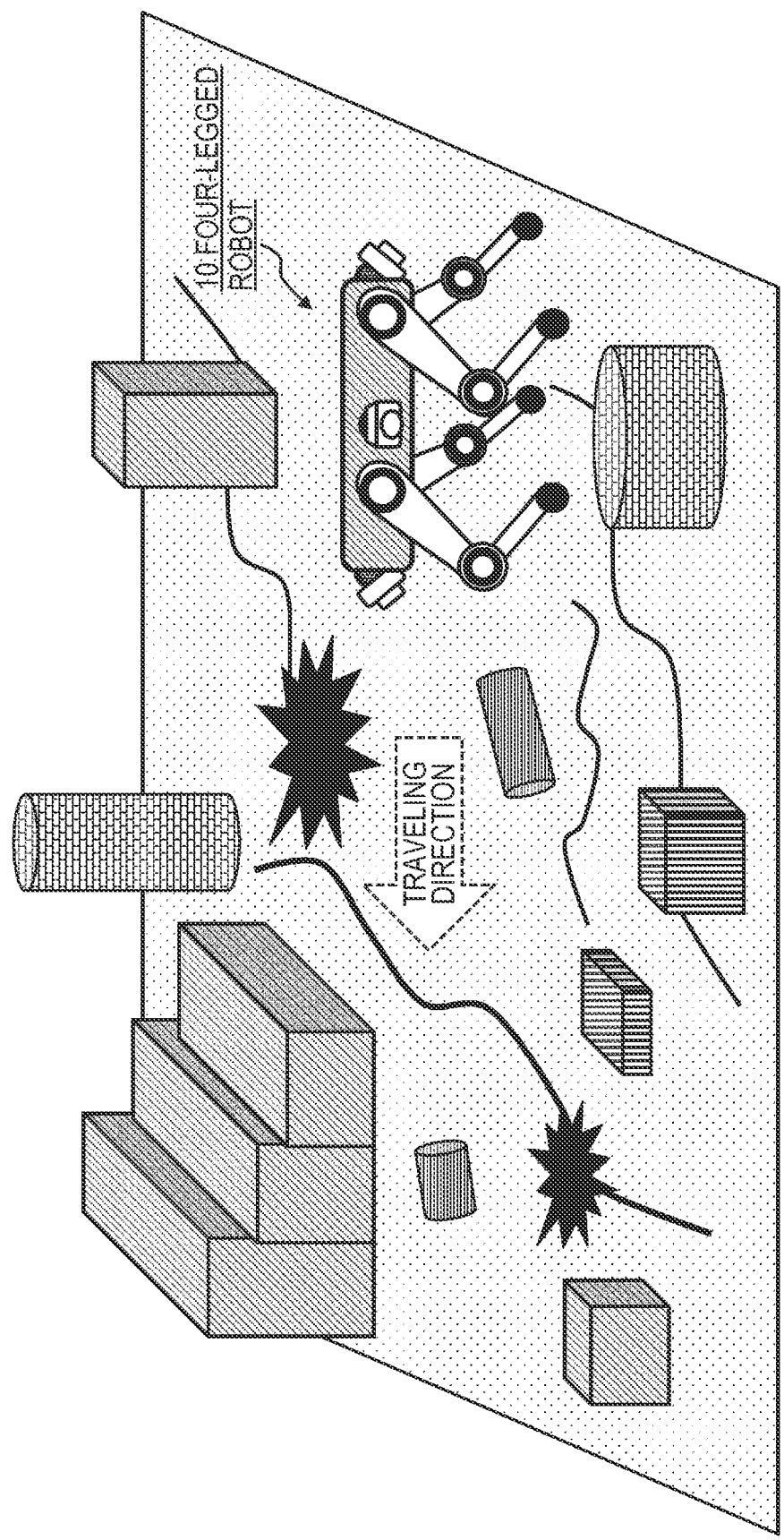
FIG. 3 is a diagram for explaining a travel example of the moving apparatus.

FIG. 3 is a diagram illustrating an example of an environment in which the four-legged robot 10 illustrated in FIG. 1 autonomously travels.

As an environment in which the four-legged robot 10 moves, for example, there are various obstacles as illustrated in FIG. 3, and the traveling surface is not limited to a flat surface, and there are various kinds such as a rough surface, a stepped surface, an inclined surface, and a stair.

For example, when the four-legged robot 10 collides with an obstacle, the four-legged robot 10 may fall down, and damage or failure may occur.

In addition, even in a case where the foot is grounded on a rough surface, a stepped surface, an inclined surface, or the like without considering an inclination angle or the like, there is a possibility that the four-legged robot 10 falls down and damage or failure occurs.

In order to prevent such a situation from occurring, a surrounding environmental map generated on the basis of sensor acquisition information acquired by a visual sensor such as a camera, that is, an environmental map having three-dimensional shape information of an object including a traveling surface around the robot is used.

For example, the data processing unit in the four-legged robot 10 analyzes acquisition information from a visual sensor such as a camera attached to the four-legged robot 10, analyzes the distance to an object including a traveling surface around the four-legged robot 10, generates an environmental map indicating the object distance including the traveling surface, and controls the moving direction and the grounding position of the leg portion with reference to the generated environmental map.

Examples of the environmental map having three-dimensional shape information of an object including a traveling surface around a robot includes a three-dimensional point cloud (PC).

A three-dimensional point cloud (PC) is a point cloud constituted by a large number of points indicating a three-dimensional position of an object surface.

The distance is generated on the basis of an object distance measured by a sensor such as a camera mounted on the robot.

The three-dimensional point cloud (PC) includes a large number of points indicating a three-dimensional position and a three-dimensional shape of an object surface, such as a traveling surface on which the robot travels, a column, and a wall. Each point constituting the three-dimensional point cloud (PC) is associated with coordinate (x, y, z) position data in a three-dimensional space.

The three-dimensional shape of the object can be recognized on the basis of the coordinate position corresponding to each point of the three-dimensional point cloud (PC), and for example, the undulations and inclinations of the traveling surface of the robot, the position of the obstacle, and the like can be analyzed.

However, as described above, the three-dimensional point cloud (PC) data is data in which coordinate (x, y, z) position data in the three-dimensional space is associated with each of a large number of points constituting the point cloud, and the data amount becomes enormous. Therefore, there are problems that a data processing cost increases, a processing delay easily occurs, and a memory amount required to store the point cloud data also becomes excessive.

The moving apparatus of the present disclosure solves such a problem.

Hereinafter, a plurality of embodiments of a moving apparatus and a moving apparatus control method of the present disclosure will be described.

2. (First Embodiment) Details of Moving Apparatus and Moving Apparatus Control Method of First Embodiment of Present Disclosure First, details of a moving apparatus and a moving apparatus control method according to the first embodiment of the present disclosure will be described.

Figure 4:
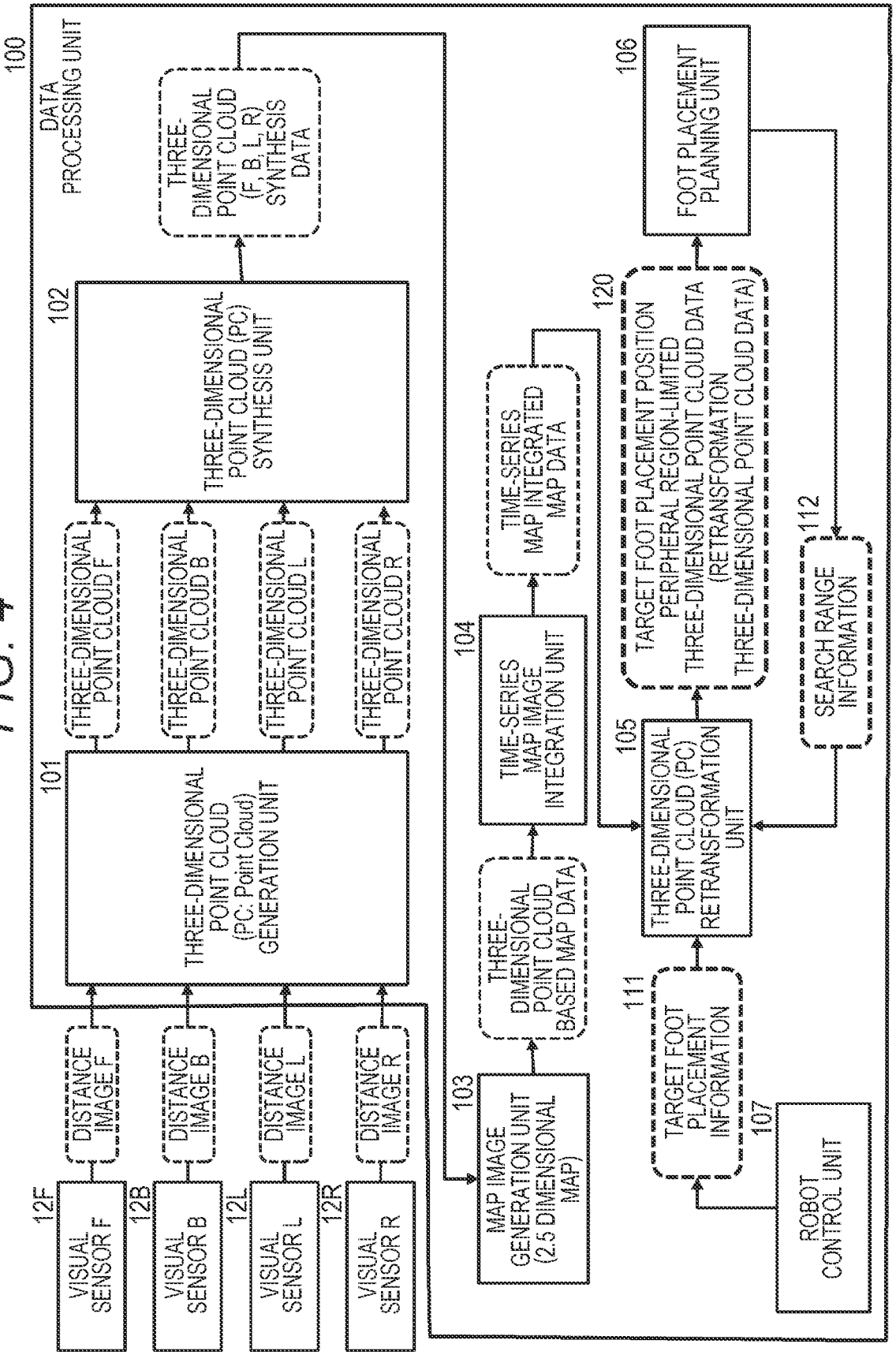
FIG. 4 is a diagram for explaining a configuration and processing of a moving apparatus according to a first embodiment of the present disclosure.

FIG. 4 is a diagram for explaining a configuration of a moving apparatus and a process for performing travel control processing of the moving apparatus according to the first embodiment of the present disclosure.

The configuration illustrated in FIG. 4 is, for example, a configuration for performing travel control processing of the four-legged robot 10 described with reference to FIG. 1. The four visual sensors F to R, 12F to R illustrated in FIG. 4 are visual sensors such as stereo cameras attached to the front, rear, left, and right of the four-legged robot 10 described with reference to FIG. 1.

Note that the four visual sensors F to R, 12F to R capture distance images in which density values corresponding to distances from the visual sensors are set as pixel values, for example.

A distance image F illustrated in FIG. 4 is a distance image acquired by the visual sensor F, 12F that captures an image in the traveling direction (forward direction) of the four-legged robot 10.

The distance image B is a distance image acquired by the visual sensor B, 12B that captures an image in the backward direction opposite to the traveling direction of the four-legged robot 10.

The distance image L is a distance image acquired by the visual sensor L, 12L that captures an image in the left direction with respect to the traveling direction of the four-legged robot 10.

The distance image R is a distance image acquired by the visual sensor R (Right) 12R that captures an image in the right direction with respect to the traveling direction of the four-legged robot 10.

Note that, as illustrated in FIG. 1, the four visual sensors F, 12F to R, 12R all face obliquely downward, and the distance images acquired by the four visual sensors F, 12F to R, 12R are data mainly indicating, as pixel values, distance values of surrounding objects below the horizontal plane of the camera position of the four-legged robot 10. The distance images acquired by the four visual sensors F, 12F to R, 12R are images including the distance value of the traveling surface.

The four distance images acquired by the four visual sensors F, 12F to R, 12R are input to a three-dimensional point cloud (PC) generation unit 101 of a data processing unit 100.

Note that the data processing unit 100 is a data processing unit configured inside the four-legged robot 10. Alternatively, the data processing unit may be an external information processing apparatus capable of communicating with the four-legged robot 10, for example, a data processing unit configured as a cloud-side server or the like.

As illustrated in FIG. 4, the data processing unit 100 includes the three-dimensional point cloud (PC) generation unit 101, a three-dimensional point cloud (PC) synthesis unit 102, a map image generation unit 103, a time-series map image integration unit 104, a three-dimensional point cloud (PC) retransformation unit 105, a foot placement planning unit 106, and a robot control unit 107.

The three-dimensional point cloud (PC) generation unit 101 generates a three-dimensional point cloud (PC) in which a distance value (pixel value) set to each pixel of each distance image is expressed as point cloud data on three-dimensional coordinates for each of the four distance images F to R, which are outputs of the four visual sensors F, 12F to R, 12R.

Note that, as described above, each point constituting the three-dimensional point cloud (PC) is a point whose coordinate position on the xyz three-dimensional space is defined. That is, each coordinate value of x, y, and z is assigned to each point of the three-dimensional point cloud configuration.

As illustrated in FIG. 4, the three-dimensional point cloud (PC) generation unit 101 generates the following four three-dimensional point clouds and inputs them to the next-stage three-dimensional point cloud (PC) synthesis unit 102.

(1) Three-dimensional point cloud F generated on the basis of the distance image F acquired by the visual sensor F, 12F (2) Three-dimensional point cloud B generated on the basis of the distance image B acquired by the visual sensor B, 12B (3) Three-dimensional point cloud L generated on the basis of the distance image L acquired by the visual sensor L, 12L (4) Three-dimensional point cloud R generated on the basis of the distance image R acquired by the visual sensor R, 12R The three-dimensional point cloud (PC) synthesis unit 102 synthesizes these four three-dimensional point clouds F to R input from the three-dimensional point cloud (PC) generation unit 101 to generate one piece of three-dimensional point cloud synthesis data.

FIG. 4 illustrates three-dimensional point cloud (F, B, L, R) synthesis data.

The three-dimensional point cloud (F, B, L, R) synthesis data is synthesis data of four three-dimensional point clouds F to R based on four distance images F to R which are outputs of four visual sensors F, 12F to R, 12R attached to the front, back, left, and right of the four-legged robot 10 illustrated in FIG. 1, and is data indicating three-dimensional positions and three-dimensional shapes of objects around the front, back, left, and right of the four-legged robot 10 by a point cloud.

Note that, as described above, the four visual sensors F, 12F to R, 12R illustrated in FIG. 1 all face obliquely downward, and the three-dimensional point cloud (F, B, L, R) synthesis data is data indicating the three-dimensional position and three-dimensional shape of the surrounding object below the horizontal plane of the camera position of the four-legged robot 10 by a point cloud. The three-dimensional point cloud (F, B, L, R) synthesis data includes a three-dimensional shape such as unevenness and inclination of the traveling surface.

The three-dimensional point cloud (F, B, L, R) synthesis data generated by the three-dimensional point cloud (PC) synthesis unit 102 is input to the map image generation unit (2.5 dimensional map) 103.

The map image generation unit 103 uses the three-dimensional point cloud (F, B, L, R) synthesis data generated by the three-dimensional point cloud (PC) synthesis unit 102 to generate map data indicating a three-dimensional shape including a traveling surface of an object around the robot.

FIG. 4 illustrates three-dimensional point cloud based map data as an output of the map image generation unit 103.

The three-dimensional point cloud based map data generated by the map image generation unit 103 is, for example, a 2.5 dimensional map such as a height map.

The height map is, for example, map data in which height data (z) is recorded in association with a representative coordinate position of two-dimensional coordinates (x, y) on an xy horizontal plane.

In principle, the three-dimensional map records data of all xyz coordinate positions, but the height map as the 2.5 dimensional map is, for example, map data in which one piece of height data (z) is allocated to a constant xy plane region, for example, a square region surface of 5 mm square, and can be generated as map data with a data amount reduced from that of a general three-dimensional map. Note that the 2.5 dimensional map is also map data having three-dimensional information, and is map data included in the three-dimensional map in a broad sense.

The three-dimensional point cloud based map data (for example, the height map) generated by the map image generation unit 103 is input to the next time-series map image integration unit 104.

The time-series map image integration unit 104 performs integration processing of time-series data of the three-dimensional point cloud based map data (for example, the height map) generated by the map image generation unit 103.

Specifically, for example, the following processing is performed.
(1) Three-dimensional point cloud based map data (t1) such as a height map generated by the map image generation unit 103 on the basis of the four distance images F to R (t1) captured at the time t1 by the four visual sensors F to R, 12F to R
(2) Three-dimensional point cloud based map data (t2) such as a height map generated by the map image generation unit 103 on the basis of the four distance images F to R (t2) captured at the time t2 by the four visual sensors F to R, 12F to R
(3) Three-dimensional point cloud based map data (t3) such as a height map generated by the map image generation unit 103 on the basis of the four distance images F to R (t3) captured at the time t3 by the four visual sensors F to R, 12F to R The time-series map image integration unit 104 integrates the plurality of pieces of time-series three-dimensional point cloud based map data (t1) to (t3) generated on the basis of the distance images captured at different times (t1 to t3) to generate one piece of time-series map integrated map data (for example, an integrated height map).

That is, when the time-series map integrated map data (t1) is generated from the three-dimensional point cloud based map data (t1) and the three-dimensional point cloud based map data (t2) is input to the time-series map image integration unit 104, the time-series map integrated map data (t1 to t2) is generated. Further, when the three-dimensional point cloud based map data (t3) is input to the time-series map image integration unit 104, time-series map integrated map data (t1 to t3) is generated.

Note that each of the plurality of pieces of time-series three-dimensional point cloud based map data (t1) to (t3) generated on the basis of the plurality of pieces of imaging data at different times has an overlapping region, and there are also regions included only in one piece of map data.

For example, there is a case where the distance image captured at a certain timing (t1) does not include the distance value of the object behind the foot of the robot, but the distance image captured at the next timing (t2) includes the distance value of the object hidden at the timing (t1).

The time-series map image integration unit 104 integrates a plurality of pieces of time-series three-dimensional point cloud based map data (t1) to (t3) generated on the basis of distance images captured at a plurality of different timings, thereby generating one piece of time-series map integrated map data (integrated height map) capable of acquiring three-dimensional shapes of almost all objects in the camera imaging range around the robot. Note that, in order to generate the time-series map integrated map data (integrated height map), the self-position of the robot is required, but for example, the self-position can be acquired by using a simultaneous localization and mapping (SLAM) technology with a distance image or three-dimensional point cloud (F, B, L, R) synthesis data as an input.

Note that the number of pieces of the time-series three-dimensional point cloud based map data to be integrated by the time-series map image integration unit 104 is three in the above-described example, but any number of map data can be integrated, such as two or four, for sequential time-series integration, not limited to three. In addition, if there is no particularly hidden portion in the time-series three-dimensional point cloud based map data generated only from the distance image captured at a certain timing, the integration processing can be omitted.

Here, it is assumed that the time-series map image integration unit 104 generates one piece of time-series map integrated map data by integrating a plurality of pieces (n pieces) of time-series three-dimensional point cloud based map data (t1) to (tn) generated on the basis of distance images captured at a plurality of different timings.

One piece of time-series map integrated map data generated by the time-series map image integration unit 104 is input to a three-dimensional point cloud (PC) retransformation unit 105.

The three-dimensional point cloud (PC) retransformation unit 105 inputs one piece of time-series map integrated map data from the time-series map image integration unit 104, and generates three-dimensional point cloud (PC) data based on the input data.

One piece of time-series map integrated map data generated by the time-series map image integration unit 104 is 2.5 dimensional image data such as a height map that enables acquisition of three-dimensional shapes of almost all objects in a camera imaging range around the robot.

The three-dimensional point cloud (PC) retransformation unit 105 further receives the target foot placement information 111 determined from the robot control unit 107 according to the target movement route information defined in advance, and receives the search range information 112 from the foot placement planning unit 106.

The three-dimensional point cloud (PC) retransformation unit 105 generates the target foot placement region-limited three-dimensional point cloud data 120 using these pieces of input data, and outputs the generated target foot placement region-limited three-dimensional point cloud data 120 to the foot placement planning unit 106.

The target foot placement region-limited three-dimensional point cloud data 120 is traveling surface shape data that enables analysis of the shape of the traveling surface of the four-legged robot 10 as the moving apparatus.

The foot placement planning unit 106 refers to the target foot placement region-limited three-dimensional point cloud data 120 input from the three-dimensional point cloud (PC) retransformation unit 105 to determine the placement position of each foot of the four-legged robot 10. Specifically, for example, a position at which the robot can stably advance with less unevenness and inclination is determined as a foot placement position, and each foot is placed to advance the robot.

A detailed configuration and processing of the three-dimensional point cloud (PC) retransformation unit 105 will be described with reference to FIG. 5 and subsequent drawings.

Figure 5:
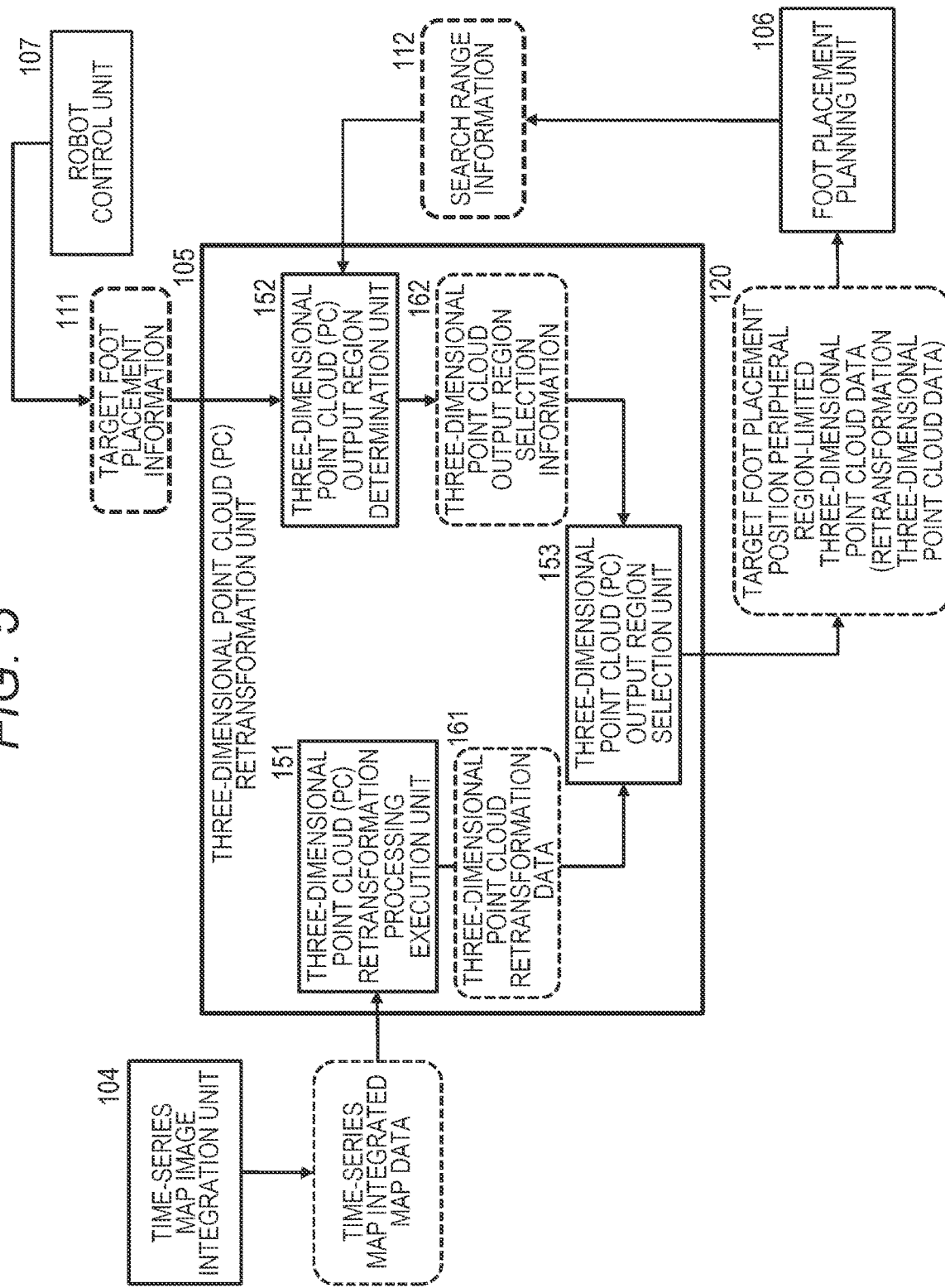
FIG. 5 is a diagram for explaining a configuration and processing of a three-dimensional point cloud (PC) retransformation unit.

As illustrated in FIG. 5, the three-dimensional point cloud (PC) retransformation unit 105 includes a three-dimensional point cloud (PC) retransformation processing execution unit 151, a three-dimensional point cloud (PC) output region determination unit 152, and a three-dimensional point cloud (PC) output region selection unit 153.

The three-dimensional point cloud (PC) retransformation processing execution unit 151 inputs one piece of time-series map integrated map data generated by the time-series map image integration unit 104 and generates three-dimensional point cloud retransformation data. As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

Figure 6:
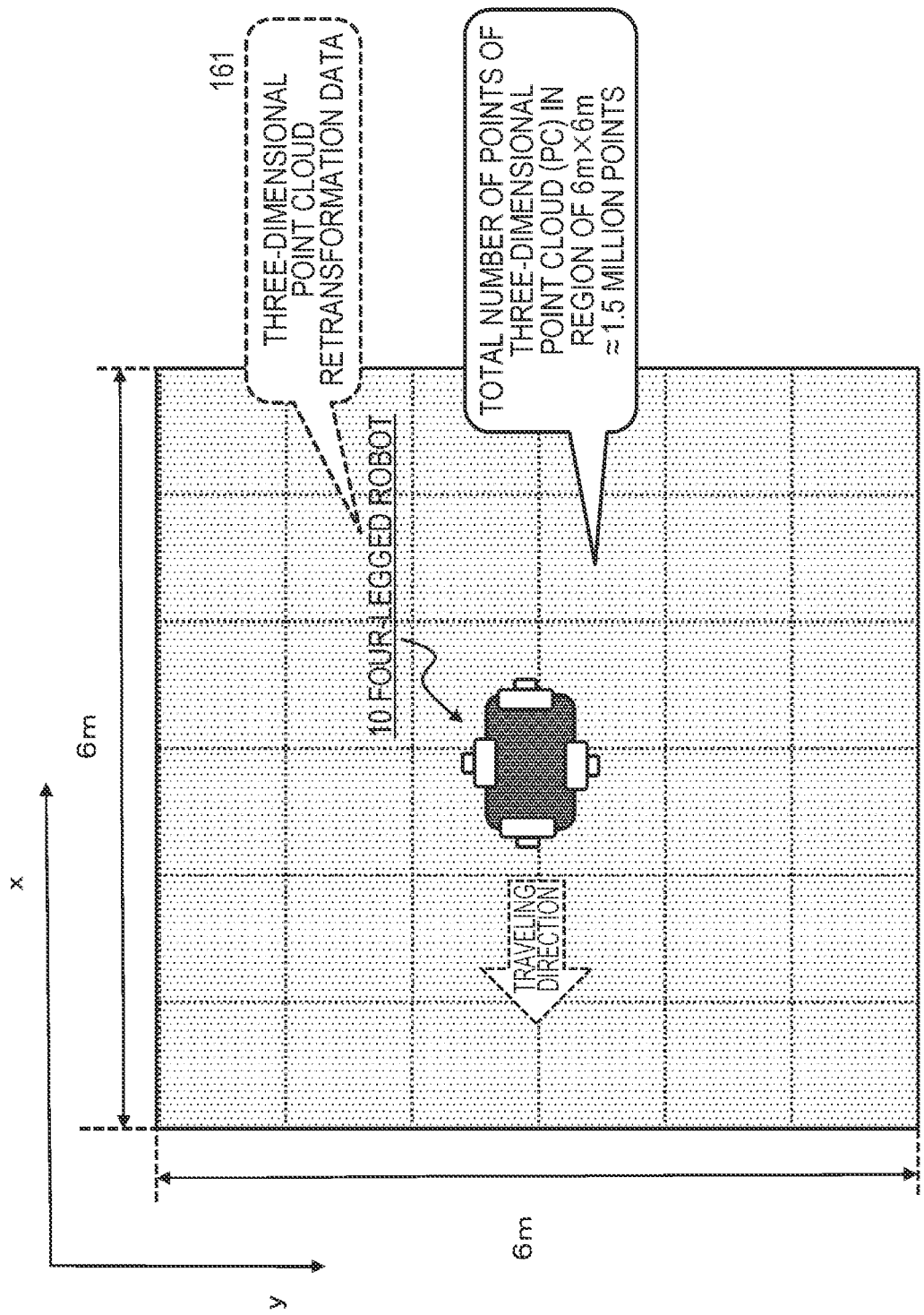
FIG. 6 is a diagram for explaining processing executed by a three-dimensional point cloud (PC) retransformation unit.

FIG. 6 illustrates an example of the three-dimensional point cloud retransformation data generated by the three-dimensional point cloud (PC) retransformation processing execution unit 151.

FIG. 6 illustrates a plane region (xy plane) of 6 m×6 m centered on the four-legged robot 10.

A large number of points constituting the three-dimensional point cloud (PC) in the plane region (xy plane) of 6 m×6 m are arranged at equal intervals.

In the present example, each point constituting the three-dimensional point cloud (PC) is set in a rectangular region of 5 mm×5 mm.

Each point constituting the three-dimensional point cloud (PC) is associated with data in the height direction (z direction) in addition to the coordinate data of each axis of xy illustrated in FIG. 6. That is, the height data of each point not illustrated in FIG. 6 is associated with each point and stored in the memory or the storage unit.

In a case where each point constituting a three-dimensional point cloud (PC) is set in a rectangular region of 5 mm×5 mm with respect to a plane region (xy plane) of 6 m×6 m illustrated in FIG. 6, the total number of points is (6000/5)×(6000/5)=1.44 million≈1.5 million, so the total number of points constituting the three-dimensional point cloud (PC) is about 1.5 million points.

The three-dimensional point cloud retransformation data generated by the three-dimensional point cloud (PC) retransformation processing execution unit 151 is data configured by a point cloud of about 1.5 million points as described above, and is data configured by x, y, and z three-dimensional coordinate data of each point configuring these 1.5 million points.

This amount of data is enormous, and when this three-dimensional point cloud retransformation data is output to the foot placement planning unit 106 as it is, the foot placement planning unit 106 needs to perform processing of determining the placement position of each foot of the four-legged robot 10 by sequentially verifying the three-dimensional position of each point of about 1.5 million points constituting the three-dimensional point cloud retransformation data. In order for the foot placement planning unit 106 to verify each of such an enormous number (about 1.5 million) of points, a considerable processing time is required, and the placement position of the foot cannot be determined until the processing is completed, resulting in a problem that the moving speed of the robot is reduced.

In addition, there is a problem that a necessary capacity of a memory for storing three-dimensional position data of each point of about 1.5 million points constituting the three-dimensional point cloud retransformation data also increases.

The moving apparatus of the present disclosure solves this problem, and has a configuration in which the three-dimensional point cloud (PC) retransformation unit 105 greatly reduces the data amount of the three-dimensional point cloud data output to the foot placement planning unit 106.

A configuration for this is the configuration of the three-dimensional point cloud (PC) retransformation unit 105 illustrated in FIG. 5.

As illustrated in FIG. 5, the three-dimensional point cloud (PC) output region determination unit 152 of the three-dimensional point cloud (PC) retransformation unit 105 inputs the following two pieces of data.

(1) Target foot placement information 111 input from the robot control unit 107

(2) Search range information 112 input from the foot placement planning unit 106

As illustrated in FIG. 5, the three-dimensional point cloud (PC) output region determination unit 152 of the three-dimensional point cloud (PC) retransformation unit 105 inputs these two pieces of data, generates the three-dimensional point cloud output region selection information 162, and outputs the generated three-dimensional point cloud output region selection information 162 to the three-dimensional point cloud (PC) output region selection unit 153.

Specific examples of these two pieces of data input by the three-dimensional point cloud (PC) output region determination unit 152 will be described with reference to FIGS. 7 and 8.

(1) Target foot placement information 111 input from the robot control unit 107

(2) Search range information 112 input from the foot placement planning unit 106

Figure 7:
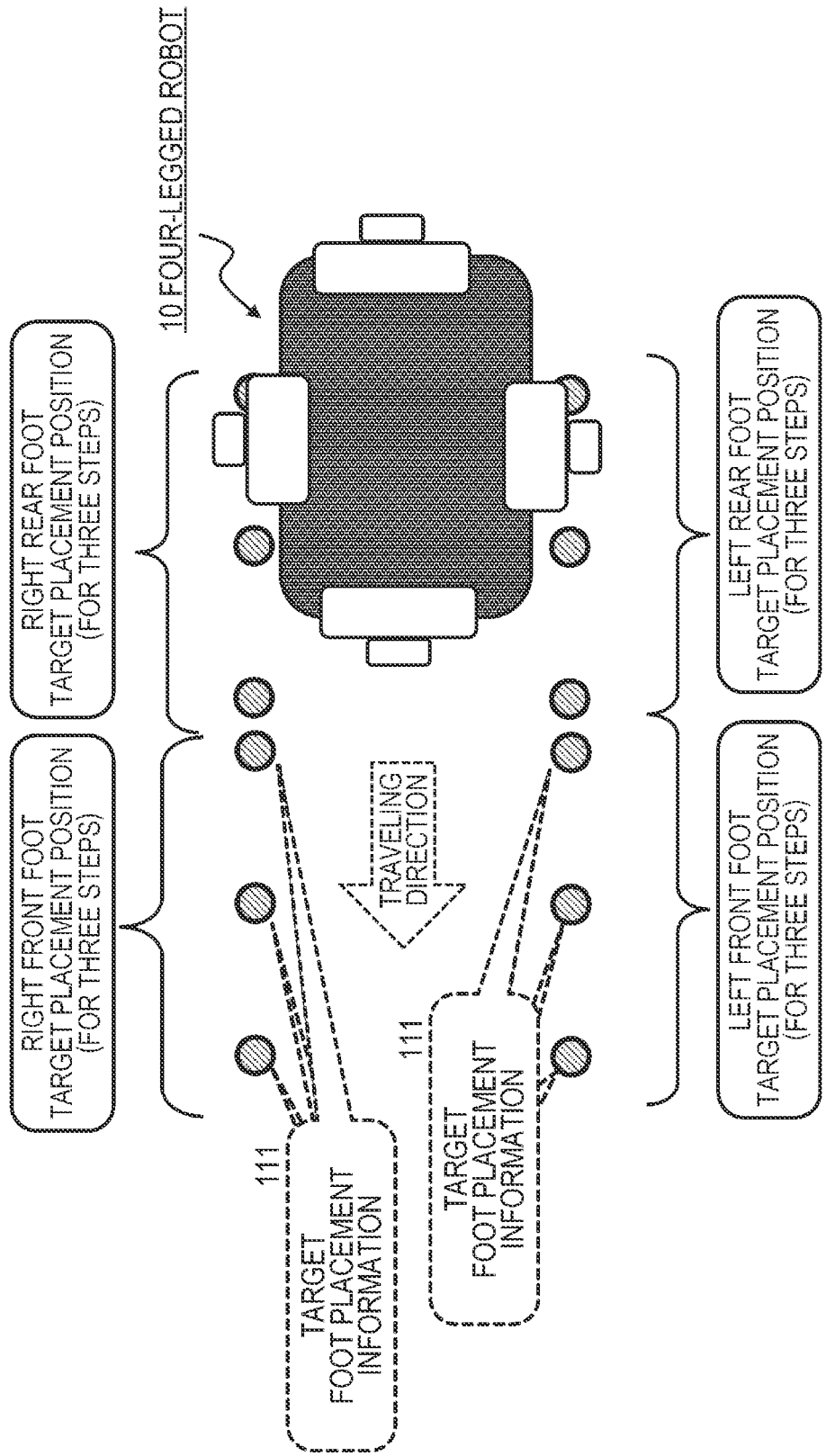
FIG. 7 is a diagram for explaining processing executed by a three-dimensional point cloud (PC) retransformation unit.

FIG. 7 is a diagram illustrating a specific example of "(1) target foot placement information 111 input from the robot control unit 107".

The storage unit of the robot stores a moving destination of the robot determined in advance and a basic movement route set on the basis of the destination. The robot control unit 107 uses the movement route information stored in the storage unit, the current position information of the robot, and the like to calculate a target placement position of each foot of the robot for the robot to move toward the destination, that is, the target foot placement information 111.

FIG. 7 illustrates a specific example of the target foot placement information 111 calculated by the robot control unit 107.

FIG. 7 illustrates target foot placement positions for each of the four feet of the four-legged robot 10, that is, the right front foot, the left front foot, the right rear foot, the left rear foot, from the current position to the first to third steps.

Note that the robot control unit 107 calculates a target foot placement position at least one step to several steps ahead of the current position of the robot.

The example illustrated in FIG. 7 illustrates an example in which the target foot placement position of each of the first to third steps from the current position is calculated.

However, the target foot placement information 111 illustrated in FIG. 7 is merely a target foot placement position, and for example, in a case where an obstacle exists at the target position or in a case where ruggedness or inclination is severe, control is performed such that the target position is avoided and the foot is placed by searching for a flat region near the target position.

The information defining the search region in a case of searching for a region where the stable grounding of the foot is possible in this manner is another information input by the three-dimensional point cloud (PC) output region determination unit 152, that is, "(2) search range information 112 input from the foot placement planning unit 106".

A specific example of "(2) search range information 112 input from the foot placement planning unit 106" will be described with reference to FIG. 8.

The foot placement planning unit 106 determines a search range centered on the foot placement position calculated by the robot control unit 107, and inputs this determination information as search range information 112 to the three-dimensional point cloud (PC) output region determination unit 152.

Figure 8:
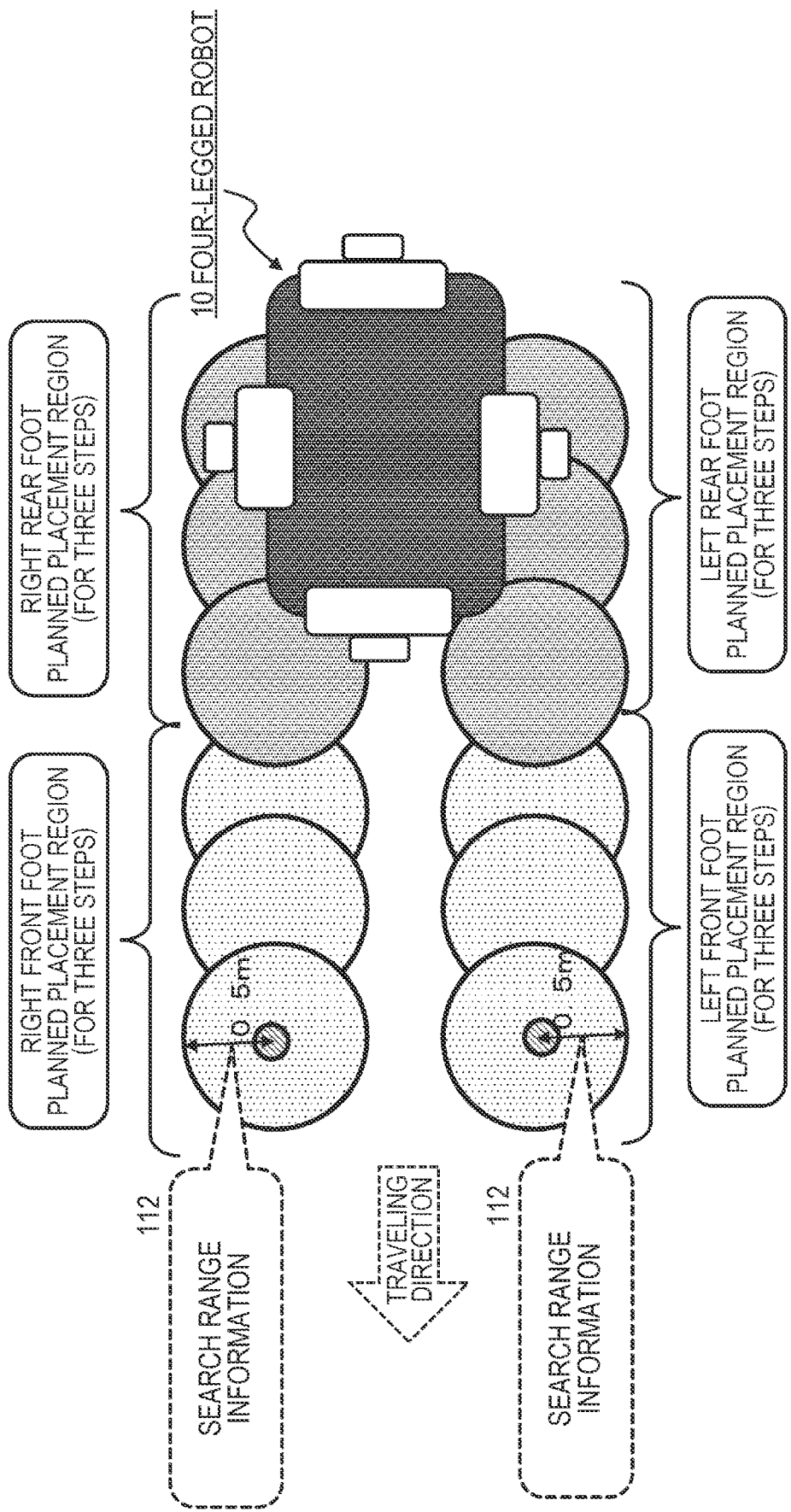
FIG. 8 is a diagram for explaining processing executed by a three-dimensional point cloud (PC) retransformation unit.

The search range information 112 illustrated in FIG. 8 is an example in which a region having a radius of 0.5 m centered on the foot placement position calculated by the robot control unit 107 is set as the search range region.

In a case where a region having a radius of 0.5 m centered on the foot placement position is set as the search range region, the foot placement planning unit 106 performs processing of searching for a stable foot installable position from the search range region.

Note that the search range region is not limited to a circle. For example, it may be rectangular.

Returning to FIG. 5, the description of the configuration and processing of the three-dimensional point cloud (PC) retransformation unit 105 will be continued.

As illustrated in FIG. 5, the three-dimensional point cloud (PC) output region determination unit 152 of the three-dimensional point cloud (PC) retransformation unit 105 inputs the following two pieces of data.

(1) Target foot placement information 111 input from the robot control unit 107
(2) Search range information 112 input from the foot placement planning unit 106

The three-dimensional point cloud (PC) output region determination unit 152 of the three-dimensional point cloud (PC) retransformation unit 105 inputs these two pieces of data, generates the three-dimensional point cloud output region selection information 162, and outputs the generated three-dimensional point cloud output region selection information 162 to the three-dimensional point cloud (PC) output region selection unit 153.

A specific example of the three-dimensional point cloud output region selection information 162 generated on the basis of the above described two pieces of data by the three-dimensional point cloud (PC) output region determination unit 152 will be described with reference to FIG. 9.

Figure 9:
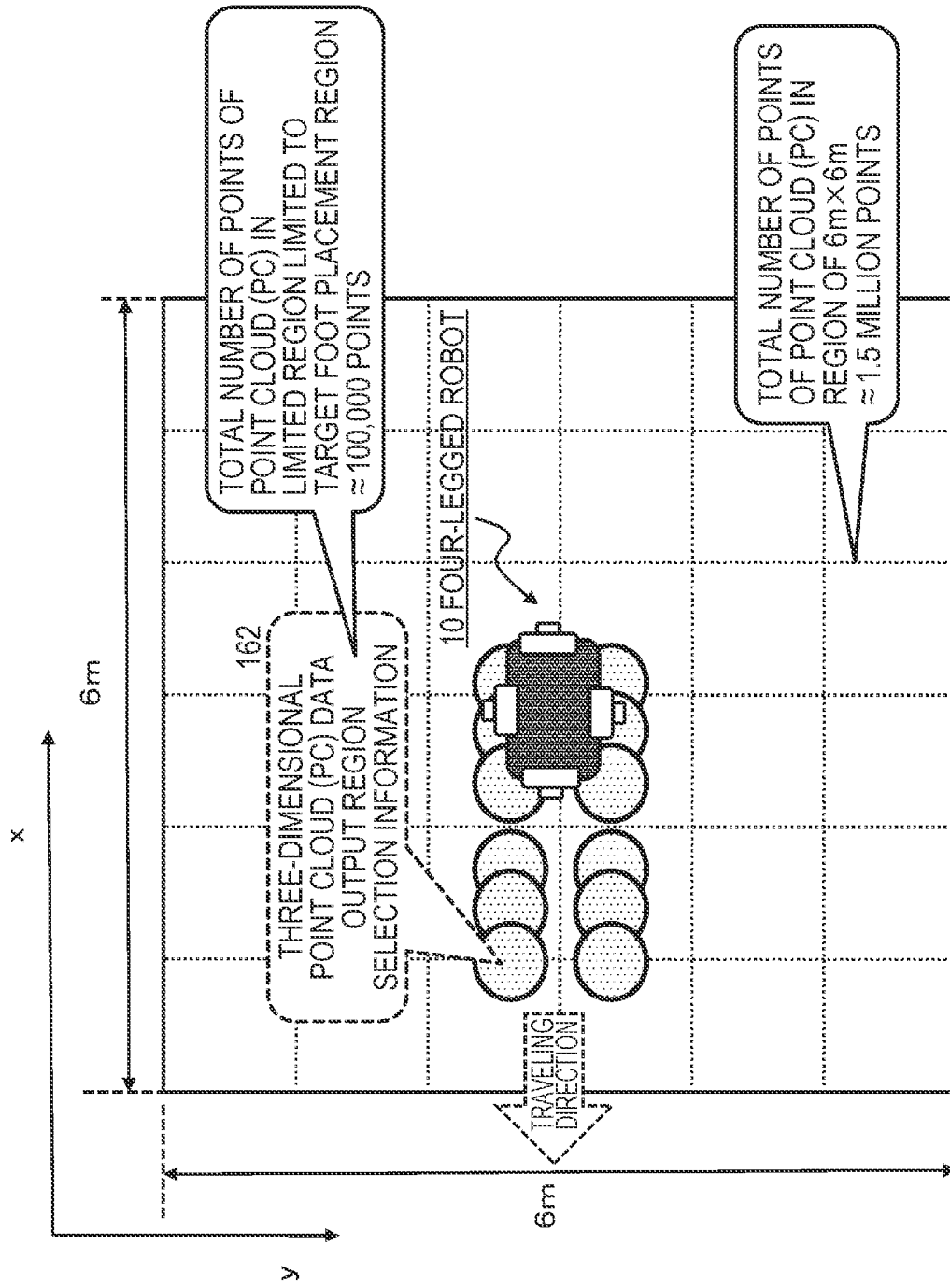
FIG. 9 is a diagram for explaining processing executed by a three-dimensional point cloud (PC) retransformation unit.

The example illustrated in FIG. 9 is
a diagram illustrating a specific example of the "three-dimensional point cloud output region selection information 162" generated by the three-dimensional point cloud (PC) output region determination unit 152 in a case where the "(1) target foot placement information 111 input from the robot control unit 107" is the data illustrated in FIG. 7 and the "(2) search range information 112 input from the foot placement planning unit 106" is the data illustrated in FIG. 8.

As illustrated in FIG. 9, the three-dimensional point cloud (PC) output region determination unit 152 determines a region having a radius of 0.5 m centered on each target foot placement position up to three steps of four legs of the four-legged robot 10 as "three-dimensional point cloud output region selection information 162".

As illustrated in FIG. 5, the three-dimensional point cloud (PC) output region determination unit 152 outputs the determined "three-dimensional point cloud output region selection information 162" to the three-dimensional point cloud (PC) output region selection unit 153.

The three-dimensional point cloud (PC) output region selection unit 153 receives inputs of the following data.

(1) "Three-dimensional point cloud retransformation data 161" generated by the three-dimensional point cloud (PC) retransformation processing execution unit 151
(2) "Three-dimensional point cloud output region selection information 162" determined by the three-dimensional point cloud (PC) output region determination unit 152

As illustrated in FIG. 5, the three-dimensional point cloud (PC) output region selection unit 153 generates "target foot placement position peripheral region-limited three-dimensional point cloud (PC) data 120" on the basis of these pieces of input data and outputs the data to the foot placement planning unit 106.

The above (1), that is, the "three-dimensional point cloud retransformation data 161" generated by the three-dimensional point cloud (PC) retransformation processing execution unit 151 is three-dimensional point cloud (PC) data of a rectangular region of 6 m×6 m centered on the four-legged robot 10 described above with reference to FIG. 6.

Meanwhile, the above (2) "three-dimensional point cloud output region selection information 162" determined by the three-dimensional point cloud (PC) output region determination unit 152 is the data described above with reference to FIG. 9, that is, the data indicating the region having the radius of 0.5 m centered on each target foot placement position up to the three steps of the four legs of the four-legged robot 10.

The three-dimensional point cloud (PC) output region selection unit 153 selectively extracts only the three-dimensional point cloud retransformation data of the region specified by the above (2) "three-dimensional point cloud output region selection information 162" determined by the three-dimensional point cloud (PC) output region determination unit 152 from the above (1) "three-dimensional point cloud retransformation data 161" generated by the three-dimensional point cloud (PC) retransformation processing execution unit 151. The selected and extracted three-dimensional point cloud data is output to the foot placement planning unit 106 as "target foot placement position peripheral region-limited three-dimensional point cloud (PC) data 120".

Figure 10:
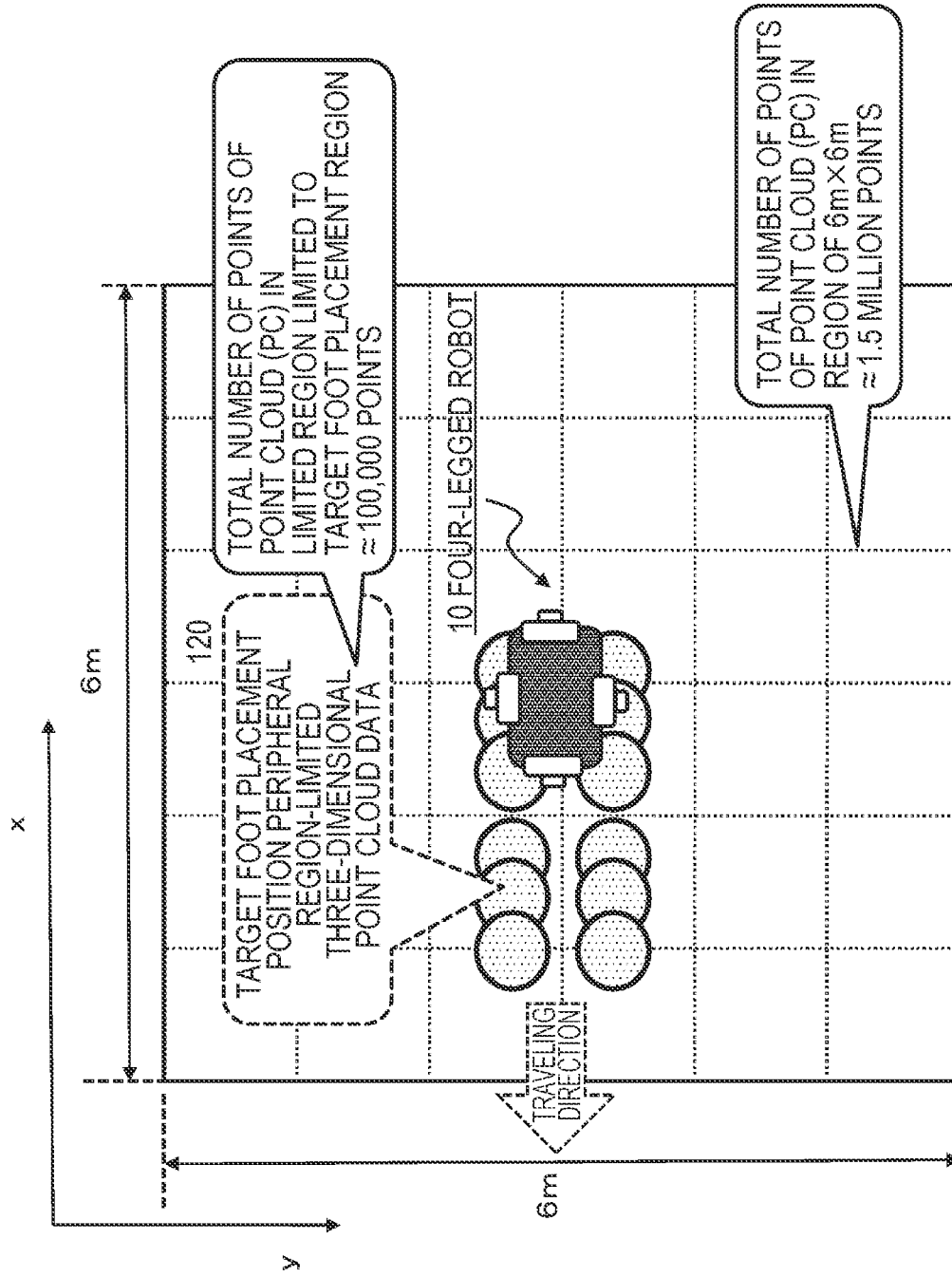
FIG. 10 is a diagram for explaining processing executed by a three-dimensional point cloud (PC) retransformation unit.

Specifically, for example, as illustrated in FIG. 10, "target foot placement position peripheral region-limited three-dimensional point cloud (PC) data 120" is output to the foot placement planning unit 106.

As illustrated in FIG. 10, the "target foot placement position peripheral region-limited three-dimensional point cloud (PC) data 120" is three-dimensional point cloud (PC) data configured only from the three-dimensional point cloud retransformation data of the region specified by the above (2) "three-dimensional point cloud output region selection information 162" determined by the three-dimensional point cloud (PC) output region determination unit 152.

The total number of points constituting the three-dimensional point cloud in the limited region illustrated in "target foot placement position peripheral region-limited three-dimensional point cloud (PC) data 120" of FIG. 10 is about 100,000 points.

This is the data amount of about 1/15 of the total number of points constituting above (1) described above with reference to FIG. 6, that is, the "three-dimensional point cloud retransformation data 161" generated by the three-dimensional point cloud (PC) retransformation processing execution unit 151, that is, the total number of points in a rectangular region of 6 m×6 m≈1.5 million points.

That is, the amount of data output to the foot placement planning unit 106 is greatly reduced. The data output to the foot placement planning unit 106 is x, y, and z three-dimensional coordinate data of about 100,000 points constituting the three-dimensional point cloud in the limited region illustrated in "target foot placement position peripheral region-limited three-dimensional point cloud (PC) data 120" in FIG. 10.

This data amount is greatly reduced from the data of 1.5 million points in the rectangular region of 6 m×6 m described above with reference to FIG. 6. The foot placement planning unit 106 can perform processing of determining the placement position of each foot of the four-legged robot 10 by verifying only the three-dimensional position data of about 100,000 points.

As a result, the data processing amount required for the foot placement planning unit 106 to determine the foot placement position is reduced, and the processing time is shortened. As a result, stable autonomous movement can be performed without reducing the moving speed of the robot.

In addition, the necessary capacity of the memory for storing the three-dimensional position data of each of about 100,000 points constituting the "target foot placement position peripheral region-limited three-dimensional point cloud (PC) data 120" in FIG. 10 can be reduced, and the hardware cost can also be reduced.

As described above, the three-dimensional point cloud (PC) retransformation processing execution unit 105 of the data processing unit 100 of the moving apparatus of the present embodiment selects a generation target region of the shape data (three-dimensional point cloud data) including the traveling surface of the moving apparatus on the basis of the target foot placement information 111 which is the target movement route information of the moving apparatus and the search range information 112, generates three-dimensional point cloud data of the selection region selected, and outputs the three-dimensional point cloud data to the foot placement planning unit 106.

The foot placement planning unit 106 refers to the three-dimensional point cloud data in the selection region input from the three-dimensional point cloud (PC) retransformation processing execution unit 105 to determine the movement route and the moving direction of the moving apparatus. Specifically, for example, the foot placement position is determined.

FIGS. 11A and 11B illustrate a comparative example of the processing data necessary for the determination of the foot placement position by the foot placement planning unit 106.

FIG. 11A Output data to the conventional foot placement planning unit

FIG. 11B Output data to the foot placement planning unit in a case where the configuration of the present disclosure is applied In the conventional processing FIG. 11A, three-dimensional point cloud (PC) data of about 1.5 million points in the rectangular region of 6 m×6 m described above with reference to FIG. 6 is output to the foot placement planning unit 106.

On the other hand, in the processing FIG. 11B of the present disclosure, only the "target foot placement position peripheral region-limited three-dimensional point cloud (PC) data 120" described above with reference to FIG. 10, which is only the three-dimensional point cloud (PC) data of about 100,000 points, is output to the foot placement planning unit 106.

By using the data illustrated in FIG. 11B, the data processing amount in the foot placement planning unit 106 and the memory capacity required for storing the three-dimensional point cloud data can be greatly reduced. As a result, the processing cost and the hardware cost can be greatly reduced, and the stable and high-speed robot movement can be realized without reducing the moving speed of the robot.

3. Modifications of First Embodiment

Next, modifications of the first embodiment described with reference to FIGS. 4, 5, 6, 7, 8, 9, 10, 11A, and 11B will be described.

The following modifications will be sequentially described.

(3-1) Modification of Configuration and Processing of Three-Dimensional Point Cloud (PC) Retransformation Unit (3-2) Modification of Data Output From Three-Dimensional Point Cloud (PC) Retransformation Unit to Foot Placement Planning Unit (3-1) Modification of Configuration and Processing of Three-Dimensional Point Cloud (PC) Retransformation Unit First, a modification of the configuration and processing of the three-dimensional point cloud (PC) retransformation unit will be described.

In the first embodiment described above, the detailed configuration example of the three-dimensional point cloud (PC) retransformation unit 105 has been described with reference to FIG. 5.

The three-dimensional point cloud (PC) retransformation unit 105 illustrated in FIG. 5 includes the three-dimensional point cloud (PC) retransformation processing execution unit 151, the three-dimensional point cloud (PC) output region determination unit 152, and the three-dimensional point cloud (PC) output region selection unit 153.

The three-dimensional point cloud (PC) retransformation processing execution unit 151 inputs one piece of time-series map integrated map data generated by the time-series map image integration unit 104 and generates three-dimensional point cloud retransformation data.

For example, three-dimensional point cloud retransformation data in which about 1.5 million point clouds are set in the entire plane region (xy plane) of 6 m×6 m described with reference to FIG. 6 is generated.

The three-dimensional point cloud (PC) output region determination unit 152 inputs the target foot placement information 111 and the search range information 112, generates the three-dimensional point cloud output region selection information 162, and outputs the generated three-dimensional point cloud output region selection information 162 to the three-dimensional point cloud (PC) output region selection unit 153.

This processing is, for example, the processing described above with reference to FIGS. 7 to 9, and as illustrated in FIG. 9, the three-dimensional point cloud (PC) output region determination unit 152 generates a region having a radius of 0.5 m centered on each target foot placement position up to three steps of four legs of the four-legged robot 10 as "three-dimensional point cloud output region selection information 162" and outputs the region to the three-dimensional point cloud (PC) output region selection unit 153.

The three-dimensional point cloud (PC) output region selection unit 153 selects and extracts only the three-dimensional point cloud retransformation data of the region specified by the "three-dimensional point cloud output region selection information 162" determined by the three-dimensional point cloud (PC) output region determination unit 152 from the "three-dimensional point cloud retransformation data 161" generated by the three-dimensional point cloud (PC) retransformation processing execution unit 151, and outputs the three-dimensional point cloud retransformation data to the foot placement planning unit 106.

The three-dimensional point cloud (PC) retransformation unit 105 described in the first embodiment reduces the data to be output to the foot placement planning unit 106 by such a procedure.

The three-dimensional point cloud (PC) retransformation unit 105 can have another configuration having such a configuration described in the first embodiment.

Figure 12:
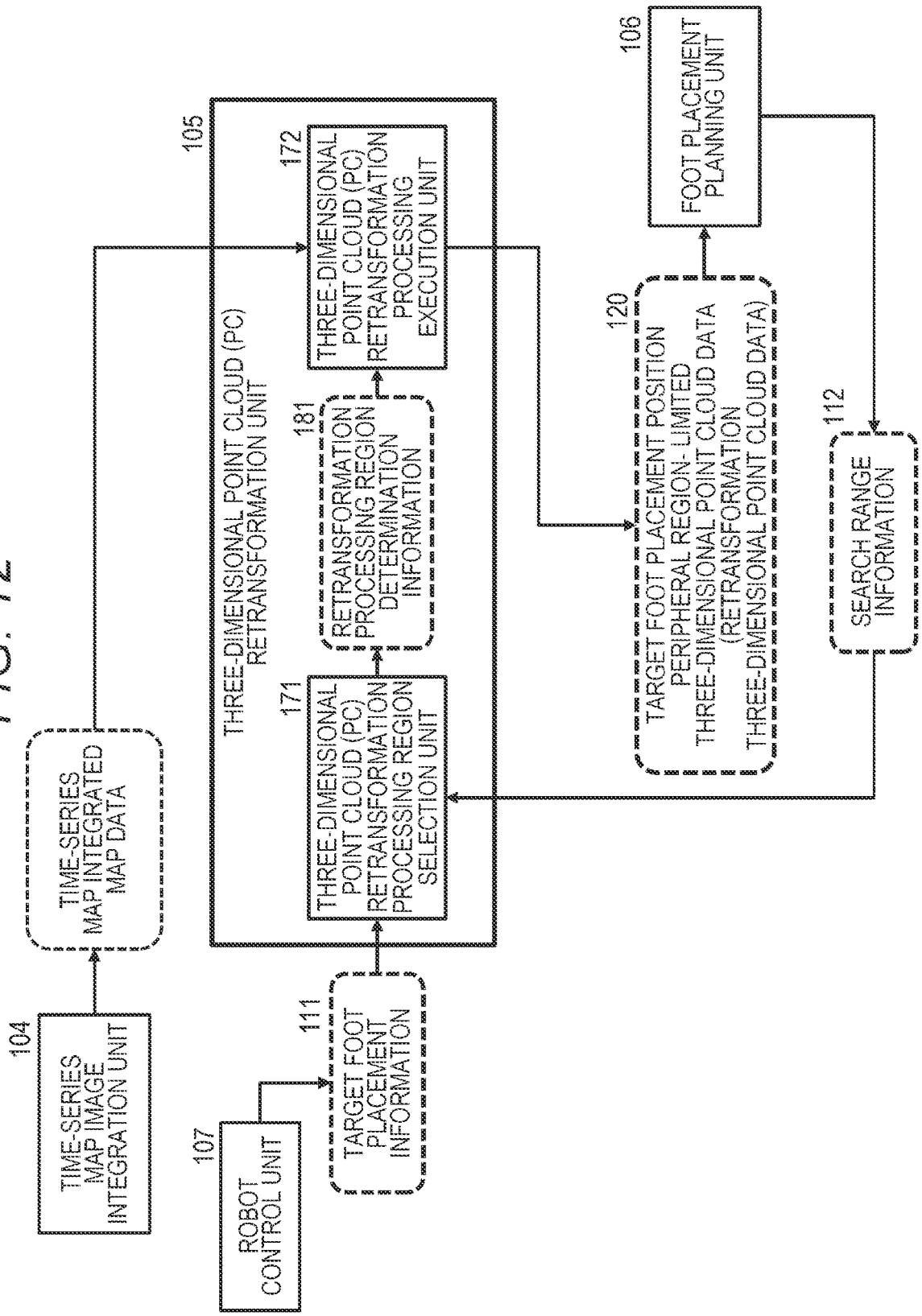
FIG. 12 is a diagram for explaining a configuration and processing of a three-dimensional point cloud (PC) retransformation unit.

FIG. 12 illustrates a modification of the three-dimensional point cloud (PC) retransformation unit 105.

The three-dimensional point cloud (PC) retransformation unit 105 illustrated in FIG. 12 includes a three-dimensional point cloud (PC) retransformation processing region determination unit 171 and a three-dimensional point cloud (PC) retransformation processing execution unit 172.

The three-dimensional point cloud (PC) retransformation processing region determination unit 171 inputs the following two pieces of data.

(1) Target foot placement information 111 input from the robot control unit 107
(2) Search range information 112 input from the foot placement planning unit 106

"(1) Target foot placement information 111 input from the robot control unit 107" is the data described above with reference to FIG. 7, and is the placement position information to be the target of each foot of the robot for the robot to move toward the destination. This is information determined by the robot control unit 107 in accordance with target movement route information defined in advance.

"(2) Search range information 112 input from the foot placement planning unit 106" is the search range information 112 described above with reference to FIG. 8, and is, for example, search range information including a region having a radius of 0.5 m centered on the foot placement position calculated by the robot control unit 107.

As illustrated in FIG. 12, the three-dimensional point cloud (PC) retransformation processing region determination unit 171 receives the target foot placement information 111 and the search range information 112, determines a region to be subjected to the three-dimensional point cloud (PC) retransformation processing, and outputs the determination information as "retransformation processing region determination information 181" to the three-dimensional point cloud (PC) retransformation processing execution unit 172.

A specific example of the "retransformation processing region determination information 181" generated by the three-dimensional point cloud (PC) retransformation processing region determination unit 171 on the basis of the above two pieces of data will be described with reference to FIG. 13.

Figure 13:
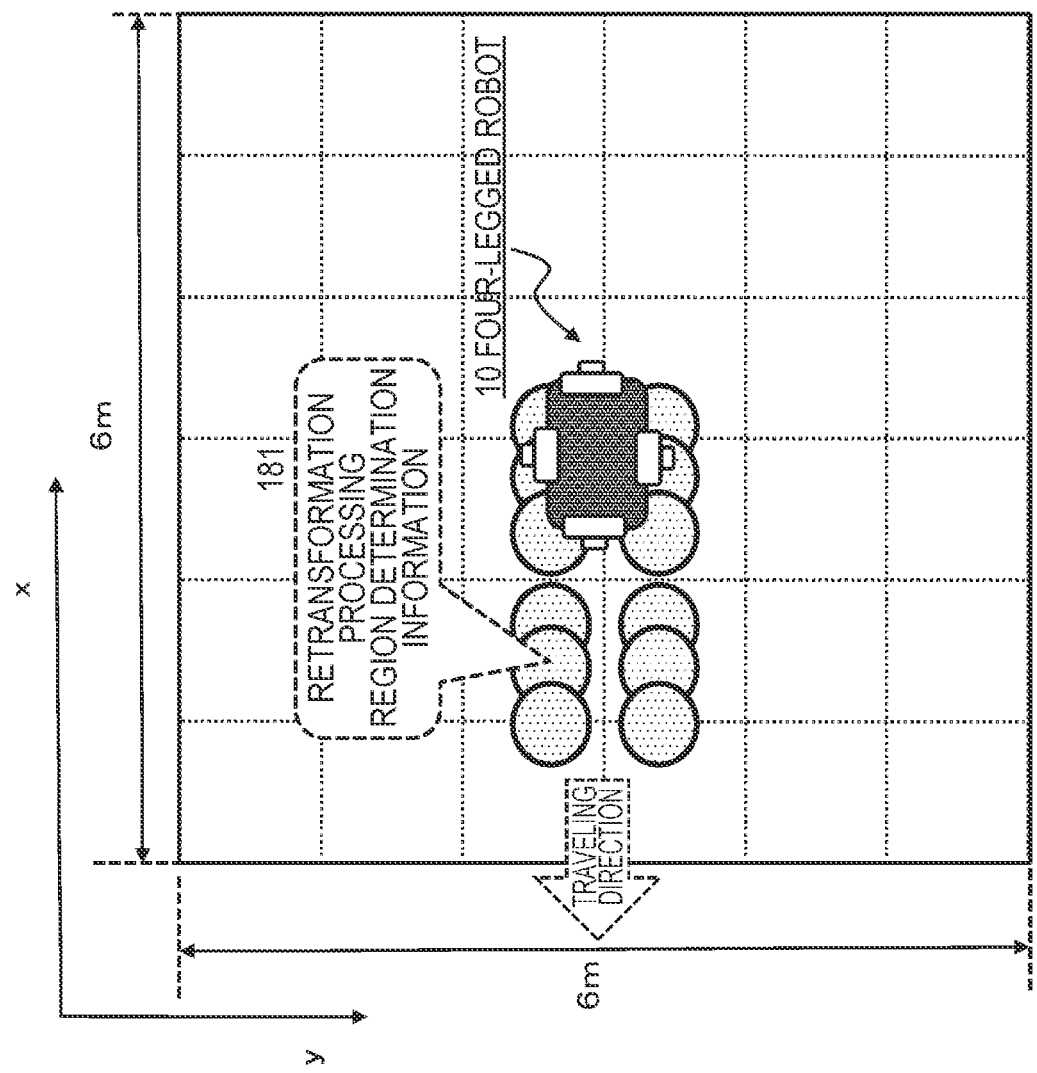
FIG. 13 is a diagram for explaining processing executed by a three-dimensional point cloud (PC) retransformation unit.

The example illustrated in FIG. 13 is a diagram illustrating a specific example of the "retransformation processing region determination information 181" generated by the three-dimensional point cloud (PC) retransformation processing region determination unit 171 in a case where the "(1) target foot placement information 111 input from the robot control unit 107" is the data illustrated in FIG. 7 and the "(2) search range information 112 input from the foot placement planning unit 106" is the data illustrated in FIG. 8.

As illustrated in FIG. 13, the three-dimensional point cloud (PC) retransformation processing region determination unit 171 determines a region having a radius of 0.5 m centered on each target foot placement position up to three steps of four legs of the four-legged robot 10 as "retransformation processing region determination information 181".

As illustrated in FIG. 12, the three-dimensional point cloud (PC) retransformation processing region determination unit 171 outputs the determined "retransformation processing region determination information 181" to the three-dimensional point cloud (PC) retransformation processing execution unit 172.

The three-dimensional point cloud (PC) retransformation processing execution unit 172 inputs the following two pieces of data.

(1) One piece of time-series map integrated map data generated by the time-series map image integration unit 104
(2) Retransformation processing region determination information 181 generated by the three-dimensional point cloud (PC) retransformation processing region determination unit 171

As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

The three-dimensional point cloud (PC) retransformation processing execution unit 172 selects a region corresponding to the "retransformation processing region determination information 181" generated by the three-dimensional point cloud (PC) retransformation processing region determination unit 171 from the map data, and generates three-dimensional point cloud (PC) data of only the selection region.

That is, three-dimensional point cloud (PC) data of only the region defined by the "retransformation processing region determination information 181" illustrated in FIG. 13 is generated. As illustrated in FIG. 13, three-dimensional point cloud (PC) data of only a limited region having a radius of 0.5 m centered on each target foot placement position up to three steps of the four legs of the four-legged robot 10, that is, the target foot placement position peripheral region-limited three-dimensional point cloud data 120 illustrated in FIG. 12 is generated.

The target foot placement position peripheral region-limited three-dimensional point cloud data 120 is similar to the target foot placement position peripheral region-limited three-dimensional point cloud data 120 described with reference to FIG. 10 in the first embodiment.

The three-dimensional point cloud (PC) retransformation processing execution unit 172 outputs the target foot placement position peripheral region-limited three-dimensional point cloud data 120, which is the generated three-dimensional point cloud (PC) data of the limited region, to the foot placement planning unit 106.

The three-dimensional point cloud (PC) retransformation unit 105 illustrated in FIG. 5 described in the first embodiment above first generates three-dimensional point cloud (PC) data for the entire region of one piece of time-series map integrated map data generated by the time-series map image integration unit 104. Thereafter, the processing is performed in the order of selecting only the data of the target foot placement position peripheral region from the generated three-dimensional point cloud (PC) data.

On the other hand, the three-dimensional point cloud (PC) retransformation unit 105 illustrated in FIG. 12 first specifies the target foot placement position surrounding region, and then generates the three-dimensional point cloud (PC) data only for the target foot placement position peripheral region of one piece of time-series map integrated map data generated by the time-series map image integration unit 104.

Therefore, there is an advantage that the processing amount of the three-dimensional point cloud (PC) data generation processing from the time-series map integrated map data by the three-dimensional point cloud (PC) retransformation unit 105 illustrated in FIG. 12 is reduced, and high-speed processing can be performed.

Furthermore, another modification of the three-dimensional point cloud (PC) retransformation unit 105 will be described with reference to FIG. 14.

Figure 14:
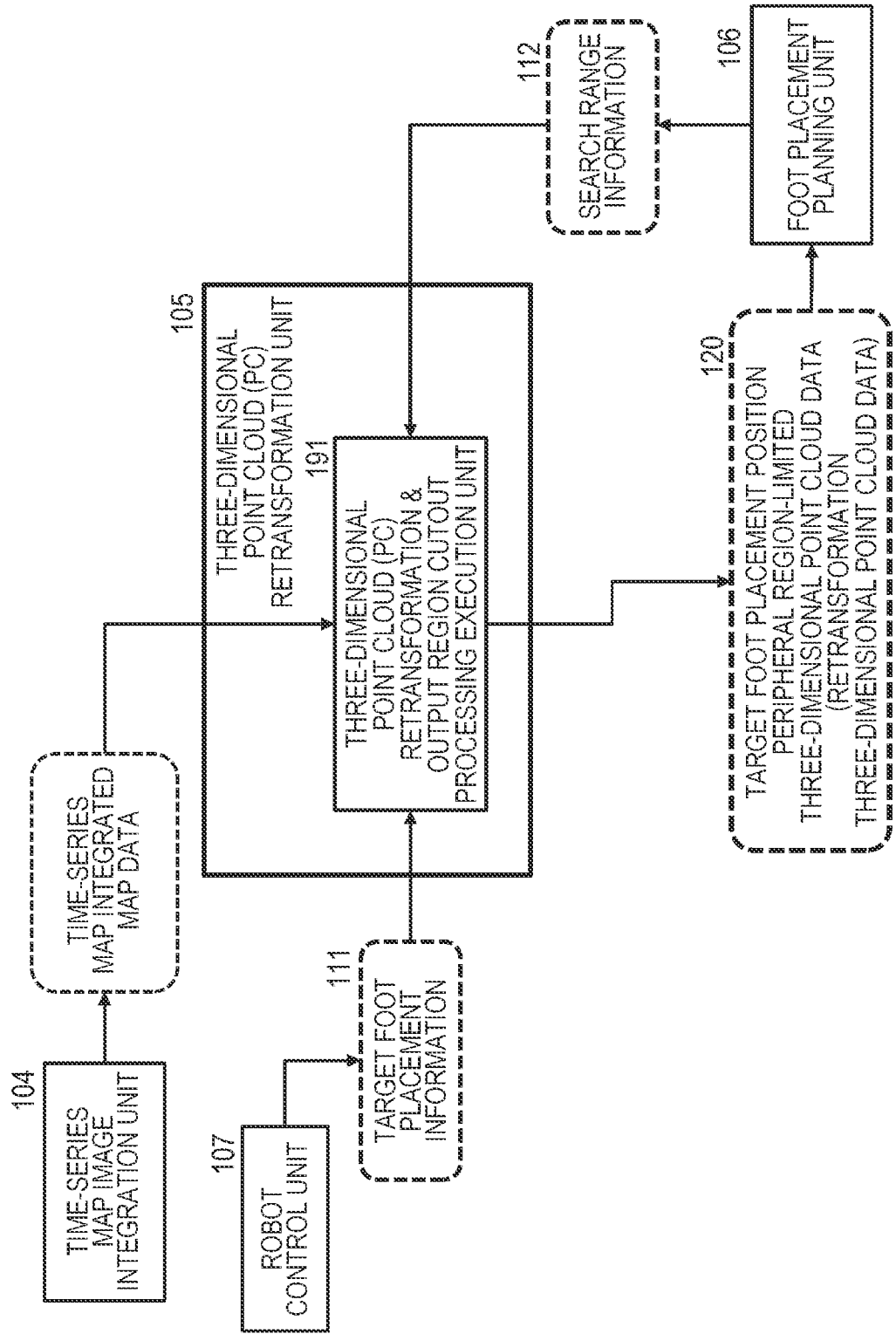
FIG. 14 is a diagram for explaining a configuration and processing of a three-dimensional point cloud (PC) retransformation unit.

The three-dimensional point cloud (PC) retransformation unit 105 illustrated in FIG. 14 includes a three-dimensional point cloud (PC) retransformation & output region cutout processing execution unit 191.

The three-dimensional point cloud (PC) retransformation & output region cutout processing execution unit 191 inputs the following three pieces of data.
(1) One piece of time-series map integrated map data generated by the time-series map image integration unit 104
(2) Target foot placement information 111 input from the robot control unit 107
(3) Search range information 112 input from the foot placement planning unit 106

As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

The three-dimensional point cloud (PC) retransformation & output region cutout processing execution unit 191 first generates three-dimensional point cloud (PC) data of the entire region of one piece of time-series map integrated map data generated by the time-series map image integration unit 104.

Thereafter, the three-dimensional point cloud data of only the region defined by the target foot placement information 111 and the search range information 112, that is, the peripheral region of the target foot placement position is cut out.

The three-dimensional point cloud data cut out last, that is, the target foot placement position peripheral region-limited three-dimensional point cloud data 120 illustrated in FIG. 14 is output to the foot placement planning unit 106.

The target foot placement position peripheral region-limited three-dimensional point cloud data 120 illustrated in FIG. 14 is the target foot placement position peripheral region-limited three-dimensional point cloud data 120 of the limited region illustrated in FIG. 10, similarly to the target foot placement position peripheral region-limited three-dimensional point cloud data 120 illustrated in FIG. 5 of the first embodiment and FIG. 12 which is the above-described modification.

In this modification, one processing unit, that is, the three-dimensional point cloud (PC) retransformation & output region cutout processing execution unit 191 illustrated in FIG. 14 is configured to perform generation of three-dimensional point cloud data and cutout processing of output data.

As described above, various different types of configurations and processing are possible for the configuration and processing of the three-dimensional point cloud (PC) retransformation unit 105.

(3-2) Modification of Data Output from Three-Dimensional Point Cloud (PC) Retransformation Unit to Foot Placement Planning Unit Next, a modification of data output from the three-dimensional point cloud (PC) retransformation unit 105 to the foot placement planning unit 106 will be described.

In the first embodiment and the modifications thereof described above, the data output from the dimensional point cloud (PC) retransformation unit 105 to the foot placement planning unit 106 is three-dimensional point cloud (PC) data of the target foot placement position peripheral region for the next three steps of each of the four legs of the four-legged robot 10, as described with reference to FIGS. 10 and 11B.

Each of the data regions for three steps of each foot was set to a region having the same size, for example, a region having a radius of 50 cm centered on the target foot placement position.

The data output from the three-dimensional point cloud (PC) retransformation unit 105 to the foot placement planning unit 106, that is, the target foot placement position peripheral region-limited three-dimensional point cloud data 120 output from the three-dimensional point cloud (PC) retransformation unit 105 illustrated in FIGS. 4, 5, 12, and 14 to the foot placement planning unit 106 is not limited to such data, and can be various different data.

Figure 15:
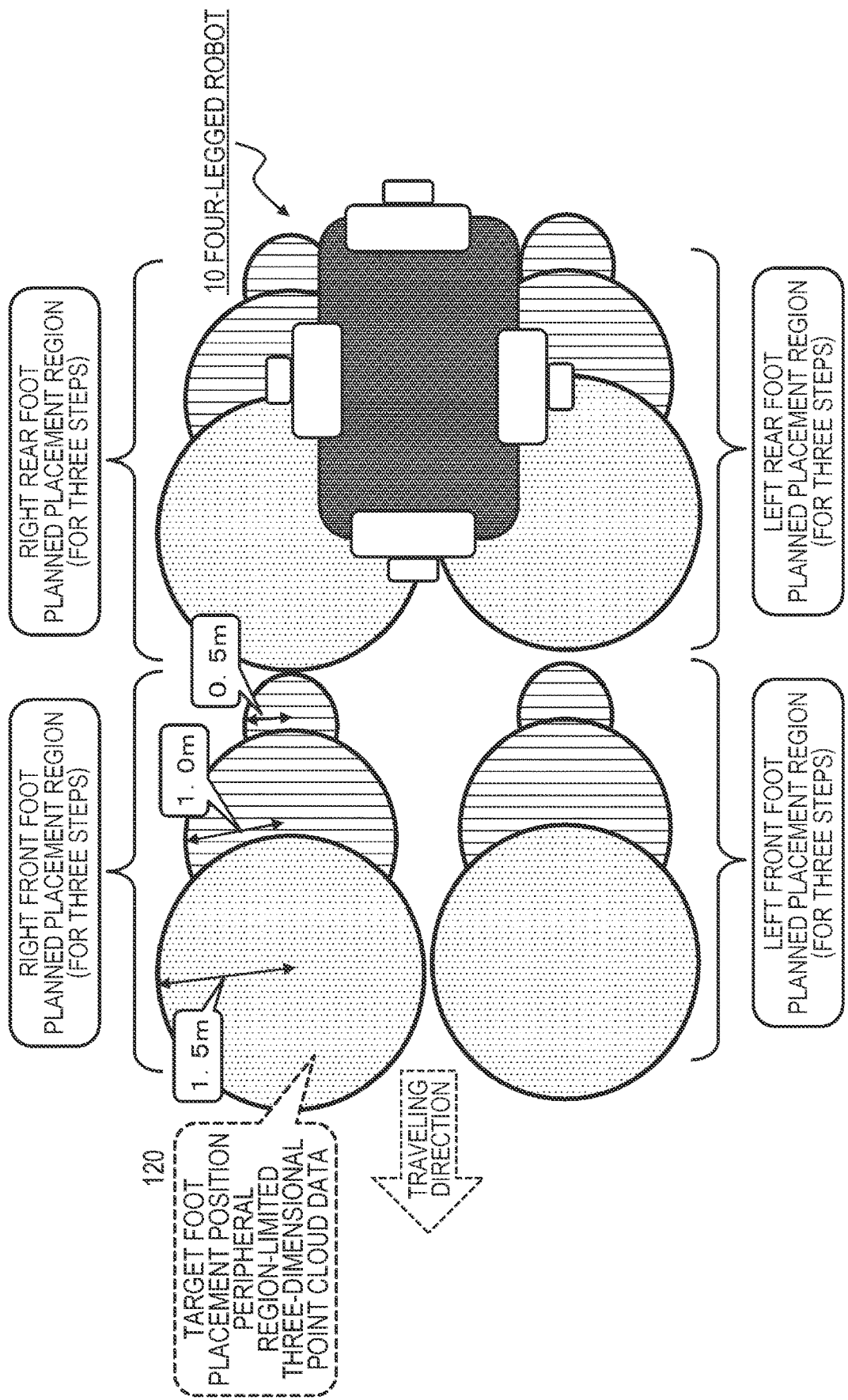
FIG. 15 is a diagram for explaining a modification of the moving apparatus according to the first embodiment of the present disclosure.

FIG. 15 illustrates an example of the target foot placement position peripheral region-limited three-dimensional point cloud data 120.

The target foot placement position peripheral region-limited three-dimensional point cloud data 120 illustrated in FIG. 15, that is, the data output from the three-dimensional point cloud (PC) retransformation unit 105 to the foot placement planning unit 106 is three-dimensional point cloud (PC) data of the target foot placement position peripheral region for the next three steps of each of the four legs of the four-legged robot 10, and the region setting is as follows.

Region of the first step of each foot with a radius of 0.5 m centered on the target foot placement position Region of the second step of each foot with a radius of 1.0 m centered on the target foot placement position Region of the third step of each foot with a radius of 1.5 m centered on the target foot placement position The target foot placement position is a position calculated by the robot control unit 107 according to the destination and the traveling route, and there is a possibility that a shift occurs according to the actual movement of the robot.

The amount of this shift increases as the number of steps from the current point of time advances. In other words, the error becomes larger from the first step to the second step, and from the second step to the third step.

The target foot placement position peripheral region-limited three-dimensional point cloud data 120 illustrated in FIG. 15 is a region set in consideration of such an error.

As illustrated in FIG. 15, by increasing the data output from the three-dimensional point cloud (PC) retransformation unit 105 to the foot placement planning unit 106, that is, the cut-out range according to the number of steps (N), it is possible to reliably confirm the three-dimensional shape of the landing position of the foot during the actual movement of the robot.

Note that the target foot placement position peripheral region-limited three-dimensional point cloud data 120 illustrated in FIG. 15 is set such that the radius of the region in the second step is twice the radius of the region in the first step, the radius of the region in the third step is three times the radius of the region in the first step, and the radius of the region in the nth step is set to be n times the radius of the region in the first step proportional to the number of steps, but the region enlargement setting mode is not limited to such a setting.

For example, on the traveling surface capable of stable traveling, setting may be performed such that the radius of the region in the second step is 1.2 times the radius of the region in the first step, and the radius of the region in the third step is 1.5 times the radius of the region in the first step.

In addition, on the traveling surface on which stable traveling is difficult, setting may be performed such that the radius of the region in the second step is twice the radius of the first step, and the radius of the region in the third step is four times the radius of the first step.

By setting the data output from the three-dimensional point cloud (PC) retransformation unit 105 to the foot placement planning unit 106 as described above, the foot placement planning unit 106 can reliably confirm the three-dimensional shape of the landing position of the foot when the robot actually moves.

Furthermore, the data output from the three-dimensional point cloud (PC) retransformation unit 105 to the foot placement planning unit 106 is not limited to three steps of each foot.

Figure 16:
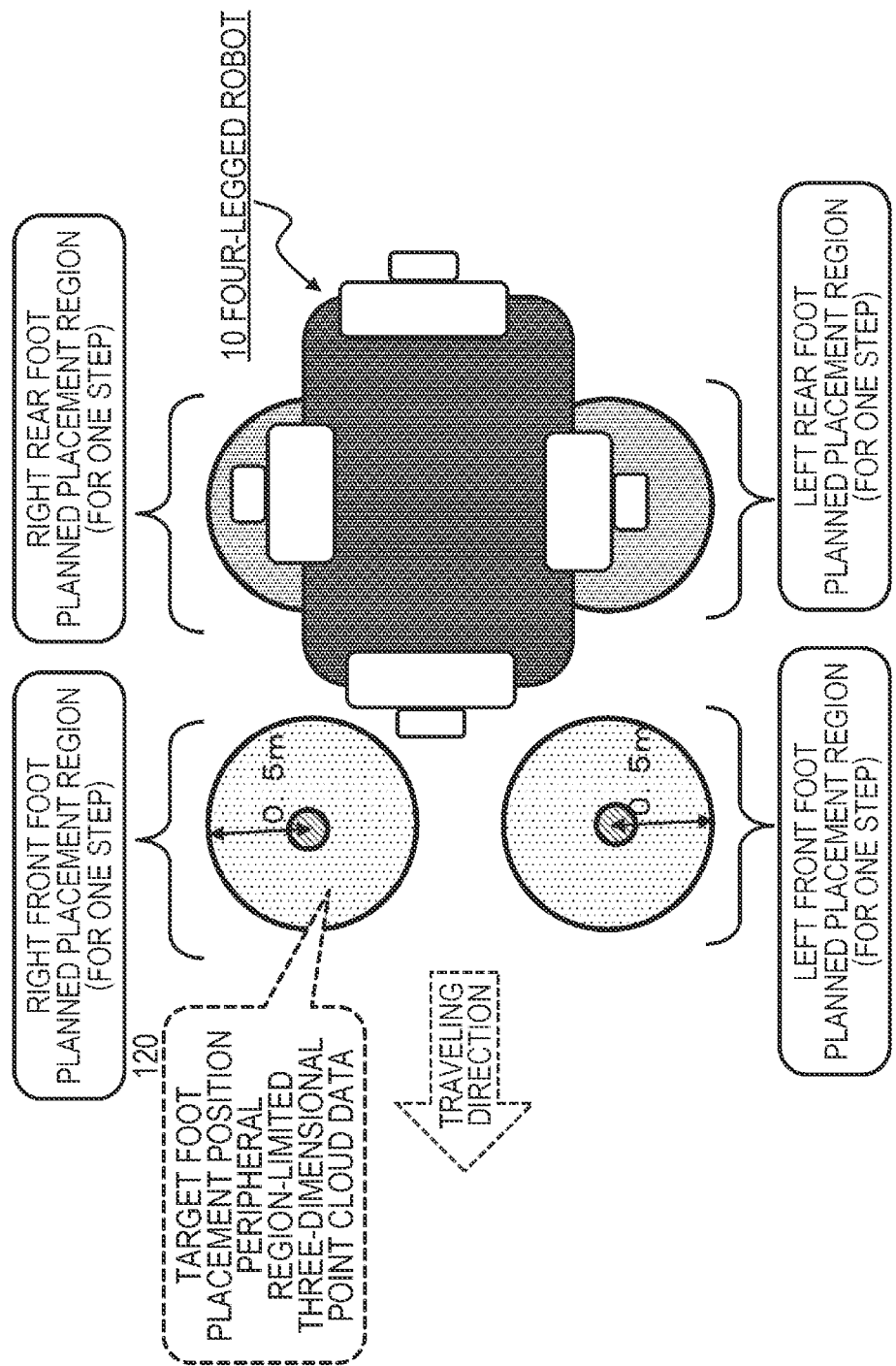
FIG. 16 is a diagram for explaining a modification of the moving apparatus according to the first embodiment of the present disclosure.

For example, as illustrated in FIG. 16, only the peripheral region of the target foot placement position for the next one step of each foot may be provided.

Figure 17:
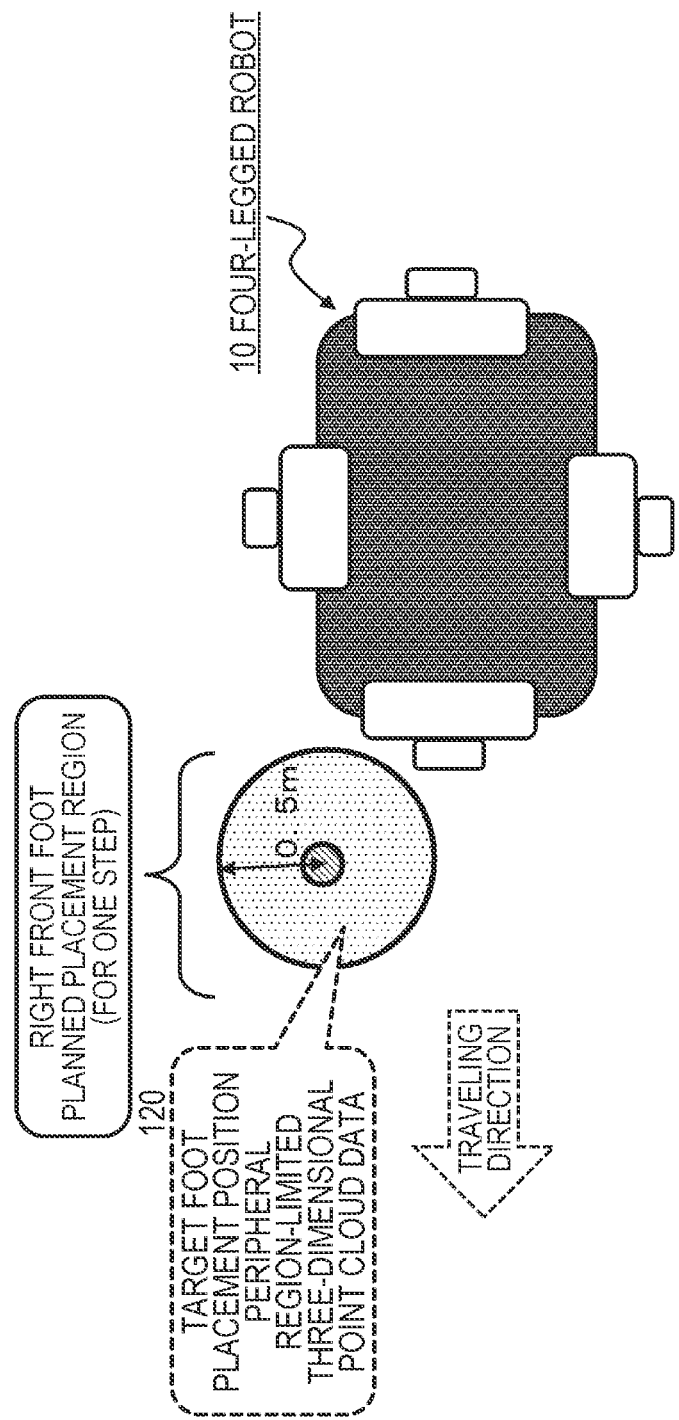
FIG. 17 is a diagram for explaining a modification of the moving apparatus according to the first embodiment of the present disclosure.

Furthermore, as illustrated in FIG. 17, only the peripheral region of the target foot placement position of one step of one foot moving next may be used instead of the next one step of all the four legs of the four-legged robot 10.

As described above, the data output from the three-dimensional point cloud (PC) retransformation unit 105 to the foot placement planning unit 106 can be data of various limited regions.

Note that, in the above-described embodiment, an example in which the target foot placement position peripheral region-limited three-dimensional point cloud data 120 output from the three-dimensional point cloud (PC) retransformation unit 105 to the foot placement planning unit 106 is a circular region centered on the target foot placement position has been described, but a shape other than the circular region, for example, a rectangular region may be used.

For example, in the example described with reference to FIG. 15, an example of using a circular region having a larger radius as the distance from the current position of the robot increases has been described, but a rectangular region having a larger area as the distance from the current position of the robot increases may be set and used.

4. (Second Embodiment) Details of Moving Apparatus and Moving Apparatus Control Method of Second Embodiment of Present Disclosure Next, details of a moving apparatus and a moving apparatus control method according to a second embodiment of the present disclosure will be described.

As described with reference to FIG. 4 and the like, the first embodiment described above is configured such that the target foot placement information 111 is input from the robot control unit 107 to the three-dimensional point cloud (PC) retransformation unit 105, only the peripheral region of the target foot placement position is selected in the three-dimensional point cloud (PC) retransformation unit 105, and the target foot placement position peripheral region-limited three-dimensional point cloud data 120 is generated and output to the foot placement planning unit 106.

Figure 18:
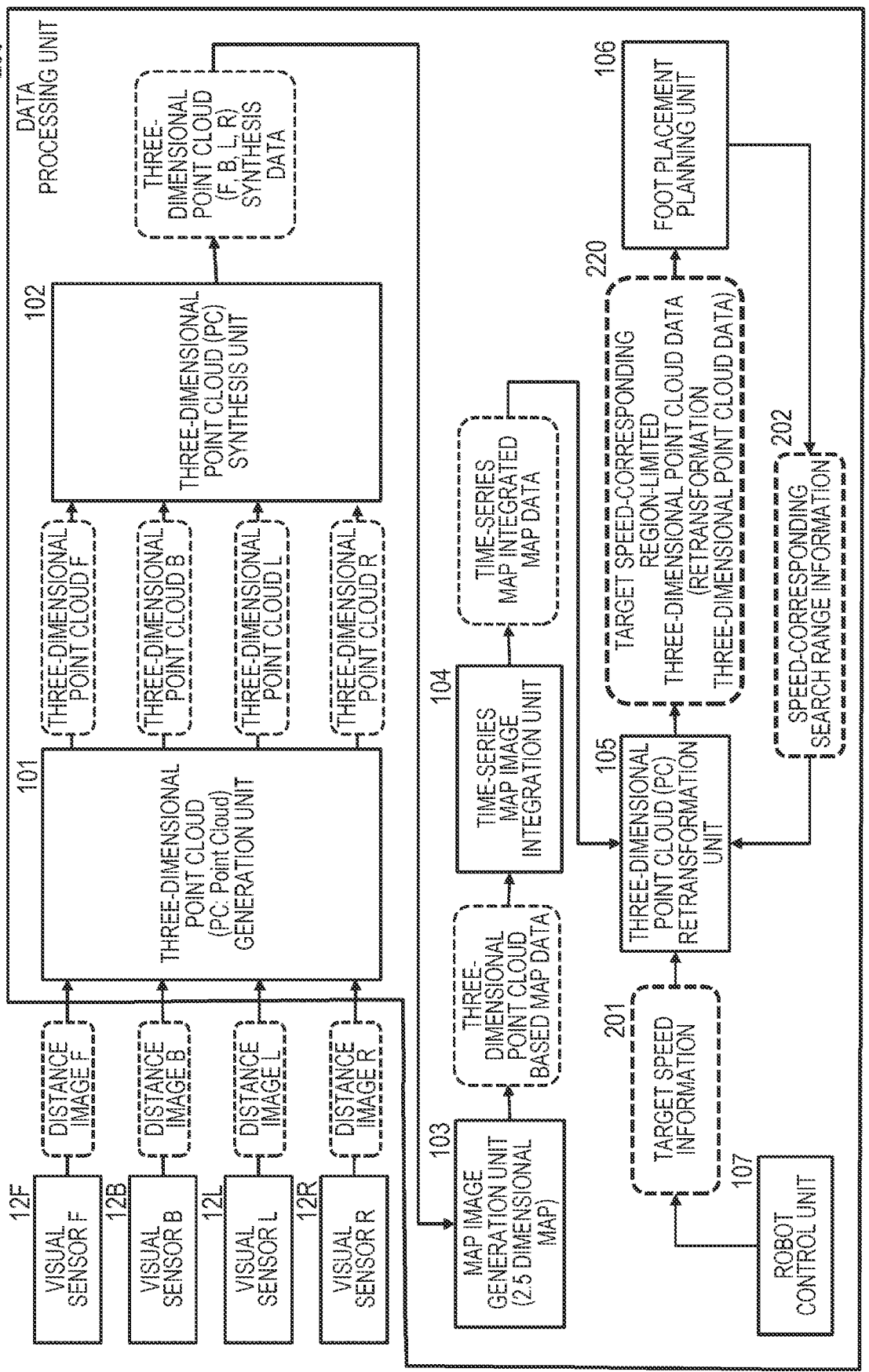
FIG. 18 is a diagram for explaining a configuration and processing of a moving apparatus according to a second embodiment of the present disclosure.

In the second embodiment described below, as illustrated in FIG. 18, target speed information 201 is input from the robot control unit 107 to the three-dimensional point cloud (PC) retransformation unit 105.

The three-dimensional point cloud (PC) retransformation unit 105 generates the target speed-corresponding region-limited three-dimensional point cloud data 220 using the target speed information input from the robot control unit 107 and the search range information input from the foot placement planning unit 106, and outputs the target speed-corresponding region-limited three-dimensional point cloud data 220 to the foot placement planning unit 106.

FIG. 18 is a diagram for explaining the configuration of the moving apparatus and a process for performing travel control processing of the moving apparatus according to the present second embodiment.

Similarly to FIG. 4 described above as the configuration of the first embodiment, the configuration illustrated in FIG. 18 is a configuration for performing travel control processing of the four-legged robot 10 described with reference to FIG. 1, for example. The four visual sensors F to R, 12F to R illustrated in FIG. 18 are visual sensors such as stereo cameras attached to the front, rear, left, and right of the four-legged robot 10 described with reference to FIG. 1.

The data processing unit 200 illustrated in FIG. 18 includes the three-dimensional point cloud (PC) generation unit 101, the three-dimensional point cloud (PC) synthesis unit 102, the map image generation unit 103, the time-series map image integration unit 104, the three-dimensional point cloud (PC) retransformation unit 105, the foot placement planning unit 106, and the robot control unit 107.

Many of these configurations are basically similar to the configuration of FIG. 4 described as the configuration of the first embodiment.

The main differences between the present second embodiment and the first embodiment are as follows.
(1) Data input to the three-dimensional point cloud (PC) retransformation unit 105 by the robot control unit 107 is "target speed information 201".
(2) Data input by the foot placement planning unit 106 to the three-dimensional point cloud (PC) retransformation unit 105 is "speed-based search range information 202".

(3) The three-dimensional point cloud (PC) retransformation unit 105 generates "target speed-corresponding region-limited three-dimensional point cloud data 220" using the target speed information 201 input from the robot control unit 107 and the speed-based search range information 202 input from the foot placement planning unit 106, and outputs the data to the foot placement planning unit 106.

The configuration and processing of the data processing unit 200 illustrated in FIG. 18 will be described.

Since the processing from the three-dimensional point cloud (PC) generation unit 101 to the time-series map image integration unit 104 is similar to that of the first embodiment, the description will be simplified.

The three-dimensional point cloud (PC) generation unit 101 generates a three-dimensional point cloud (PC) in which a distance value (pixel value) set to each pixel of each distance image is expressed as point cloud data on three-dimensional coordinates for each of the four distance images F to R, which are outputs of the four visual sensors F, 12F to R, 12R.

As illustrated in FIG. 18, the three-dimensional point cloud (PC) generation unit 101 generates the following four three-dimensional point clouds and inputs them to the next-stage three-dimensional point cloud (PC) synthesis unit 102.

(1) Three-dimensional point cloud F generated on the basis of the distance image F acquired by the visual sensor F, 12F

(2) Three-dimensional point cloud B generated on the basis of the distance image B acquired by the visual sensor B, 12B

(3) Three-dimensional point cloud L generated on the basis of the distance image L acquired by the visual sensor L, 12L

(4) Three-dimensional point cloud R generated on the basis of the distance image R acquired by the visual sensor R, 12R

The three-dimensional point cloud (PC) synthesis unit 102 synthesizes these four three-dimensional point clouds F to R input from the three-dimensional point cloud (PC) generation unit 101 to generate one piece of three-dimensional point cloud synthesis data.

FIG. 18 illustrates three-dimensional point cloud (F, B, L, R) synthesis data.

The three-dimensional point cloud (F, B, L, R) synthesis data is synthesis data of four three-dimensional point clouds F to R based on four distance images F to R which are outputs of four visual sensors F, 12F to R, 12R attached to the front, back, left, and right of the four-legged robot 10 illustrated in FIG. 1, and is data indicating three-dimensional positions and three-dimensional shapes of objects around the front, back, left, and right of the four-legged robot 10 by a point cloud.

The three-dimensional point cloud (F, B, L, R) synthesis data generated by the three-dimensional point cloud (PC) synthesis unit 102 is input to the map image generation unit (2.5 dimensional map) 103.

The map image generation unit 103 uses the three-dimensional point cloud (F, B, L, R) synthesis data generated by the three-dimensional point cloud (PC) synthesis unit 102 to generate three-dimensional point cloud based map data indicating a three-dimensional shape including a traveling surface of an object around the robot, and outputs the three-dimensional point cloud based map data to the time-series map image integration unit 104.

The three-dimensional point cloud based map data generated by the map image generation unit 103 is, for example, a 2.5 dimensional map such as a height map.

The time-series map image integration unit 104 performs integration processing of time-series data of the three-dimensional point cloud based map data (for example, the height map) generated by the map image generation unit 103. That is, the plurality of pieces of time-series three-dimensional point cloud based map data (t1) to (tn) generated on the basis of the distance images captured at different times (t1 to tn) is integrated to generate one piece of time-series map integrated map data (for example, an integrated height map).

One piece of time-series map integrated map data generated by the time-series map image integration unit 104 is input to a three-dimensional point cloud (PC) retransformation unit 105.

The three-dimensional point cloud (PC) retransformation unit 105 inputs one piece of time-series map integrated map data from the time-series map image integration unit 104, and generates three-dimensional point cloud (PC) data based on the input data.

In the present second embodiment, the target speed information 111 is further input from the robot control unit 107 to the three-dimensional point cloud (PC) retransformation unit 105, and the speed-corresponding search range information 202 is also input from the foot placement planning unit 106.

The three-dimensional point cloud (PC) retransformation unit 105 generates target speed-corresponding region-limited three-dimensional point cloud data 220 using these pieces of input data, and outputs the generated three-dimensional point cloud data to the foot placement planning unit 106.

The foot placement planning unit 106 refers to the target speed-corresponding region-limited three-dimensional point cloud data 220 input from the three-dimensional point cloud (PC) retransformation unit 105 to determine the placement position of each foot of the four-legged robot 10. Specifically, for example, a position at which the robot can stably advance with less unevenness and inclination is determined as a foot placement position, and each foot is placed to advance the robot.

A detailed configuration and processing of the three-dimensional point cloud (PC) retransformation unit 105 will be described with reference to FIG. 19 and subsequent drawings.

Figure 19:
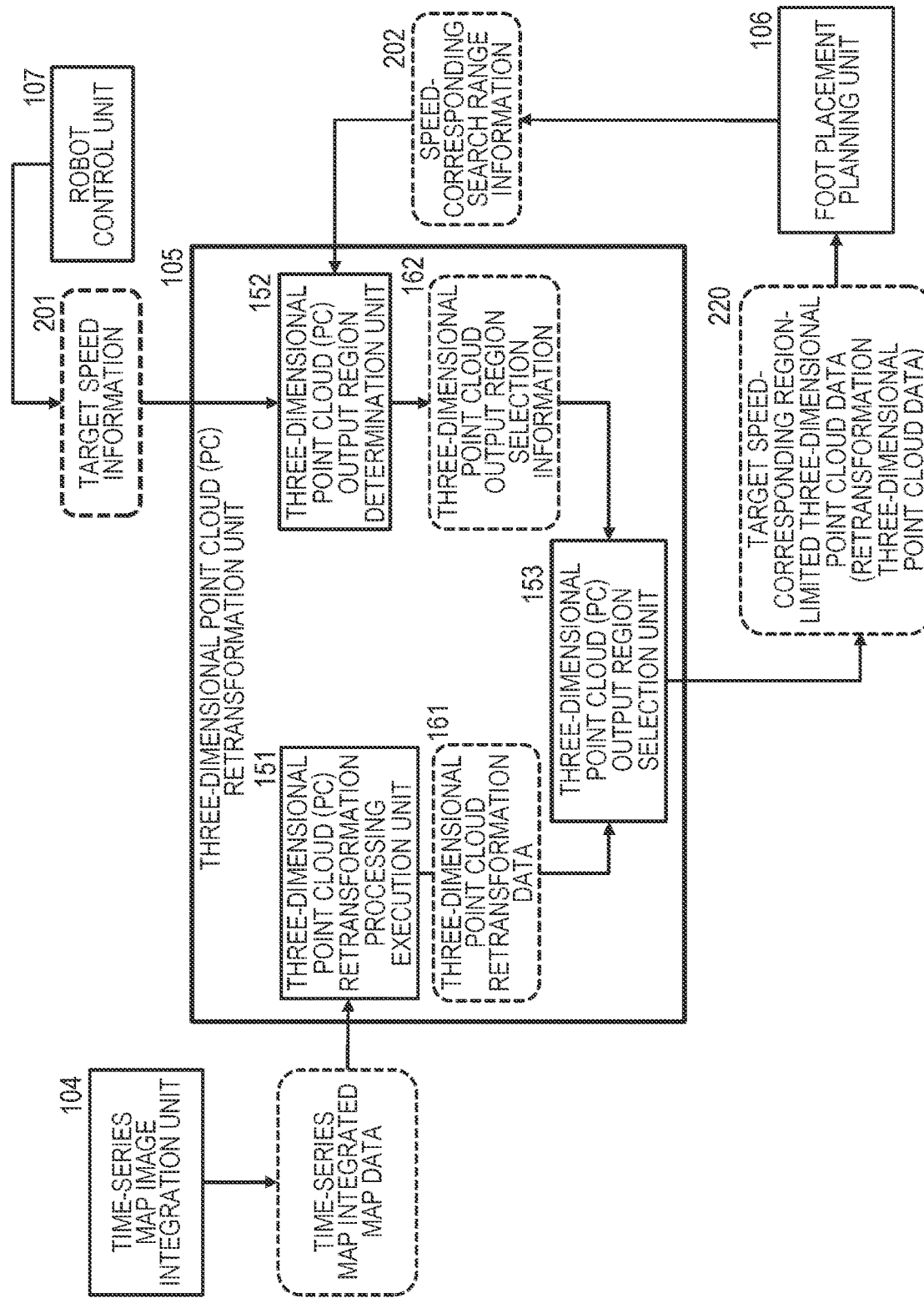
FIG. 19 is a diagram for explaining a configuration and processing of a three-dimensional point cloud (PC) retransformation unit according to the second embodiment of the present disclosure.

As illustrated in FIG. 19, the three-dimensional point cloud (PC) retransformation unit 105 includes the three-dimensional point cloud (PC) retransformation processing execution unit 151, the three-dimensional point cloud (PC) output region determination unit 152, and the three-dimensional point cloud (PC) output region selection unit 153.

The three-dimensional point cloud (PC) retransformation processing execution unit 151 inputs one piece of time-series map integrated map data generated by the time-series map image integration unit 104 and generates three-dimensional point cloud retransformation data 161. As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

The three-dimensional point cloud retransformation data 161 generated by the three-dimensional point cloud (PC) retransformation processing execution unit 151 is three-dimensional point cloud (PC) data of a plane region (xy plane) of 6 m×6 m centered on the four-legged robot 10 as described above with reference to FIG. 6.

As described above, when each point constituting the three-dimensional point cloud (PC) is set in a rectangular region of 5 mm×5 mm, the total number of points is about 1.5 million points.

This data amount is enormous, and when this three-dimensional point cloud retransformation data is output to the foot placement planning unit 106 as it is, the foot placement planning unit 106 sequentially verifies the three-dimensional position of each of about 1.5 million points constituting the three-dimensional point cloud retransformation data and performs processing of determining the placement position of each foot of the four-legged robot 10, and a processing time delay occurs, and the placement position of the foot cannot be determined until the processing is completed, and as a result, a problem that the moving speed of the robot decreases occurs.

In addition, there is a problem that a necessary capacity of a memory for storing three-dimensional position data of each point of about 1.5 million points constituting the three-dimensional point cloud retransformation data also increases.

The moving apparatus of the second embodiment also solves this problem, and has a configuration in which the three-dimensional point cloud (PC) retransformation unit 105 significantly reduces the data amount of the three-dimensional point cloud data output to the foot placement planning unit 106.

A configuration for this is the configuration of the three-dimensional point cloud (PC) retransformation unit 105 illustrated in FIG. 19.

As illustrated in FIG. 19, the three-dimensional point cloud (PC) output region determination unit 152 of the three-dimensional point cloud (PC) retransformation unit 105 inputs the following two pieces of data.
 (1) Target speed information 201 input from the robot control unit 107
 (2) Speed-corresponding search range information 202 input from the foot placement planning unit 106

As illustrated in FIG. 19, the three-dimensional point cloud (PC) output region determination unit 152 of the three-dimensional point cloud (PC) retransformation unit 105 inputs these two pieces of data, generates the three-dimensional point cloud output region selection information 162, and outputs the generated three-dimensional point cloud output region selection information 162 to the three-dimensional point cloud (PC) output region selection unit 153.

Specific examples of the following input data to the three-dimensional point cloud (PC) output region determination unit 152 and the following generation data will be described with reference to FIG. 20.
 (Input data 1) target speed information 201 input from the robot control unit 107
 (Input data 2) speed-corresponding search range information 202 input from the foot placement planning unit 106 (Generation data) three-dimensional point cloud output region selection information 162

Figure 20:
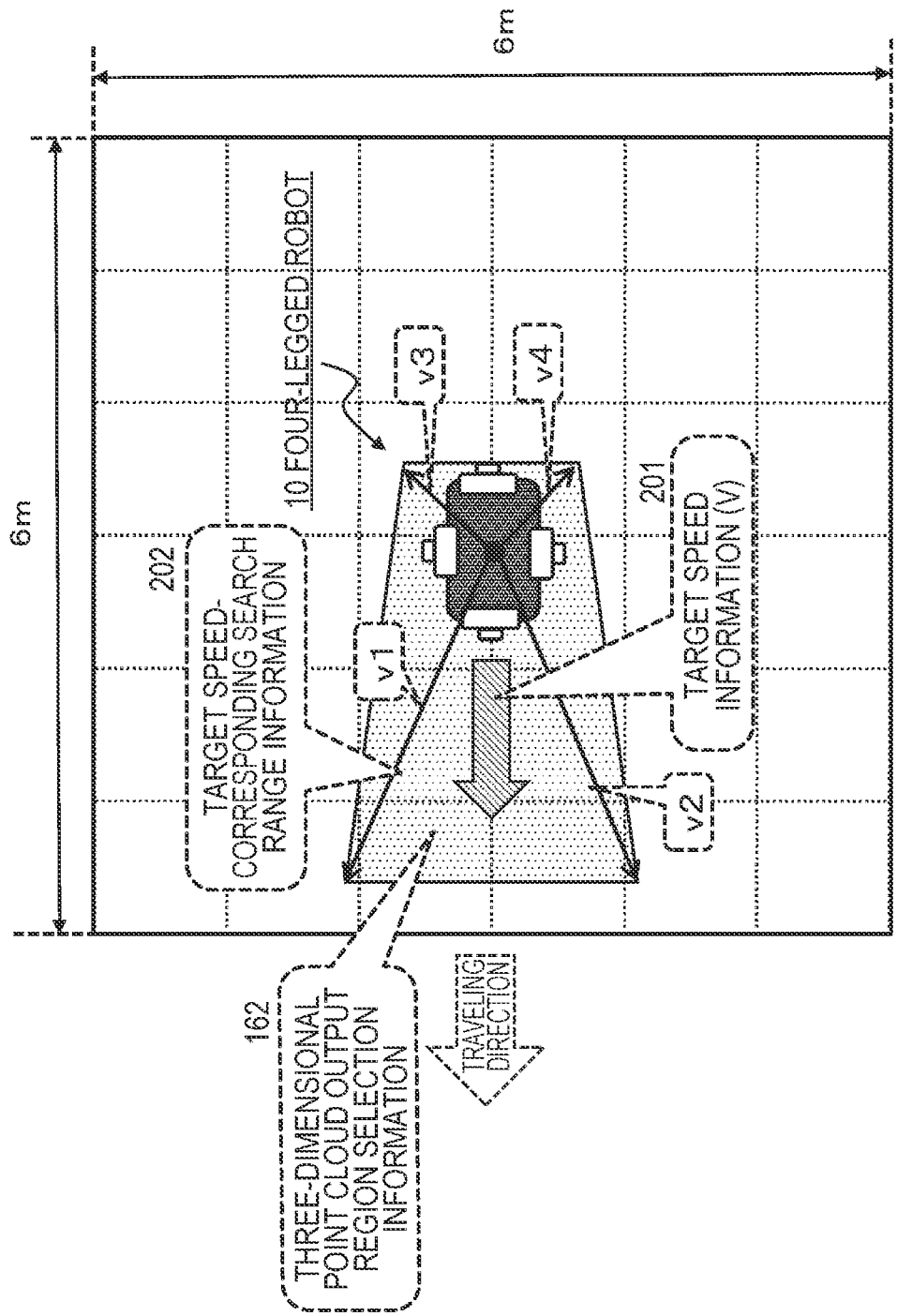
FIG. 20 is a diagram for explaining processing executed by a three-dimensional point cloud (PC) retransformation unit.

The target speed information (V) 201 illustrated in FIG. 20 is input from the robot control unit 107.

The storage unit of the robot stores a moving destination of the robot determined in advance, a basic movement route set on the basis of the destination, and a target moving speed. The robot control unit 107 uses the information stored in the storage unit, the current position information of the robot, and the like to determine a target speed of the robot for the robot to travel toward the destination.

FIG. 20 illustrates a specific example of the target speed information (V) 201 determined by the robot control unit 107.

Note that, the target speed information (V) 201 is vector (V) information having moving speed information and moving direction information of the robot.

Note that the target speed information (V) 201 illustrated in FIG. 20 is merely a vector indicating a target speed and direction, and for example, in a case where there is an obstacle in the vector (V) direction indicated by the target speed information (V) 201 in FIG. 20, or in a case where there is a traveling road with ruggedness or severe inclination, control is performed such that the direction is avoided, and a foot is placed in a flat region in the vicinity.

The information defining the search region in the case of searching for a region where the stable grounding of the foot is possible in this manner is another information input by the three-dimensional point cloud (PC) output region determination unit 152, that is, "(input data 2) speed-corresponding search range information 202 input from the foot placement planning unit 106".

The foot placement planning unit 106 determines a search range according to the target speed according to the target speed information (V) 201 determined by the robot control unit 107, and inputs this determination information as the speed-corresponding search range information 202 to the three-dimensional point cloud (PC) output region determination unit 152.

The foot placement planning unit 106 determines a search range according to a vector length and a direction indicated by the target speed information 201 calculated by the robot control unit 107, and inputs this determination information as the speed-corresponding search range information 202 to the three-dimensional point cloud (PC) output region determination unit 152.

The speed-corresponding search range information 202 illustrated in FIG. 20 is an example of this, and includes four vectors v1 to v4 extending from the barycentric position of the four-legged robot 10.

The foot placement planning unit 106 generates, for example, speed-corresponding search range information 202 including four vectors v1 to v4 extending from the barycentric position of the four-legged robot 10, and outputs the speed-corresponding search range information to the three-dimensional point cloud (PC) search region determination unit 152.

The three-dimensional point cloud (PC) output region determination unit 152 generates the "three-dimensional point cloud output region selection information 162" on the basis of two pieces of input data.
 (Input data 1) target speed information 201 input from the robot control unit 107
 (Input data 2) speed-corresponding search range information 202 input from the foot placement planning unit 106

FIG. 20 illustrates a specific example of the "three-dimensional point cloud output region selection information 162".

As illustrated in FIG. 20, the three-dimensional point cloud (PC) output region determination unit 152 determines a rectangular region connecting end points of four vectors (v1 to v4) of the speed-corresponding search range information 202 input from the foot placement planning unit 106 as "three-dimensional point cloud output region selection information 162".

As illustrated in FIG. 20, the three-dimensional point cloud (PC) output region determination unit 152 outputs the determined "three-dimensional point cloud output region selection information 162" to the three-dimensional point cloud (PC) output region selection unit 153.

The three-dimensional point cloud (PC) output region selection unit 153 receives inputs of the following data.

(1) "Three-dimensional point cloud retransformation data 161" generated by the three-dimensional point cloud (PC) retransformation processing execution unit 151

(2) "Three-dimensional point cloud output region selection information 162" determined by the three-dimensional point cloud (PC) output region determination unit 152

The three-dimensional point cloud (PC) output region selection unit 153 generates "target speed-corresponding region-limited three-dimensional point cloud (PC) data 220" on the basis of these pieces of input data and outputs the data to the foot placement planning unit 106.

Figure 21:
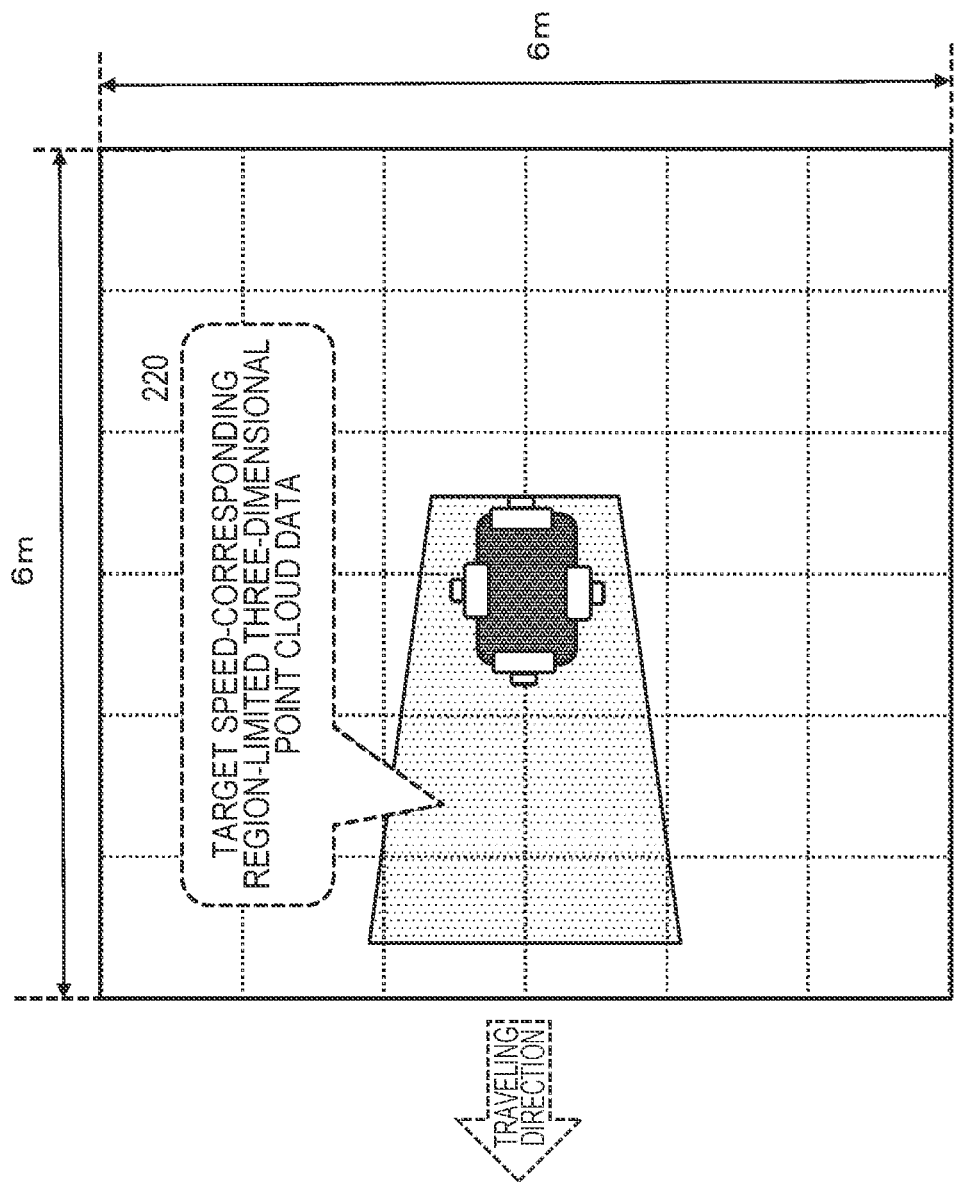
FIG. 21 is a diagram for explaining processing executed by a three-dimensional point cloud (PC) retransformation unit.

Specifically, "target speed-corresponding region-limited three-dimensional point cloud (PC) data 220" as illustrated in FIG. 21 is generated and output to the foot placement planning unit 106.

The "target speed-corresponding region-limited three-dimensional point cloud (PC) data 220" illustrated in FIG. 21 corresponds to a rectangular region connecting the end points of the four vectors (v1 to v4) of the speed-corresponding search range information 202 input from the foot placement planning unit 106 described with reference to FIG. 20.

The foot placement planning unit 106 performs processing of searching for a stable foot installable position using a region defined by the "target speed-corresponding region-limited three-dimensional point cloud (PC) data 220" as a search range.

As described above, the three-dimensional point cloud (PC) retransformation processing execution unit 105 of the data processing unit 200 of the moving apparatus of the present embodiment selects a generation target region of the shape data (three-dimensional point cloud data) including the traveling surface of the moving apparatus on the basis of the target speed information 201 which is the target movement route information of the moving apparatus and the search range information 202, generates three-dimensional point cloud data of the selection region selected, and outputs the three-dimensional point cloud data to the foot placement planning unit 106.

The foot placement planning unit 106 refers to the three-dimensional point cloud data in the selection region input from the three-dimensional point cloud (PC) retransformation processing execution unit 105 to determine the movement route and the moving direction of the moving apparatus.

FIGS. 22A and 22B illustrate a comparative example of the processing data necessary for the determination of the foot placement position by the foot placement planning unit 106.

FIG. 22A Output data to the conventional foot placement planning unit

FIG. 22B Output data to the foot placement planning unit in a case where the configuration of the second embodiment of the present disclosure is applied In the conventional processing FIG. 22A, three-dimensional point cloud (PC) data of about 1.5 million points in the rectangular region of 6 m×6 m described above with reference to FIG. 6 is output to the foot placement planning unit 106.

On the other hand, in the processing FIG. 22B according to the second embodiment of the present disclosure, the three-dimensional point cloud (PC) data of only the "target speed-corresponding region-limited three-dimensional point cloud (PC) data 220" described above with reference to FIG. 21 is output to the foot placement planning unit 106.

By using the data illustrated in FIG. 22B, the data processing amount in the foot placement planning unit 106 and the memory capacity required for storing the three-dimensional point cloud data can be greatly reduced. As a result, the processing cost and the hardware cost can be greatly reduced, and the stable and high-speed robot movement can be realized without reducing the moving speed of the robot.

Note that, in the second embodiment, the target speed-corresponding region-limited three-dimensional point cloud (PC) data 220 is generated according to the target speed of the robot, and a course on which stable movement is possible is determined using the generated target speed-corresponding region-limited three-dimensional point cloud (PC) data 220.

Figure 23:
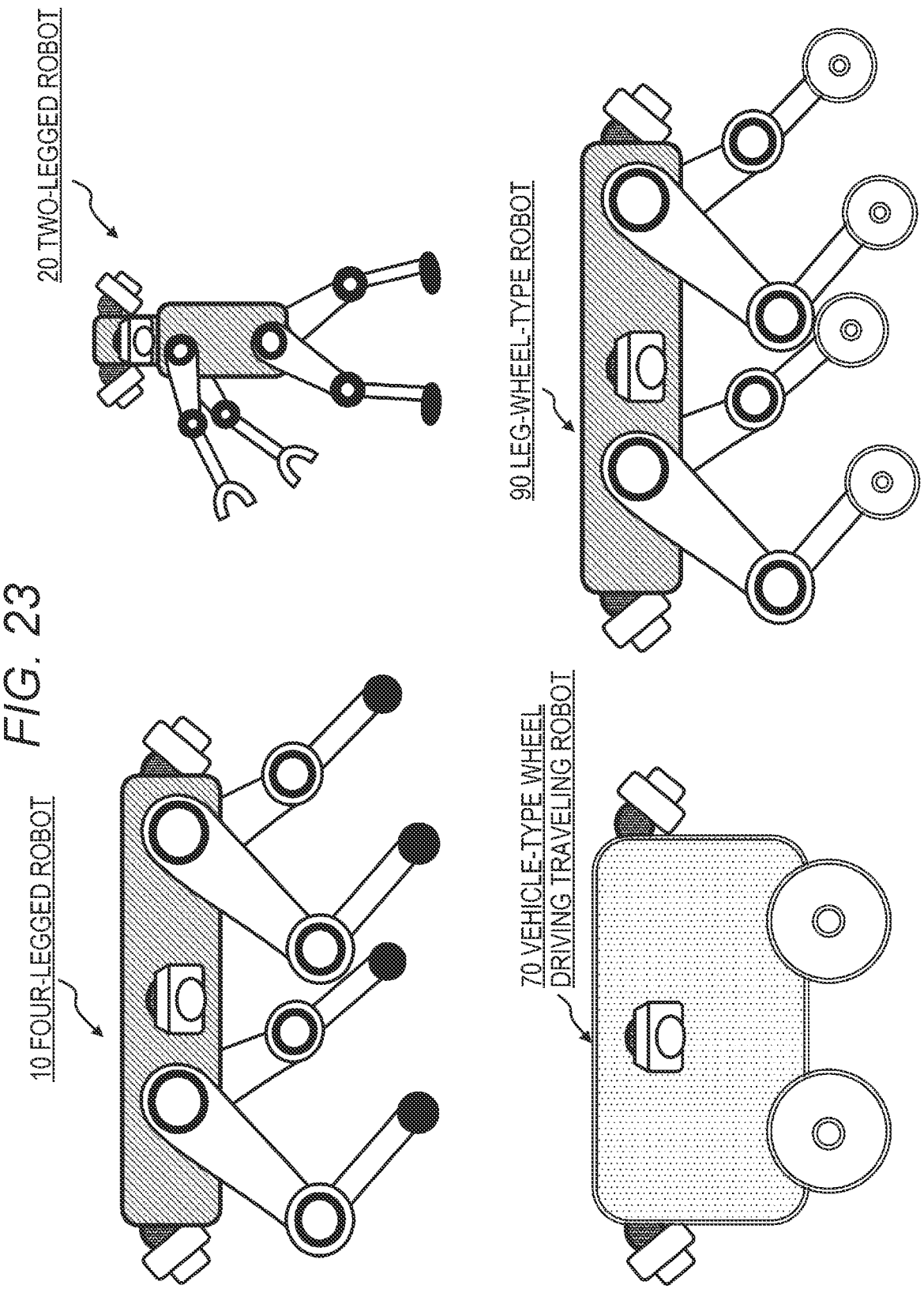
FIG. 23 is a diagram for explaining an example of the moving apparatus according to the second embodiment of the present disclosure.

Therefore, it is not limited to a walking type robot such as the four-legged robot illustrated in FIG. 1 or the two-legged robot illustrated in FIG. 2, and can also be applied to, for example, a traveling robot such as the vehicle-type wheel driving traveling robot 70 illustrated in FIG. 23, or the leg-wheel-type robot 90 having a wheel on a foot, which is a hybrid of the walking type robot and the vehicle-type wheel driving robot 80.

In addition, it can also be applied to a caterpillar driving type traveling robot and the like.

Furthermore, the configuration of the three-dimensional point cloud (PC) retransformation unit 105 of the present second embodiment can also be modified in a similar manner to the one described above as the modification of the first embodiment.

This modification will be described with reference to FIGS. 24 and 25.

Figure 24:
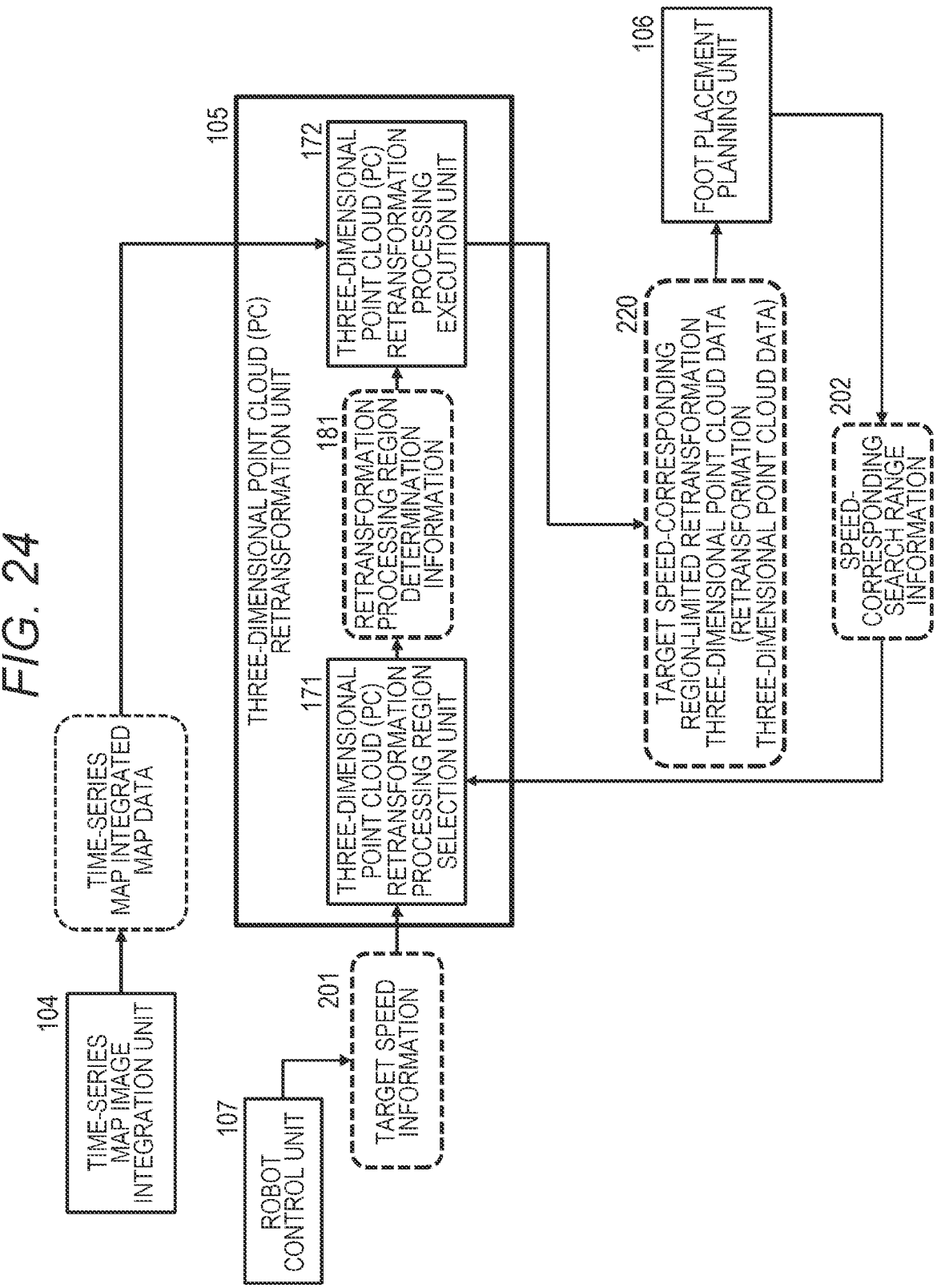
FIG. 24 is a diagram for explaining a configuration and processing of a three-dimensional point cloud (PC) retransformation unit according to the second embodiment of the present disclosure.

The three-dimensional point cloud (PC) retransformation unit 105 illustrated in FIG. 24 includes the three-dimensional point cloud (PC) retransformation processing region determination unit 171 and the three-dimensional point cloud (PC) retransformation processing execution unit 172.

The three-dimensional point cloud (PC) retransformation processing region determination unit 171 inputs the following two pieces of data.

(1) Target speed information 201 input from the robot control unit 107

(2) Speed-corresponding search range information 202 input from the foot placement planning unit 106

"(1) Target speed information 201 input from the robot control unit 107" is target speed information of the robot for the robot to move toward the destination as described above with reference to FIG. 20.

"(2) Speed-corresponding search range information 202 input from the foot placement planning unit 106" is search range information determined according to the robot target speed determined by the robot control unit 107, for example, as described above with reference to FIG. 20.

As illustrated in FIG. 24, the three-dimensional point cloud (PC) retransformation processing region determination unit 171 receives the target speed information 201 and the speed-corresponding search range information 202, determines a region to be subjected to the three-dimensional point cloud (PC) retransformation processing, and outputs the determination information as "retransformation processing region determination information 181" to the three-dimensional point cloud (PC) retransformation processing execution unit 172.

The "retransformation processing region determination information 181" generated by the three-dimensional point cloud (PC) retransformation processing region determination unit 171 on the basis of the two pieces of data is, for example, information indicating the same region as the three-dimensional point cloud output region selection information 162 described above with reference to FIG. 20.

As illustrated in FIG. 24, the three-dimensional point cloud (PC) retransformation processing region determination unit 171 outputs the generated "retransformation processing region determination information 181" to the three-dimensional point cloud (PC) retransformation processing execution unit 172.

The three-dimensional point cloud (PC) retransformation processing execution unit 172 inputs the following two pieces of data.
- (1) One piece of time-series map integrated map data generated by the time-series map image integration unit 104
- (2) Retransformation processing region determination information 181 generated by the three-dimensional point cloud (PC) retransformation processing region determination unit 171

As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

The three-dimensional point cloud (PC) retransformation processing execution unit 172 selects a region corresponding to the "retransformation processing region determination information 181" generated by the three-dimensional point cloud (PC) retransformation processing region determination unit 171 from the map data, and generates three-dimensional point cloud (PC) data of only the selection region.

The three-dimensional point cloud (PC) data generated by the three-dimensional point cloud (PC) retransformation processing execution unit 172 is similar data to the target speed-corresponding region-limited three-dimensional point cloud data 220 described above with reference to FIG. 21.

The three-dimensional point cloud (PC) retransformation processing execution unit 172 outputs the target speed-corresponding region-limited three-dimensional point cloud data 220, which is the generated three-dimensional point cloud (PC) data of the limited region, to the foot placement planning unit 106.

The three-dimensional point cloud (PC) retransformation unit 105 illustrated in FIG. 19 described in the second embodiment above first generates three-dimensional point cloud (PC) data for the entire region of one piece of time-series map integrated map data generated by the time-series map image integration unit 104. Thereafter, the processing is performed in the order of selecting only the data of the target speed-corresponding region from the generated three-dimensional point cloud (PC) data.

On the other hand, the three-dimensional point cloud (PC) retransformation unit 105 illustrated in FIG. 24 first specifies the target speed-corresponding region, and then generates the three-dimensional point cloud (PC) data only for the target speed-corresponding region of one piece of time-series map integrated map data generated by the time-series map image integration unit 104.

Therefore, there is an advantage that the processing amount of the three-dimensional point cloud (PC) data generation processing from the time-series map integrated map data by the three-dimensional point cloud (PC) retransformation unit 105 illustrated in FIG. 24 is reduced, and high-speed processing can be performed.

Furthermore, another modification of the three-dimensional point cloud (PC) retransformation unit 105 will be described with reference to FIG. 25.

Figure 25:
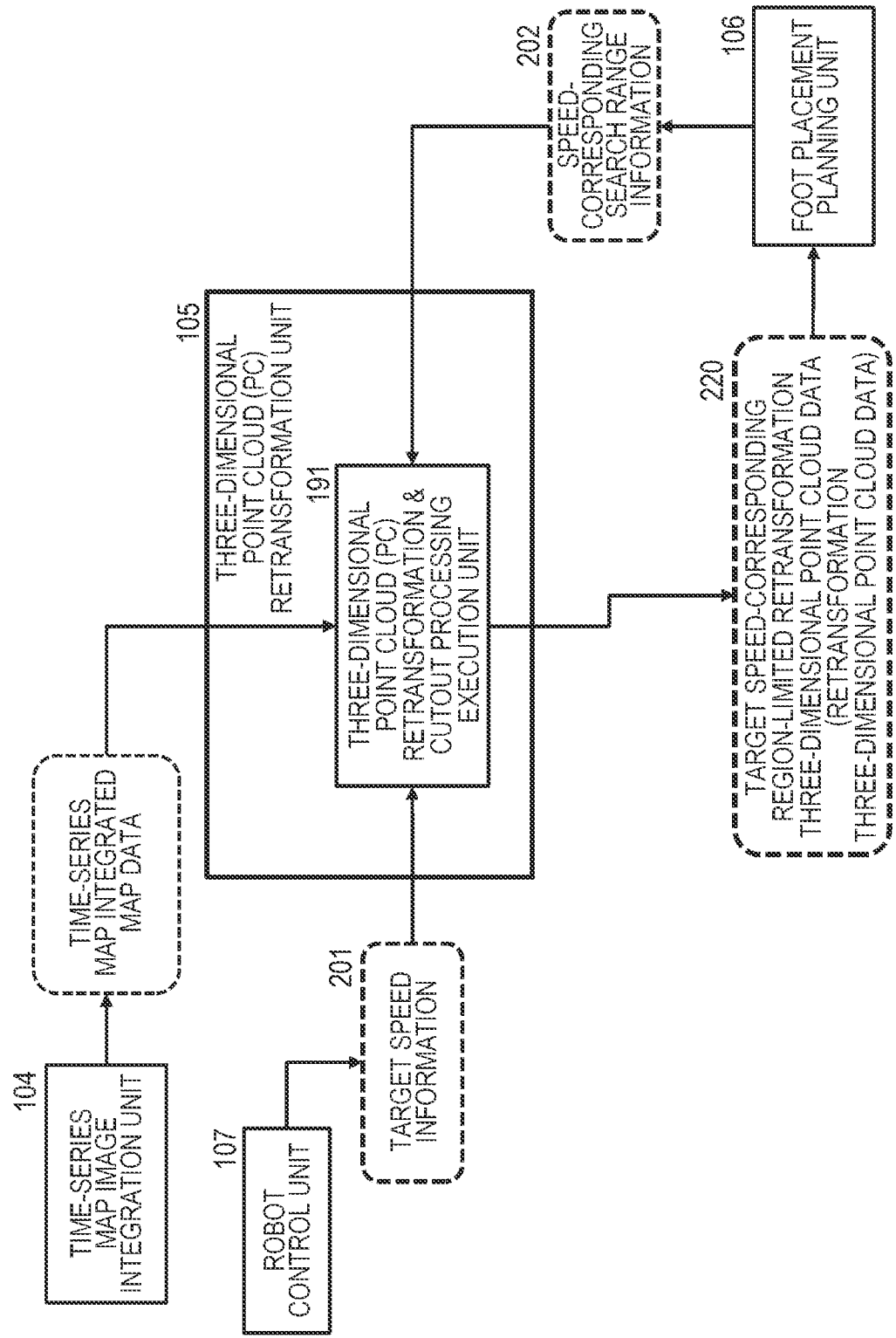
FIG. 25 is a diagram for explaining a configuration and processing of a three-dimensional point cloud (PC) retransformation unit according to the second embodiment of the present disclosure.

The three-dimensional point cloud (PC) retransformation unit 105 illustrated in FIG. 25 includes a three-dimensional point cloud (PC) retransformation & output region cutout processing execution unit 191.

The three-dimensional point cloud (PC) retransformation & output region cutout processing execution unit 191 inputs the following three pieces of data.
- (1) One piece of time-series map integrated map data generated by the time-series map image integration unit 104
- (2) Target speed information 201 input from the robot control unit 107
- (3) Speed-corresponding search range information 202 input from the foot placement planning unit 106

As described above, one piece of time-series map integrated map data generated by the time-series map image integration unit 104 is a 2.5 dimensional map such as a height map, and is map data including three-dimensional positions of almost all objects around the robot by applying distance images captured at a plurality of different times.

The three-dimensional point cloud (PC) retransformation & output region cutout processing execution unit 191 first generates three-dimensional point cloud (PC) data of the entire region of one piece of time-series map integrated map data generated by the time-series map image integration unit 104.

Thereafter, the three-dimensional point cloud data of only the region defined by the target speed information 201 and the speed-corresponding search range information 202, that is, the peripheral region of the target foot placement position is cut out.

The three-dimensional point cloud data cut out last, that is, the target speed-corresponding region-limited three-dimensional point cloud data 220 illustrated in FIG. 25 is output to the foot placement planning unit 106.

The target speed-corresponding region-limited three-dimensional point cloud data 220 illustrated in FIG. 25 is the target speed-corresponding region-limited three-dimensional point cloud data 220 of the limited region illustrated in FIGS. 22A and 22B, similarly to the target speed-corresponding region-limited three-dimensional point cloud data 220 illustrated in FIG. 19 of the second embodiment or FIG. 24 which is the modification example described above.

In this modification, one processing unit, that is, the three-dimensional point cloud (PC) retransformation & output region cutout processing execution unit 191 illustrated in FIG. 25 is configured to perform generation of three-dimensional point cloud data and cutout processing of output data.

As described above, various different types of configurations and processing are possible for the configuration and processing of the three-dimensional point cloud (PC) retransformation unit 105.

5. (Third Embodiment) Details of Moving Apparatus and Moving Apparatus Control Method of Third Embodiment of Present Disclosure Next, details of a moving apparatus and a moving apparatus control method according to a third embodiment of the present disclosure will be described.

Figure 26:
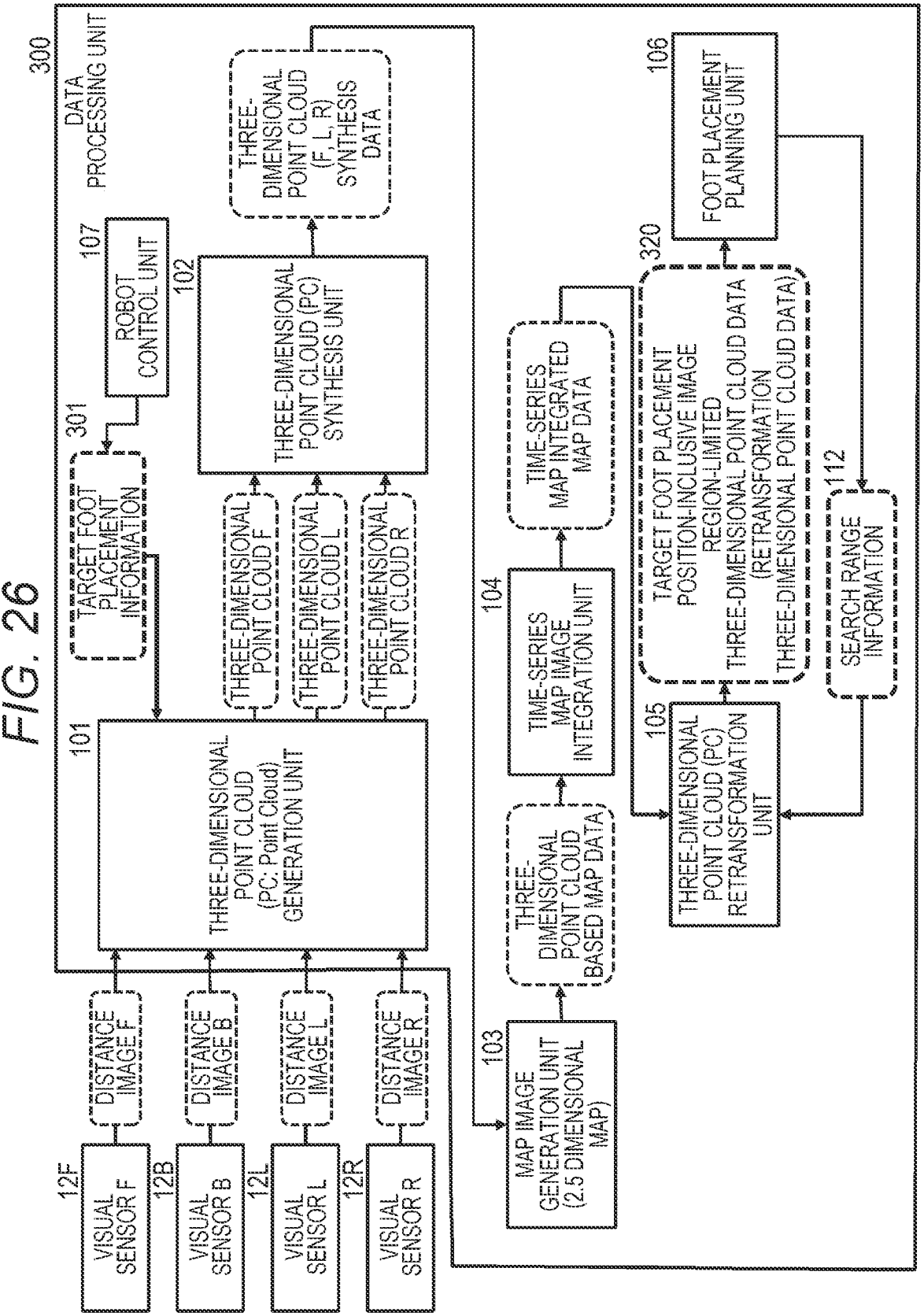
FIG. 26 is a diagram for explaining a configuration and processing of a moving apparatus according to a third embodiment of the present disclosure.

FIG. 26 is a diagram for explaining a configuration and processing of a moving apparatus according to the third embodiment of the present disclosure.

As described with reference to FIG. 4 and the like, the first embodiment described above is configured such that the target foot placement information 111 is input from the robot control unit 107 to the three-dimensional point cloud (PC) retransformation unit 105, only the peripheral region of the target foot placement position is selected in the three-dimensional point cloud (PC) retransformation unit 105, and the target foot placement position peripheral region-limited three-dimensional point cloud data 120 is generated and output to the foot placement planning unit 106.

As illustrated in FIG. 26, the third embodiment described below has a configuration in which target foot placement information 301 from the robot control unit 107 is input to the three-dimensional point cloud (PC) generation unit 101.

In the present third embodiment, the three-dimensional point cloud (PC) generation unit 101 controls output data to the next-stage three-dimensional point cloud (PC) synthesis unit 102 on the basis of the target foot placement information 301.

A detailed configuration and processing of the three-dimensional point cloud (PC) generation unit 101 in the moving apparatus of the present third embodiment will be described with reference to FIG. 27.

Figure 27:
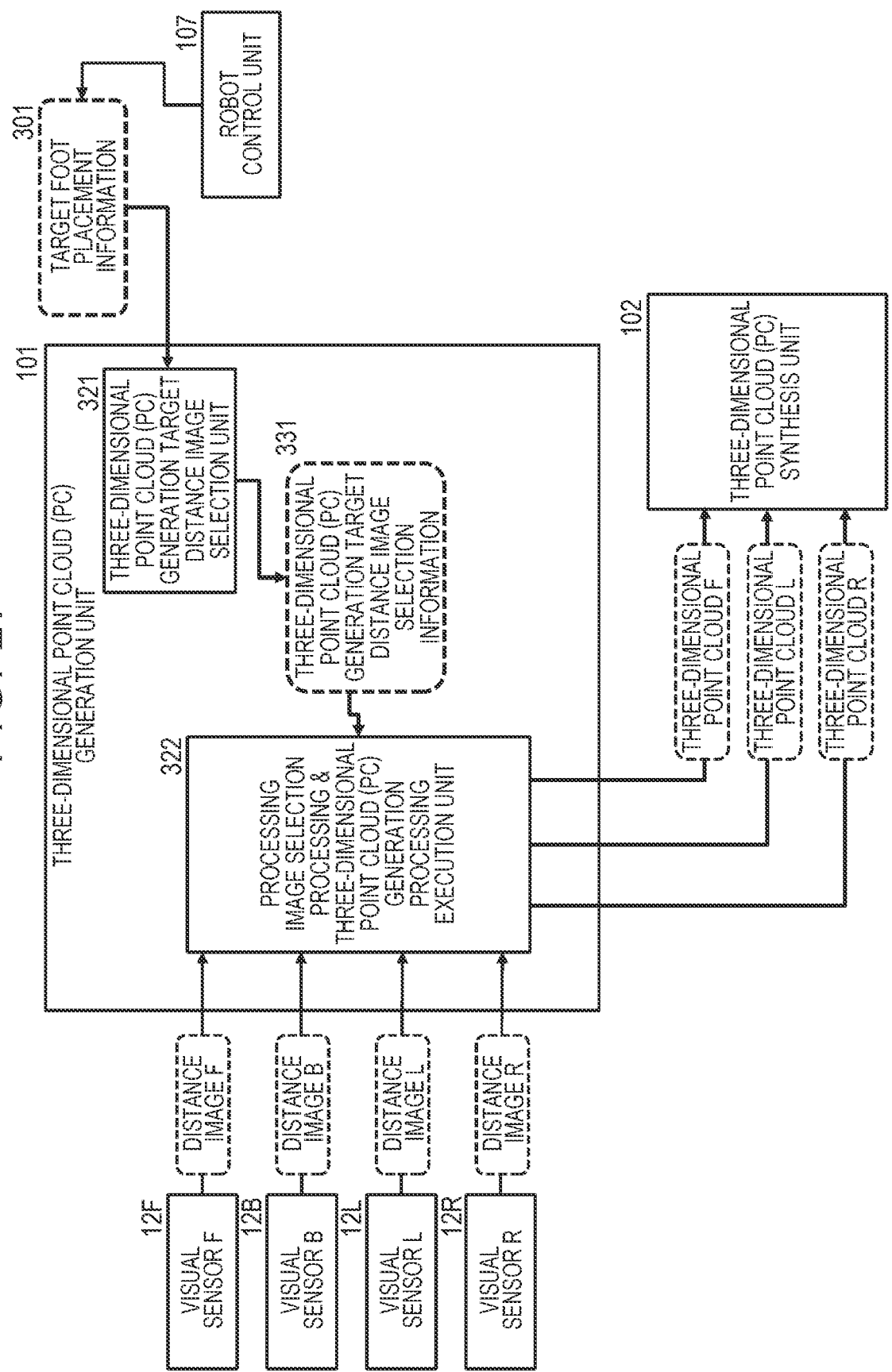
FIG. 27 is a diagram for explaining a configuration and processing of a three-dimensional point cloud (PC) generation unit according to the third embodiment of the present disclosure.

As illustrated in FIG. 27, the three-dimensional point cloud (PC) generation unit 101 in the moving apparatus of the present third embodiment includes a three-dimensional point cloud (PC) generation target distance image selection unit 321 and a processing image selection processing & three-dimensional point cloud (PC) generation processing execution unit 322.

The three-dimensional point cloud (PC) generation target distance image selection unit 321 receives the target foot placement information 301 from the robot control unit 107, and generates three-dimensional point cloud (PC) generation target distance image selection information 331.

A detailed specific example of processing executed by the three-dimensional point cloud (PC) generation target distance image selection unit 321 will be described with reference to FIG. 28.

Figure 28:
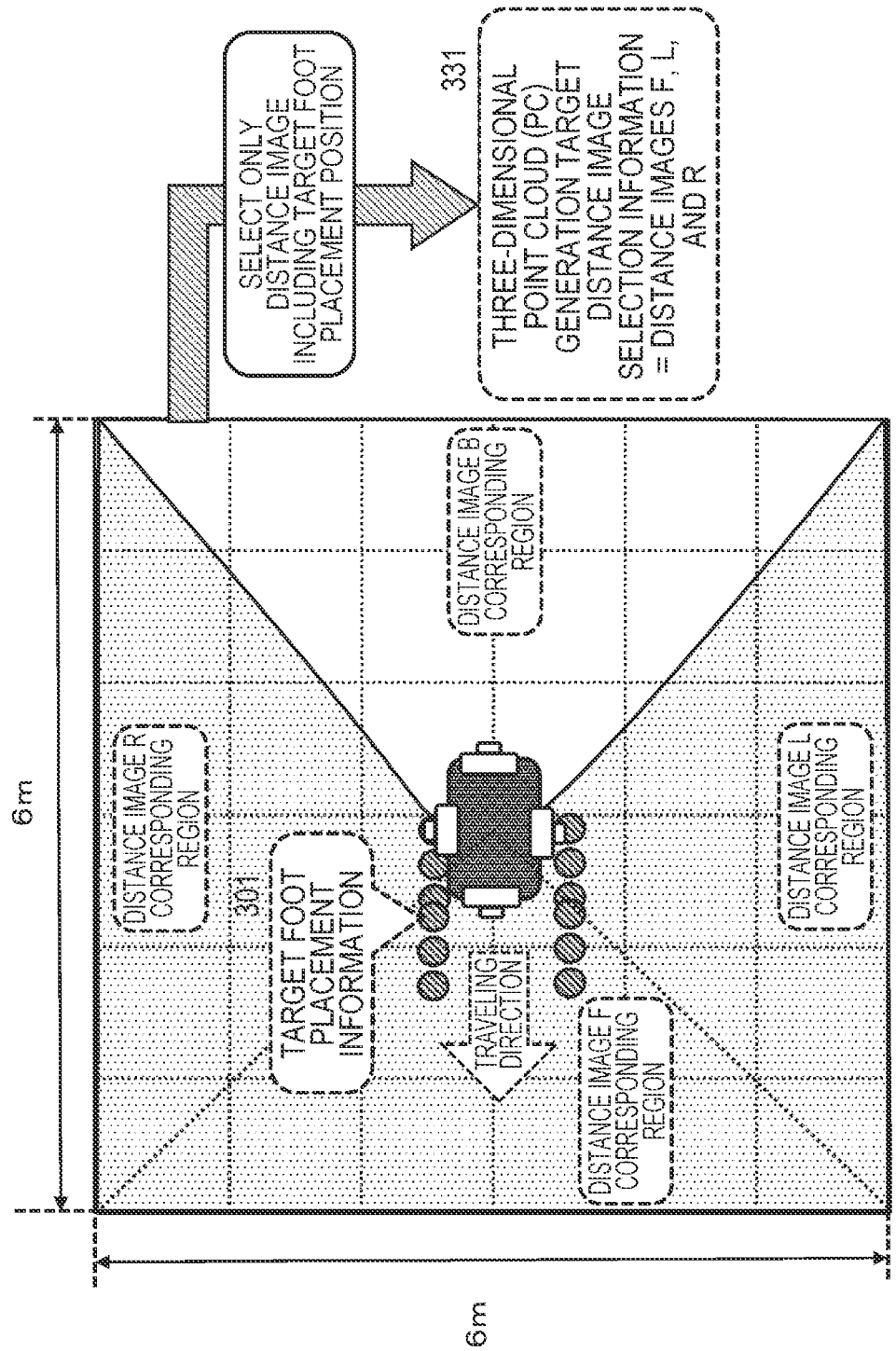
FIG. 28 is a diagram for explaining processing executed by a three-dimensional point cloud (PC) generation unit according to the third embodiment of the present disclosure.

FIG. 28 illustrates the target foot placement information 301 input from the robot control unit 107 by the three-dimensional point cloud (PC) generation target distance image selection unit 321.

In this example, as described above with reference to FIG. 7 in the first embodiment, assuming that the robot control unit 107 outputs the target foot placement information 301 for three steps of the four-legged robot 10 to the three-dimensional point cloud (PC) generation target distance image selection unit 321, FIG. 28 illustrates the target foot placement information 301 for three steps of the four-legged robot 10.

The three-dimensional point cloud (PC) generation target distance image selection unit 321 selects only the distance image including the foot placement position indicated by the target foot placement information 301, and sets the selection information of the distance image as "three-dimensional point cloud (PC) generation target distance image selection information 331".

That is, the distance image not including the foot placement position indicated by the target foot placement information 301 is excluded from the selection target, and the "three-dimensional point cloud (PC) generation target distance image selection information 331" including only the distance image including the foot placement position is generated.

In the example illustrated in FIG. 28, only the distance images F, L, and R are selected, and the "three-dimensional point cloud (PC) generation target distance image selection information 331" is selection information of the distance images F, L, and R.

As illustrated in FIG. 27, the "three-dimensional point cloud (PC) generation target distance image selection information 331" generated by the three-dimensional point cloud (PC) generation target distance image selection unit 321 is input to the processing image selection processing & three-dimensional point cloud (PC) generation processing execution unit 322.

On the basis of the "three-dimensional point cloud (PC) generation target distance image selection information 331" input from the three-dimensional point cloud (PC) generation target distance image selection unit 321, the processing image selection processing & three-dimensional point cloud (PC) generation processing execution unit 322 selects a distance image for which the generation of the three-dimensional point cloud (PC) is to be executed, generates three-dimensional point cloud (PC) data only for the selected distance image, and outputs the three-dimensional point cloud (PC) data to the next-stage three-dimensional point cloud (PC) synthesis unit 102.

A specific example of processing executed by the processing image selection processing & three-dimensional point cloud (PC) generation processing execution unit 322 will be described with reference to FIG. 29.

Figure 29:
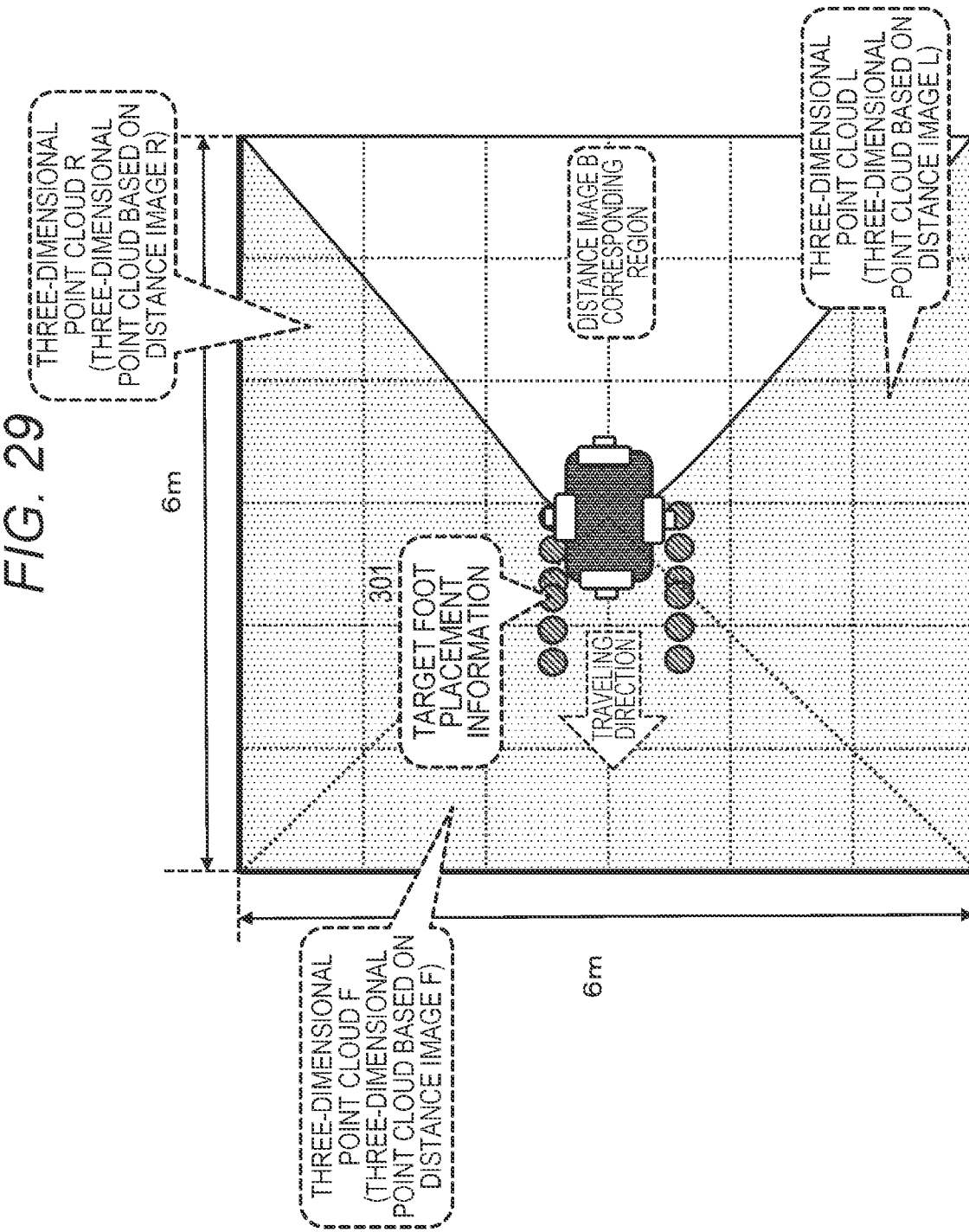
FIG. 29 is a diagram for explaining processing executed by a three-dimensional point cloud (PC) generation unit according to the third embodiment of the present disclosure.

The example illustrated in FIG. 29 is a specific example of processing in a case where the processing image selection processing & three-dimensional point cloud (PC) generation processing execution unit 322 inputs the selection information of the distance images F, L, and R according to the processing described with reference to FIG. 28 as the "three-dimensional point cloud (PC) generation target distance image selection information 331" from the three-dimensional point cloud (PC) generation target distance image selection unit 321.

In this case, the processing image selection processing & three-dimensional point cloud (PC) generation processing execution unit 322 first selects the distance images F, L, and R as the distance images for which the generation of the three-dimensional point cloud (PC) is to be executed on the basis of the "three-dimensional point cloud (PC) generation target distance image selection information 331" as the input data.

Next, the processing image selection processing & three-dimensional point cloud (PC) generation processing execution unit 322 generates three-dimensional point cloud (PC) data only for the selected distance images F, L, and R, and outputs the three-dimensional point cloud (PC) data to the next-stage three-dimensional point cloud (PC) synthesis unit 102.

These pieces of output data are the three-dimensional point cloud F, the three-dimensional point cloud L, and the three-dimensional point cloud R illustrated in FIGS. 26 and 27.

The processing units subsequent to the three-dimensional point cloud (PC) synthesis unit 102 execute processing for only data of the three-dimensional point cloud F, the three-dimensional point cloud L, and the three-dimensional point cloud R, or data generated from these pieces of point cloud data.

Therefore, the processing load in the processing units subsequent to the three-dimensional point cloud (PC) synthesis unit 102 is reduced as compared with the case of performing processing for all the data of the three-dimensional point clouds F, L, R, and B or data generated from all the data of these point cloud data.

Note that the processing executed in the three-dimensional point cloud (PC) synthesis unit 102 to the time-series map image integration unit 104 is processing similar to the processing in the first embodiment except that the processing target data is only reduced.

The three-dimensional point cloud (PC) retransformation unit 105 illustrated in FIG. 26 inputs time-series map integrated map data generated from each point cloud data of the three-dimensional point cloud F, the three-dimensional point cloud L, and the three-dimensional point cloud R, generates "target foot placement position-inclusive image region-limited three-dimensional point cloud data 320", and outputs the generated data to the foot placement planning unit 106.

Figure 30:
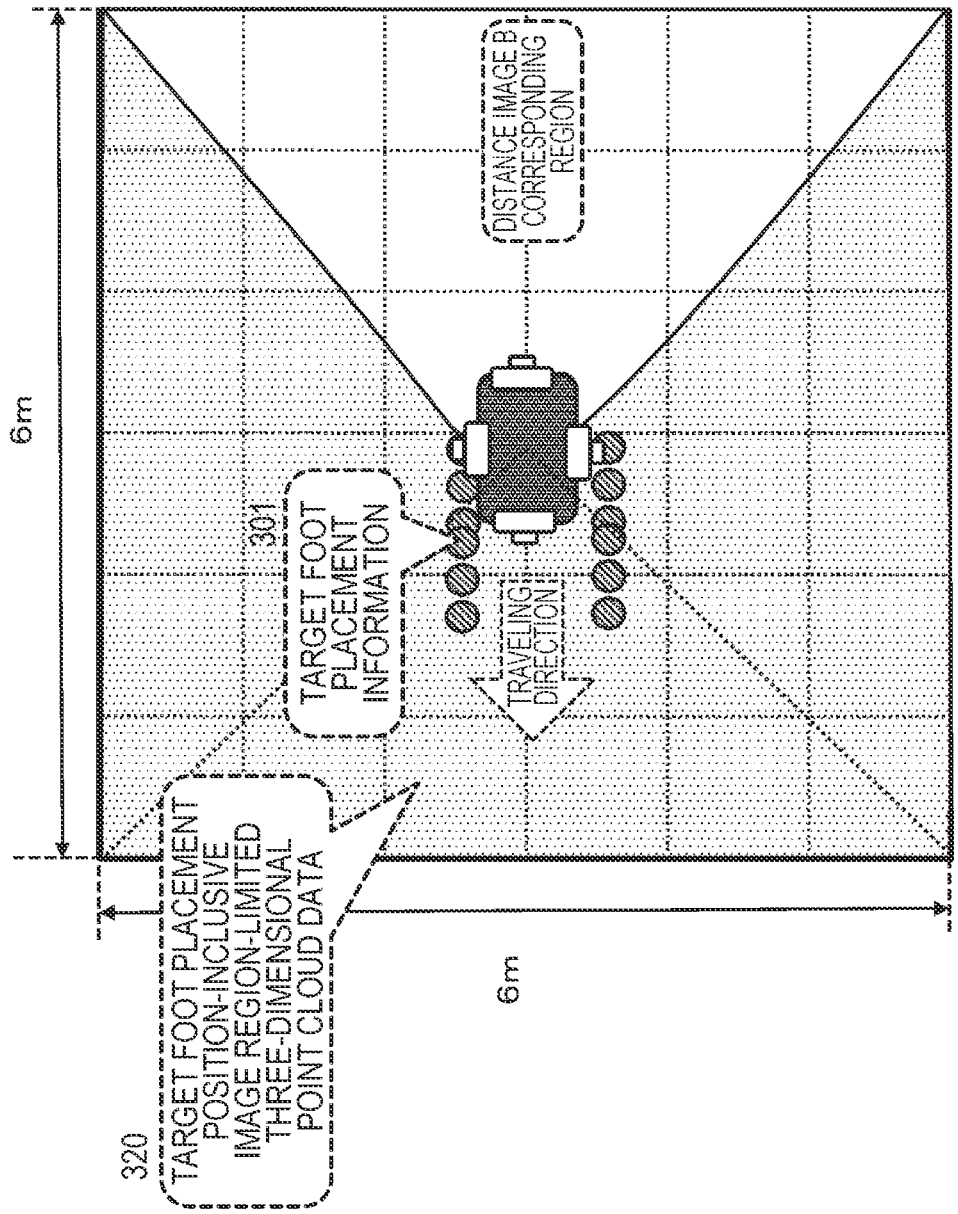
FIG. 30 is a diagram for explaining processing executed by a three-dimensional point cloud (PC) retransformation unit according to the third embodiment of the present disclosure.

FIG. 30 illustrates a specific example of "target foot placement position-inclusive image region-limited three-dimensional point cloud data 320" generated by the three-dimensional point cloud (PC) retransformation unit 105.

For example, as illustrated in FIG. 30, the "target foot placement position-inclusive image region-limited three-dimensional point cloud data 320" generated by the three-dimensional point cloud (PC) retransformation unit 105 is data generated from each point cloud data of the three-dimensional point clouds F, L, and R generated on the basis of the distance images F, L, and R.

The three-dimensional point cloud (PC) retransformation unit 105 outputs the "target foot placement position-inclusive image region-limited three-dimensional point cloud data 320" to the foot placement planning unit 106.

The foot placement planning unit 106 refers to "target foot placement position-inclusive image region-limited three-dimensional point cloud data 320" input from the three-dimensional point cloud (PC) retransformation unit 105, and determines the placement position of each foot of the four-legged robot 10. Specifically, for example, a position at which the robot can stably advance with less unevenness and inclination is determined as a foot placement position, and each foot is placed to advance the robot.

The data amount of the "target foot placement position-inclusive image region-limited three-dimensional point cloud data 320" is reduced from the data of 1.5 million points in the rectangular region of 6 m×6 m described above with reference to FIG. 6, and the foot placement planning unit 106 can quickly determine the placement position of each foot of the four-legged robot 10.

6. (Fourth Embodiment) Details of Moving Apparatus and Moving Apparatus Control Method of Fourth Embodiment of Present Disclosure Next, details of a moving apparatus and a moving apparatus control method according to a fourth embodiment of the present disclosure will be described.

Figure 31:
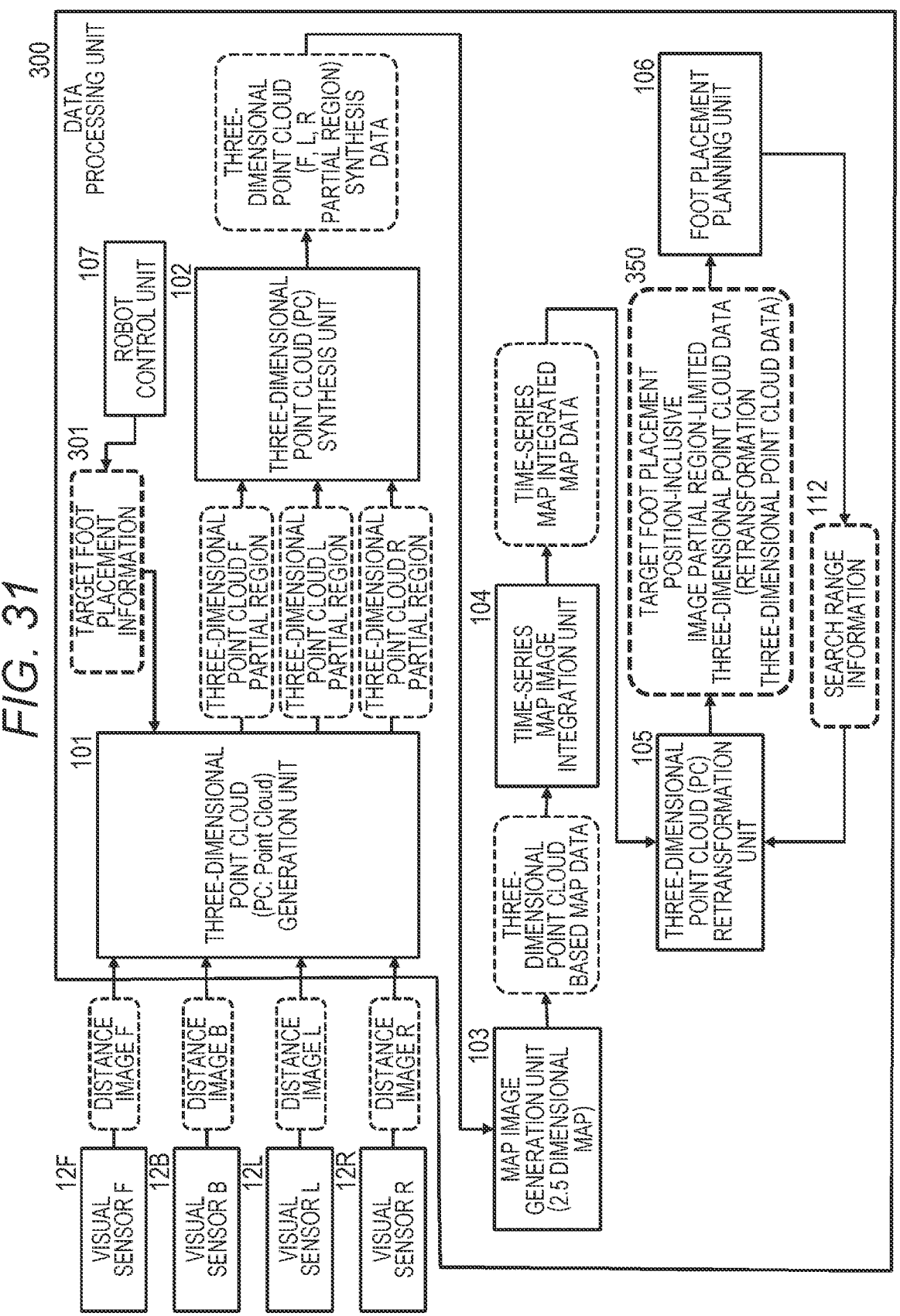
FIG. 31 is a diagram for explaining a configuration and processing of a moving apparatus according to a fourth embodiment of the present disclosure.

FIG. 31 is a diagram for explaining a configuration and processing of a moving apparatus according to the fourth embodiment of the present disclosure.

In the fourth embodiment, similarly to the third embodiment described above, as illustrated in FIG. 31, the target foot placement information 301 from the robot control unit 107 is input to the three-dimensional point cloud (PC) generation unit 101.

In the present fourth embodiment, similarly to the third embodiment described above, the three-dimensional point cloud (PC) generation unit 101 is configured to control output data to the next-stage three-dimensional point cloud (PC) synthesis unit 102 on the basis of the target foot placement information 301.

However, in the third embodiment described above, whether or not to generate the three-dimensional point cloud data is controlled in units of images of the four distance images F, L, R, and B, but in the present fourth embodiment, the three-dimensional point cloud data is generated by selecting a part of the image region of the distance image instead of the unit of the distance image.

A detailed configuration and processing of the three-dimensional point cloud (PC) generation unit 101 in the moving apparatus of the present fourth embodiment will be described with reference to FIG. 32.

Figure 32:
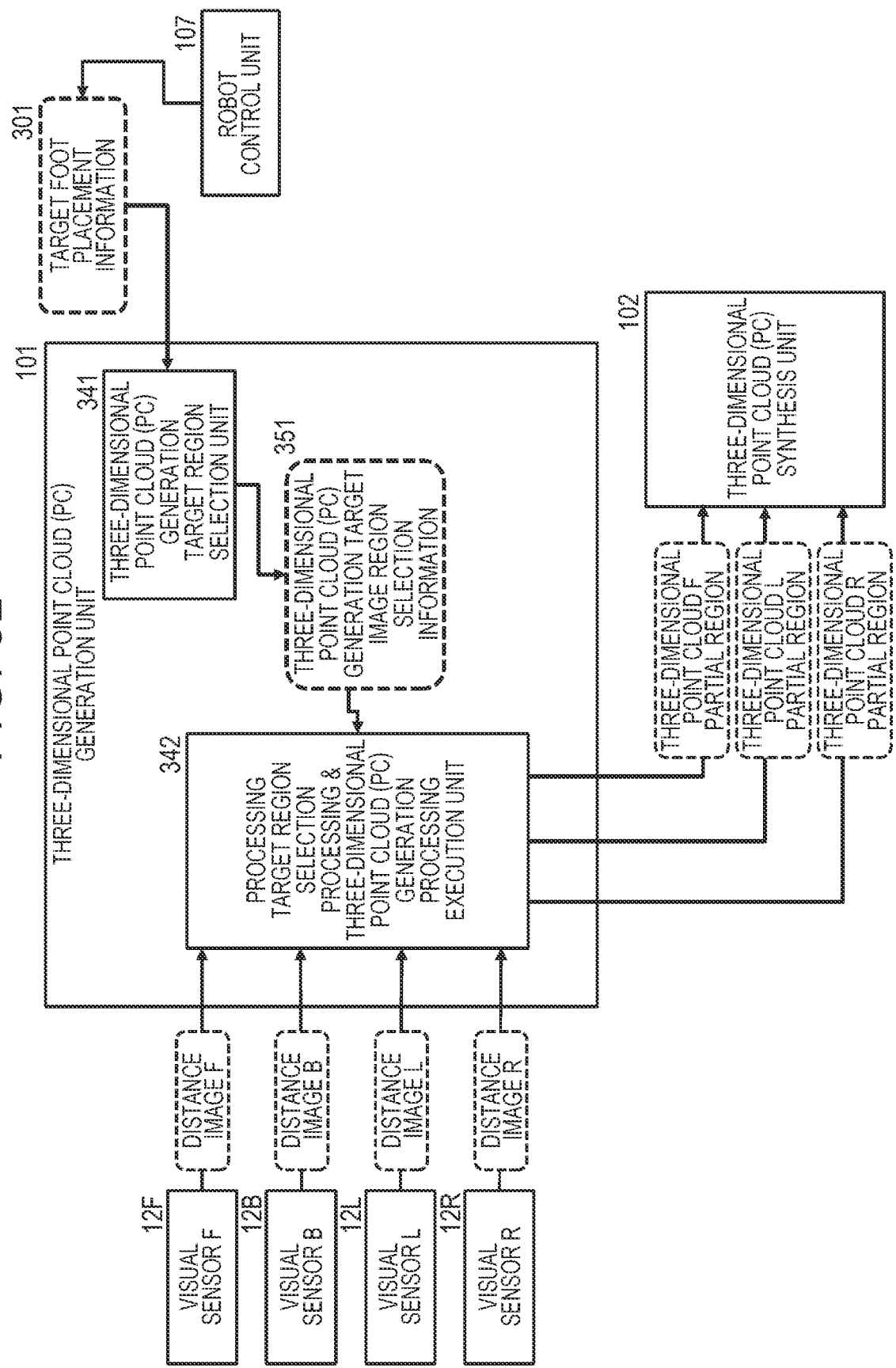
FIG. 32 is a diagram for explaining a configuration and processing of a three-dimensional point cloud (PC) generation unit according to the fourth embodiment of the present disclosure.

As illustrated in FIG. 32, the three-dimensional point cloud (PC) generation unit 101 in the moving apparatus of the present fourth embodiment includes a three-dimensional point cloud (PC) generation target region selection unit 341 and a processing target region selection processing & three-dimensional point cloud (PC) generation processing execution unit 342.

The three-dimensional point cloud (PC) generation target distance image selection unit 341 receives the target foot placement information 301 from the robot control unit 107, and generates three-dimensional point cloud (PC) generation target image region selection information 351.

A detailed specific example of processing executed by the three-dimensional point cloud (PC) generation target region selection unit 341 will be described with reference to FIG. 33.

Figure 33:
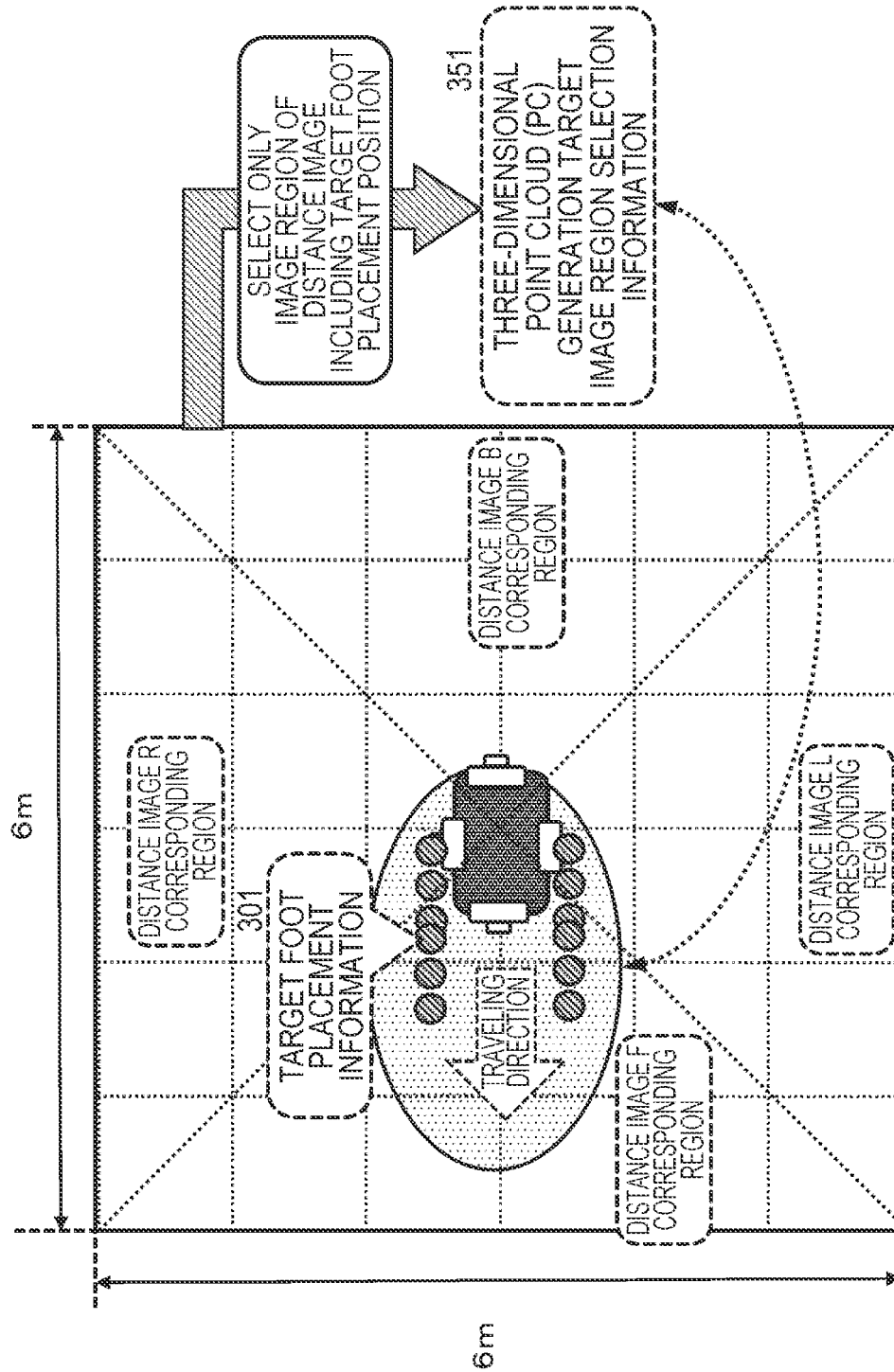
FIG. 33 is a diagram for explaining processing executed by a three-dimensional point cloud (PC) generation unit according to the fourth embodiment of the present disclosure.

FIG. 33 illustrates the target foot placement information 301 input from the robot control unit 107 by the three-dimensional point cloud (PC) generation target region selection unit 341.

In this example, as described above with reference to FIG. 7 in the first embodiment, assuming that the robot control unit 107 outputs the target foot placement information 301 for three steps of the four-legged robot 10 to the three-dimensional point cloud (PC) generation target region selection unit 341, FIG. 33 illustrates the target foot placement information 301 for three steps of the four-legged robot 10.

The three-dimensional point cloud (PC) generation target region selection unit 341 selects only a part of the image region in the distance image including the foot placement position indicated by the target foot placement information 301, and sets the selection information of the selected image region as "three-dimensional point cloud (PC) generation target image region selection information 351".

That is, the image region not including the foot placement position indicated by the target foot placement information 301 is excluded from the selection target, and the "three-dimensional point cloud (PC) generation target image region selection information 351" including only the image region including the foot placement position is generated.

In the example illustrated in FIG. 33, only the image region on the ellipse is selected as the "three-dimensional point cloud (PC) generation target image region selection information 351" as illustrated in the figure.

The "three-dimensional point cloud (PC) generation target image region selection information 351" is selection information of partial regions of the distance images F, L, and R.

As illustrated in FIG. 32, the "three-dimensional point cloud (PC) generation target image region selection information 351" generated by the three-dimensional point cloud (PC) generation target region selection unit 341 is input to the processing target region selection processing & three-dimensional point cloud (PC) generation processing execution unit 342.

On the basis of the "three-dimensional point cloud (PC) generation target image region selection information 351" input from the three-dimensional point cloud (PC) generation target region selection unit 341, the processing target region selection processing & three-dimensional point cloud (PC) generation processing execution unit 342 selects a partial region of the distance image for which the generation of the three-dimensional point cloud (PC) is executed, generates three-dimensional point cloud (PC) data only for the selected image region, that is, the elliptical region illustrated in FIG. 33, and outputs the three-dimensional point cloud (PC) data to the next-stage three-dimensional point cloud (PC) synthesis unit 102.

The point cloud data generated by the processing of the processing target region selection processing & three-dimensional point cloud (PC) generation processing execution unit 342 is the following point cloud data indicated as the output of the processing target region selection processing & three-dimensional point cloud (PC) generation processing execution unit 342 in FIGS. 31 and 32.

three-dimensional point cloud F partial region
three-dimensional point cloud L partial region
three-dimensional point cloud R partial region These pieces of three-dimensional point cloud data correspond to the three-dimensional point cloud data of the elliptical region illustrated in FIG. 33.

The three-dimensional point cloud (PC) data generated by the processing target region selection processing & three-dimensional point cloud (PC) generation processing execution unit 342 is output to the next-stage three-dimensional point cloud (PC) synthesis unit 102.

In the processing units subsequent to the three-dimensional point cloud (PC) synthesis unit 102, processing for only data of each of the three-dimensional point cloud F partial region, the three-dimensional point cloud L partial region, and the three-dimensional point cloud R partial region, or data generated from these pieces of point cloud data is executed.

Therefore, the processing load in the processing units subsequent to the three-dimensional point cloud (PC) synthesis unit 102 is reduced as compared with the case of performing processing for all the data of the three-dimensional point clouds F, L, R, and B or data generated from all the data of these point cloud data.

Note that the processing executed in the three-dimensional point cloud (PC) synthesis unit 102 to the time-series map image integration unit 104 is processing similar to the processing in the first embodiment except that the processing target data is only reduced.

The three-dimensional point cloud (PC) retransformation unit 105 illustrated in FIG. 31 inputs time-series map integrated map data generated from each point cloud data of the three-dimensional point cloud F partial region, the three-dimensional point cloud L partial region, and the three-dimensional point cloud R partial region, generates "target foot placement position peripheral region-limited three-dimensional point cloud data 350", and outputs the same to the foot placement planning unit 106.

Figure 34:
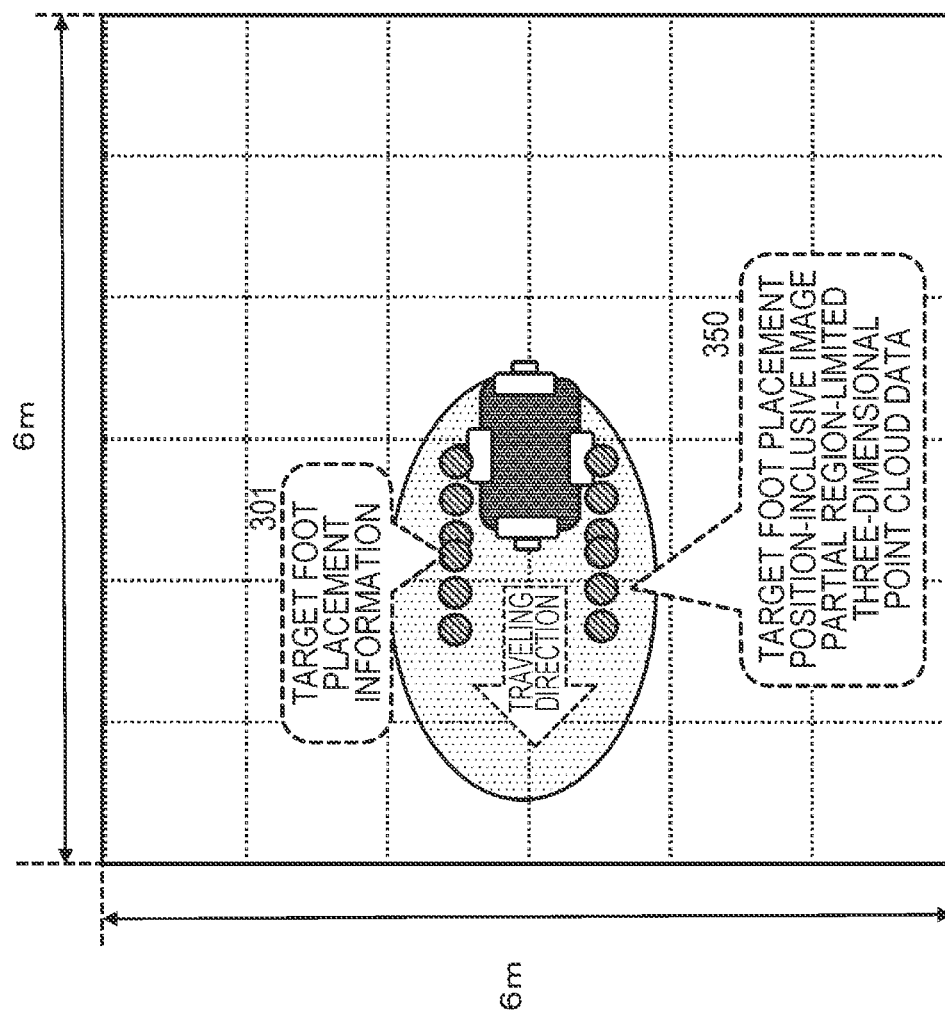
FIG. 34 is a diagram for explaining processing executed by a three-dimensional point cloud (PC) retransformation unit according to the fourth embodiment of the present disclosure.

FIG. 34 illustrates a specific example of "target foot placement position peripheral region-limited three-dimensional point cloud data 350" generated by the three-dimensional point cloud (PC) retransformation unit 105.

The "target foot placement position peripheral region-limited three-dimensional point cloud data 350" generated by the three-dimensional point cloud (PC) retransformation unit 105 is, for example, data generated on the basis of the point cloud data of the partial regions of the distance images F, L, and R as illustrated in FIG. 34.

The three-dimensional point cloud (PC) retransformation unit 105 outputs the "target foot placement position peripheral region-limited three-dimensional point cloud data 350" to the foot placement planning unit 106.

The foot placement planning unit 106 refers to "target foot placement position peripheral region-limited three-dimensional point cloud data 350" input from the three-dimensional point cloud (PC) retransformation unit 105 to determine the placement position of each foot of the four-legged robot 10. Specifically, for example, a position at which the robot can stably advance with less unevenness and inclination is determined as a foot placement position, and each foot is placed to advance the robot.

The data amount of the "target foot placement position peripheral region-limited three-dimensional point cloud data 350" is greatly reduced from the data of 1.5 million points in the rectangular region of 6 m×6 m described above with reference to FIG. 6, and the foot placement planning unit 106 can quickly determine the placement position of each foot of the four-legged robot 10.

7. (Fifth Embodiment) Details of Moving Apparatus and Moving Apparatus Control Method of Fifth Embodiment of Present Disclosure Next, details of a moving apparatus and a moving apparatus control method according to a fifth embodiment of the present disclosure will be described.

A fifth embodiment described below is an embodiment having a configuration in which the first embodiment and the third embodiment described above are combined.

As described with reference to FIG. 4 and the like, the first embodiment described above is configured such that the target foot placement information 111 is input from the robot control unit 107 to the three-dimensional point cloud (PC) retransformation unit 105, only the peripheral region of the target foot placement position is selected in the three-dimensional point cloud (PC) retransformation unit 105, and the target foot placement position peripheral region-limited three-dimensional point cloud data 120 is generated and output to the foot placement planning unit 106.

As described with reference to FIG. 26, the above-described the third embodiment has a configuration in which the target foot placement information 301 from the robot control unit 107 is input to the three-dimensional point cloud (PC) generation unit 101, only the distance image including the target foot placement position confirmed on the basis of the target foot placement information 301 is selected in the three-dimensional point cloud (PC) generation unit 101 to generate three-dimensional point cloud data, and the three-dimensional point cloud data is output to the next-stage three-dimensional point cloud (PC) synthesis unit 102.

The fifth embodiment executes these two processes in combination.

The configuration and processing of the present fifth embodiment will be described with reference to FIG. 35.

Figure 35:
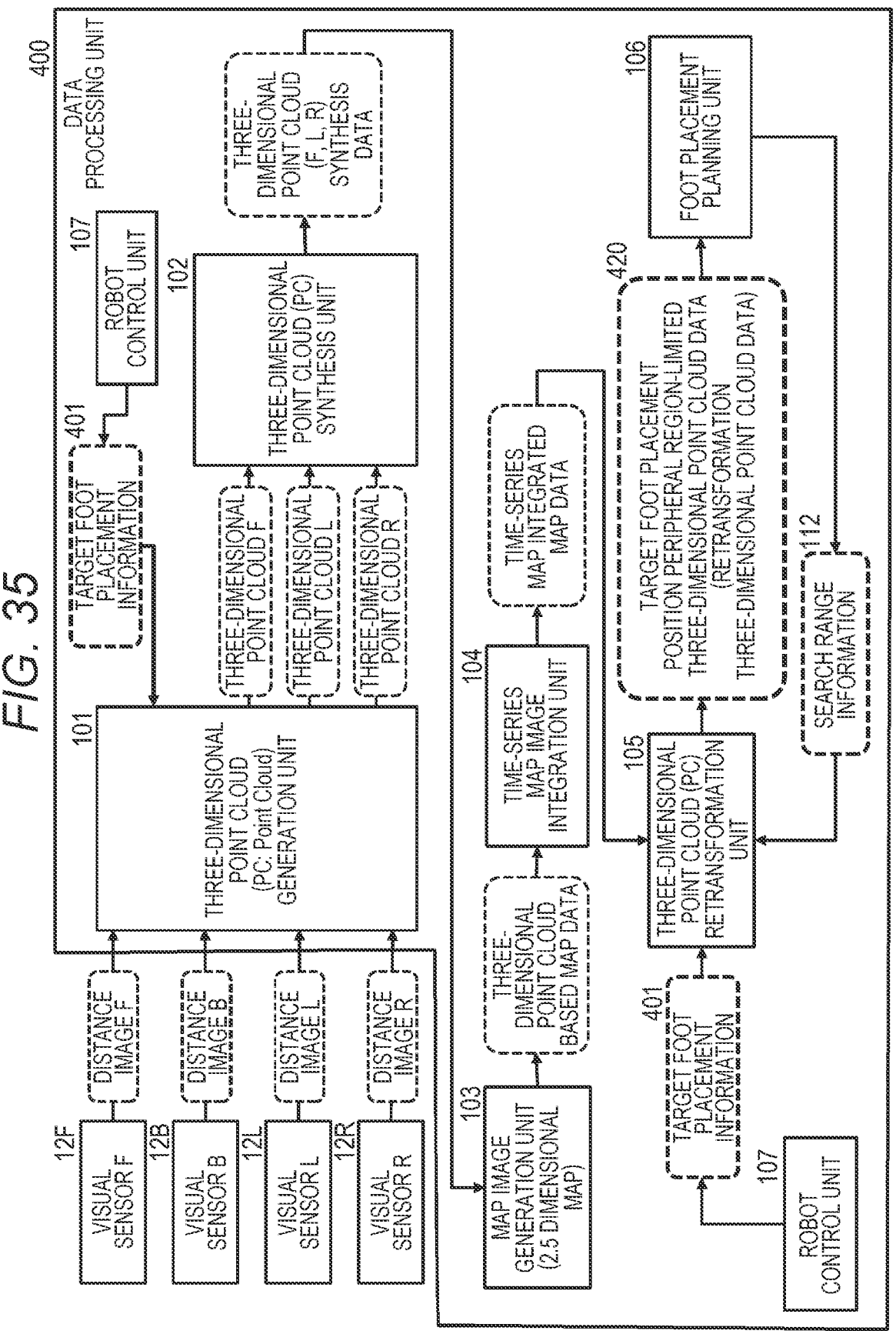
FIG. 35 is a diagram for explaining a configuration and processing of a moving apparatus according to a fifth embodiment of the present disclosure.

In the present fifth embodiment, as illustrated in FIG. 35, the target foot placement information 401 from the robot control unit 107 is input to the three-dimensional point cloud (PC) generation unit 101, and is also input to the three-dimensional point cloud (PC) retransformation unit 105.

The processing executed by the three-dimensional point cloud (PC) generation unit 101 in the moving apparatus of the present fifth embodiment is similar to that of the third embodiment described above.

That is, as described with reference to FIGS. 27 to 29, only the distance image including the foot placement position indicated by the target foot placement information 401 input from the robot control unit 107 is selected, the three-dimensional point cloud (PC) data is generated only for the selected distance image, and the three-dimensional point cloud (PC) data is output to the next-stage three-dimensional point cloud (PC) synthesis unit 102.

The output data is the three-dimensional point cloud F, the three-dimensional point cloud L, and the three-dimensional point cloud R illustrated in FIG. 35.

The processing units subsequent to the three-dimensional point cloud (PC) synthesis unit 102 execute processing for only data of the three-dimensional point cloud F, the three-dimensional point cloud L, and the three-dimensional point cloud R, or data generated from these pieces of point cloud data.

Figure 36:
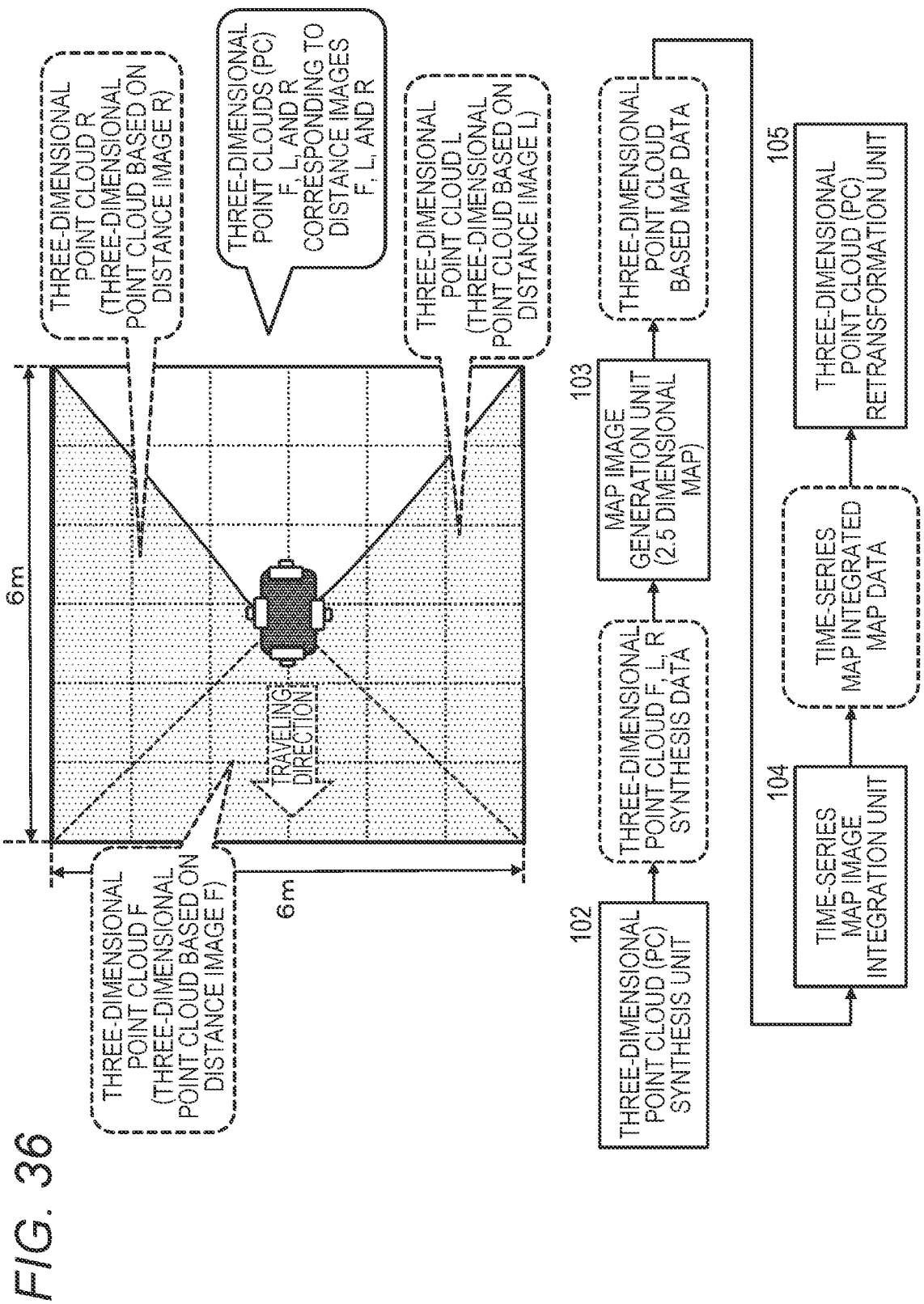
FIG. 36 is a diagram for explaining processing executed by the moving apparatus according to the fifth embodiment of the present disclosure.

As a result, as illustrated in FIG. 36, the three-dimensional point cloud (PC) synthesis unit 102 to the three-dimensional point cloud (PC) retransformation unit 105 perform only processing on data of the three-dimensional point cloud F, the three-dimensional point cloud L, and the three-dimensional point cloud R or data generated from these pieces of point cloud data.

Therefore, the processing load of the three-dimensional point cloud (PC) synthesis unit 102 to the three-dimensional point cloud (PC) retransformation unit 105 is reduced as compared with the case of performing processing for all the data of the three-dimensional point clouds F, L, R, and B or data generated from all the data of these point cloud data.

Note that the processing executed in the three-dimensional point cloud (PC) synthesis unit 102 to the time-series map image integration unit 104 is processing similar to the processing in the first embodiment except that the processing target data is only reduced.

Furthermore, the three-dimensional point cloud (PC) retransformation unit 105 illustrated in FIG. 35 inputs time-series map integrated map data generated from each point cloud data of the three-dimensional point cloud F, the three-dimensional point cloud L, and the three-dimensional point cloud R, generates "target foot placement position-inclusive image region-limited three-dimensional point cloud data 320", and outputs the generated data to the foot placement planning unit 106.

In the present fifth embodiment, the target foot placement information 401 is further input from the robot control unit 107 to the three-dimensional point cloud (PC) retransformation unit 105.

The three-dimensional point cloud (PC) retransformation unit 105 refers to the target foot placement information 401 input from the robot control unit 107, selects only a peripheral region of the target foot placement position, generates the target foot placement position peripheral region-limited three-dimensional point cloud data 420, and outputs the data to the foot placement planning unit 106.

Figure 37:
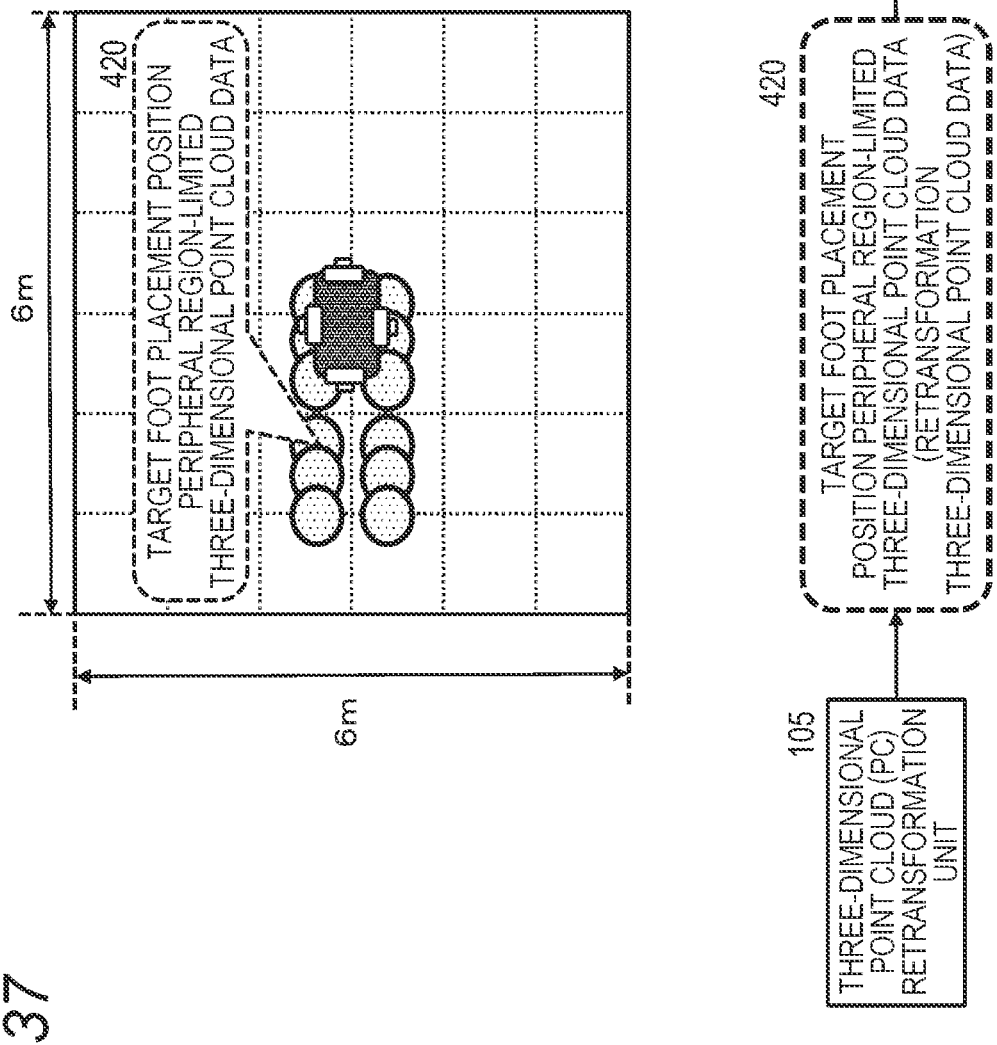
FIG. 37 is a diagram for explaining processing executed by the moving apparatus according to the fifth embodiment of the present disclosure.

That is, as illustrated in FIG. 37, the three-dimensional point cloud (PC) retransformation unit 105 selects only the peripheral region of the target foot placement position specified by the target foot placement information 401, generates the target foot placement position peripheral region-limited three-dimensional point cloud data 420, and outputs the data to the foot placement planning unit 106.

The foot placement planning unit 106 refers to "target foot placement position peripheral region-limited three-dimensional point cloud data 420" input from the three-dimensional point cloud (PC) retransformation unit 105 to determine the placement position of each foot of the four-legged robot 10. Specifically, for example, a position at which the robot can stably advance with less unevenness and inclination is determined as a foot placement position, and each foot is placed to advance the robot.

The data amount of the "target foot placement position peripheral region-limited three-dimensional point cloud data 420" is reduced as compared with the data of 1.5 million points of the 6 m×6 m rectangular region described above with reference to FIG. 6 and the target foot placement position-inclusive image region-limited three-dimensional point cloud data illustrated in FIG. 30 used in the third embodiment described above. As a result, the foot placement planning unit 106 can quickly determine the placement position of each foot of the four-legged robot 10.

8. Hardware Configuration Example of Moving Apparatus or the Like of the Present Disclosure Next, a hardware configuration example of the moving apparatus or the like of the present disclosure will be described.

Figure 38:
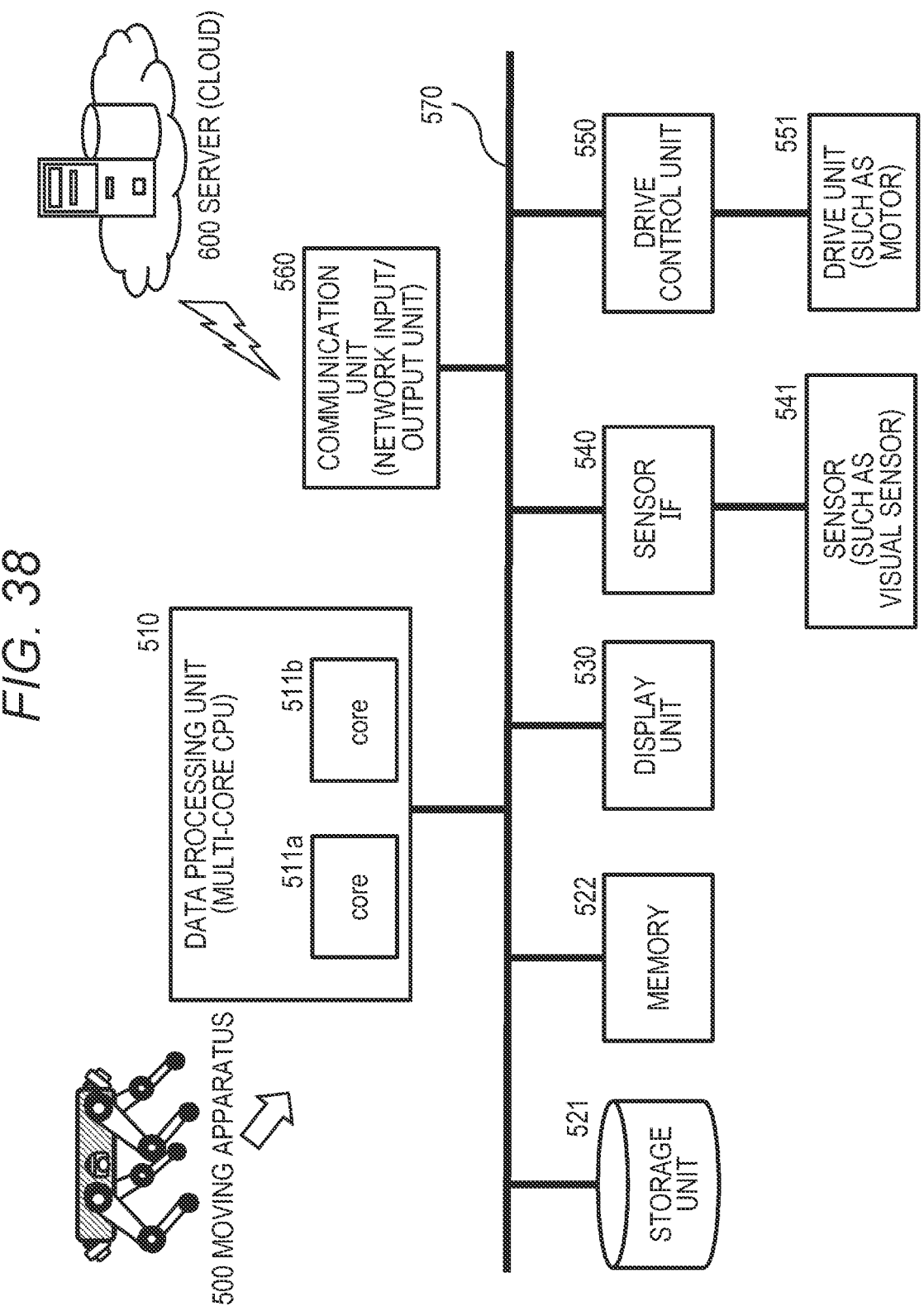
FIG. 38 is a diagram for explaining a hardware configuration example of the moving apparatus of the present disclosure.

FIG. 38 is a block diagram illustrating a configuration example of a moving apparatus 500 according to the present disclosure.

As illustrated in FIG. 38, the moving apparatus 500 includes a data processing unit 510, a storage unit 521, a memory 522, a display unit 530, a sensor IF 540, a sensor 541, a drive control unit 550, a drive unit 551, a communication unit 560, and a bus 570.

The data processing unit 310 is, for example, a multi-core CPU including a plurality of core CPUs 511a, b, and performs data processing according to each of the above-described embodiments and various other data processing according to a program stored in the storage unit 521 or the memory 522.

The storage unit 521 and the memory 522 store various information necessary for traveling, such as a program executed in the data processing unit 310 and travel route information of the moving apparatus 500.

Furthermore, the data processing unit 510 is also used as a storage area for sensor detection information acquired by the sensor 541 such as a visual sensor, for example, a distance image, and three-dimensional point cloud (PC) data generated in the data processing unit.

The display unit 530 is used, for example, as a display unit of various types of information indicating an operation state or the like of the moving apparatus 500 and a display unit of a captured image in the traveling direction. Furthermore, the touch panel may allow the user to input instruction data.

The sensor IF 540 receives detection information of the sensor 541 such as a visual sensor and outputs the detection information to the data processing unit 510. Alternatively, the sensor detection information is stored in the storage unit 521 or the memory 522.

The sensor 541 includes the visual sensor and the like described in the above-described embodiments. For example, the camera is a camera that captures a distance image or the like.

The drive control unit 550 controls the drive unit 551 including a motor or the like to operate and move the moving apparatus 500.

For example, the data processing unit 510 performs drive processing for arranging the foot at the foot placement position calculated according to the above-described embodiments or the like.

The communication unit 560 communicates with an external device, for example, a server 600 on the cloud side via a communication network. The server 600 notifies the moving apparatus 500 of a destination, route information for going to the destination, and the like.

The bus 570 is used as a data transfer path between the components.

Note that the server 600 is not an essential component, and may be configured to store a destination, route information for going to the destination, and the like in the moving apparatus 500 and perform processing by the moving apparatus 500 alone.

Furthermore, conversely, a configuration may be adopted in which the server 600 performs the data processing according to the above-described embodiments to determine the control information such as the placement position of the foot of the moving apparatus 500.

Figure 39:
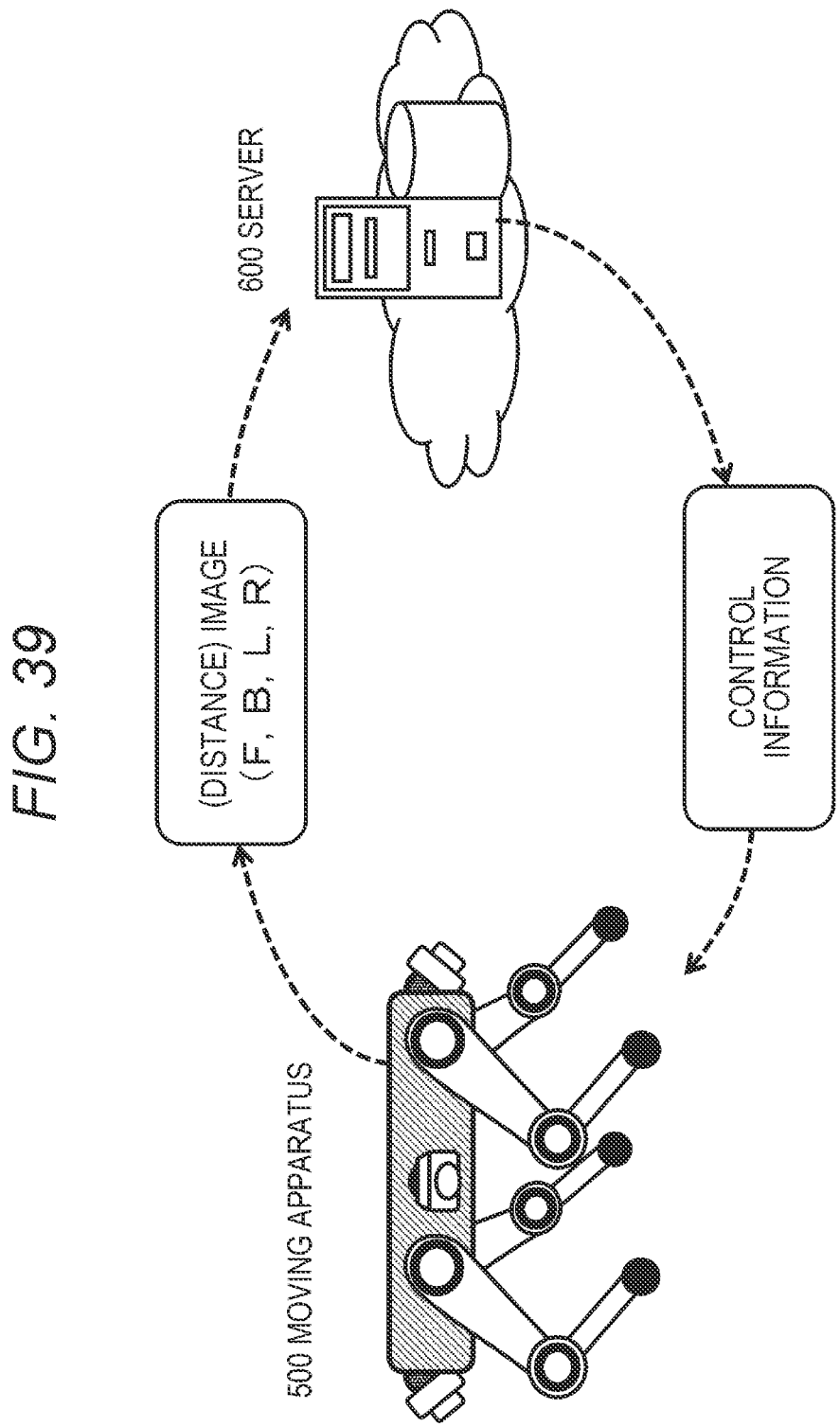
FIG. 39 is a diagram for explaining a system configuration example including the moving apparatus of the present disclosure and a server.

For example, as illustrated in FIG. 39, the moving apparatus 500 and the server 600 are connected by a communication network, and an image that is detection information of a visual sensor attached to the moving apparatus 500, specifically, for example, a distance image is transmitted to the server 600.

The server 600 receives an image from the moving apparatus 500, executes data processing according to the above-described embodiments, determines a placement position of a next foot of the moving apparatus 500, and the like, and transmits the determined information to the moving apparatus 500 as control information.

The moving apparatus 500 moves by driving a foot according to control information received from the server 600, for example, a placement position of the foot.

Note that the server 600 that performs data processing as described above has a hardware configuration as illustrated in FIG. 40, for example.

As illustrated in FIG. 40, the server 600 includes a data processing unit 610, a communication unit 621, a storage unit 622, a memory 623, a display unit 624, and a bus 630.

The data processing unit 610 is, for example, a multi-core CPU including a plurality of core CPUs 611a, b, and performs data processing according to each of the above-described embodiments and various other data processing according to a program stored in the storage unit 622 or the memory 623.

The communication unit 621 performs communication with the moving apparatus 500 via a communication network.

For example, sensor detection information, for example, a distance image, acquired by a visual sensor or the like of the moving apparatus 500 is received. In addition, the server 600 transmits control information such as foot placement position information generated according to the above-described embodiments to the moving apparatus 500. In addition, it is also used for a process of transmitting a destination, route information for going to the destination, and the like to the moving apparatus 500.

The storage unit 622 and the memory 623 store various information necessary for traveling, such as a program executed in the data processing unit 610 and travel route information of the moving apparatus 500.

In addition, the sensor detection information acquired by the visual sensor or the like of the moving apparatus 500, for example, the distance image is also used as a storage area of the reception data in a case where the sensor detection information is received via the communication unit 621. In addition, the data processing unit 610 is also used as a storage area for three-dimensional point cloud (PC) data generated by the data processing unit.

The display unit 624 is used, for example, as a display unit of various types of information indicating an operation state or the like of the moving apparatus 500 and a display unit of a captured image in the traveling direction. Furthermore, the touch panel may allow the user to input instruction data.

The bus 630 is used as a data transfer path between the components.

9. Summary of Configuration of Present Disclosure

As described above, the embodiments of the present disclosure have been described in detail with reference to particular embodiments. However, it is self-evident that a person skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) A moving apparatus including
   a data processing unit that analyzes detection information of a visual sensor and executes movement control of the moving apparatus,
   in which the data processing unit is configured to:
   generate traveling surface shape data that enables analysis of a shape of a traveling surface of the moving apparatus;
   execute region selection processing of selecting a generation target region of the traveling surface shape data on the basis of target movement route information of the moving apparatus;
   generate traveling surface shape data in a selection region selected in the region selection processing; and
   determine a movement route or a moving direction of the moving apparatus with reference to the traveling surface shape data generated.

(2) The moving apparatus according to (1),
   in which the data processing unit is configured to
   execute the region selection processing of selecting the generation target region of the traveling surface shape data on the basis of the target movement route information of the moving apparatus and a predetermined search range region.

(3) The moving apparatus according to (1) or (2), in which the traveling surface shape data is three-dimensional point cloud (PC) data.

(4) The moving apparatus according to any one of (1) to (3),
   in which the moving apparatus is
   a walking type moving apparatus that moves by driving a plurality of legs,
   the target movement route information is target foot placement information of the walking type moving apparatus, and
   the data processing unit is configured to
   execute the region selection processing of selecting the generation target region of the traveling surface shape data on the basis of the target foot placement information and a predetermined search range region.

(5) The moving apparatus according to (4),
in which the search range region is
a region centered on a target foot placement position included in the target foot placement information, and is a circular region having a predetermined radius or a rectangular region.

(6) The moving apparatus according to (5),
in which the target foot placement information includes target foot placement position information corresponding to a plurality of steps of each of a plurality of feet of the walking type moving apparatus, and
the data processing unit is configured to,
in the region selection processing,
select a plurality of circular regions or rectangular regions centered on the target foot placement position of each of the plurality of steps of each of the plurality of feet of the walking type moving apparatus as the generation target region of the traveling surface shape data.

(7) The moving apparatus according to (6),
in which the search range region is
a region centered on the target foot placement position included in the target foot placement information, and is
a circular region having a larger radius as a distance from a current position of the moving apparatus increases, or
a rectangular region having a larger area as the distance from the current position of the moving apparatus increases.

(8) The moving apparatus according to any one of (1) to (7),
in which the data processing unit includes:
a time-series map image integration unit that integrates a plurality of time-series map images generated using visual sensor input information at different timings to generate one piece of time-series map integrated map data; and
a three-dimensional point cloud (PC) retransformation unit that generates three-dimensional point cloud data on the basis of the one piece of time-series map integrated map data generated by the time-series map image integration unit,
the three-dimensional point cloud retransformation unit being configured to:
execute the region selection processing of selecting the generation target region of the traveling surface shape data on the basis of the target movement route information of the moving apparatus and a predetermined search range region; and
generate three-dimensional point cloud data as the traveling surface shape data in the selection region selected in the region selection processing.

(9) The moving apparatus according to (8),
in which the moving apparatus includes
a foot placement planning unit that determines a course of the moving apparatus on the basis of the three-dimensional point cloud data generated by the three-dimensional point cloud retransformation unit.

(10) The moving apparatus according to any one of (1) to (9),
in which the data processing unit includes:
a three-dimensional point cloud (PC) generation unit that inputs detection information of the visual sensor and generates three-dimensional point cloud data,
the three-dimensional point cloud generation unit being configured to:
execute the region selection processing of selecting the generation target region of the traveling surface shape data on the basis of the target movement route information of the moving apparatus; and
generate the three-dimensional point cloud data as the traveling surface shape data in the selection region selected in the region selection processing.

(11) The moving apparatus according to (10),
in which the three-dimensional point cloud generation unit is configured to
select a sensor acquisition image to be a generation target of the traveling surface shape data on the basis of the target movement route information of the moving apparatus.

(12) The moving apparatus according to (11),
in which the sensor acquisition image is a distance image, and
the three-dimensional point cloud generation unit is configured to
select a distance image to be a generation target of the three-dimensional point cloud data from a plurality of distance images that is input information of a plurality of visual sensors on the basis of the target movement route information.

(13) The moving apparatus according to (10),
in which the three-dimensional point cloud generation unit is configured to
select an image region in a sensor acquisition image to be a generation target of the traveling surface shape data on the basis of the target movement route information of the moving apparatus.

(14) The moving apparatus according to any one of (1) to (3),
in which the target movement route information includes target speed information of the moving apparatus, and
the data processing unit is configured to
select the generation target region of the traveling surface shape data on the basis of the target speed information.

(15) The moving apparatus according to (14),
in which the data processing unit is configured to
execute the region selection processing of selecting the generation target region of the traveling surface shape data on the basis of the target speed information of the moving apparatus and a predetermined search range region.

(16) The moving apparatus according to (15),
in which the moving apparatus is
a walking type moving apparatus that moves by driving a foot, a wheel driving type moving apparatus that moves by driving a wheel, or a leg wheel type moving apparatus that is a hybrid of a walking type and a wheel type, and
the data processing unit is configured to
execute the region selection processing of selecting the generation target region of the traveling surface shape data on the basis of the target speed information of the walking type moving apparatus, the wheel driving type moving apparatus, or the leg wheel type moving apparatus, and the predetermined search range region.

(17) The moving apparatus according to any one of (1) to (16),
in which the data processing unit includes:
a three-dimensional point cloud (PC) generation unit that generates an individual three-dimensional point cloud corresponding to each visual sensor on the basis of input information of a plurality of visual sensors;
a three-dimensional point cloud synthesis unit that synthesizes three-dimensional point cloud data corresponding to the visual sensor generated by the three-dimensional point cloud generation unit to generate three-dimensional point cloud synthesis data;
a map image generation unit that generates a map image based on the three-dimensional point cloud synthesis data generated by the three-dimensional point cloud synthesis unit;
a time-series map image integration unit that integrates a plurality of time-series map images generated by the map image generation unit using visual sensor input information at different timings to generate one piece of time-series map integrated map data;
a three-dimensional point cloud retransformation unit that regenerates three-dimensional point cloud data on the basis of the one piece of time-series map integrated map data generated by the time-series map image integration unit; and
a foot placement planning unit that determines a course of the moving apparatus on the basis of the three-dimensional point cloud data generated by the three-dimensional point cloud retransformation unit.

(18) The moving apparatus according to (17),
in which the three-dimensional point cloud retransformation unit is configured to
select a region for which the three-dimensional point cloud data is to be generated on the basis of the target movement route information, generate three-dimensional point cloud data corresponding to a selection region, and output the three-dimensional point cloud data generated corresponding to the selection region to the foot placement planning unit.

(19) A moving apparatus control method for executing movement control of a moving apparatus,
in which a data processing unit of the moving apparatus is configured to:
execute region selection processing of selecting a generation target region of traveling surface shape data that enables analysis of a shape of a traveling surface of the moving apparatus on the basis of target movement route information of the moving apparatus;
generate traveling surface shape data of a selection region using detection information of a visual sensor attached to the moving apparatus; and
determine a movement route or a moving direction of the moving apparatus with reference to the traveling surface shape data generated.

Note that a series of processes described in the specification can be executed by hardware, software, or a combined configuration of the both. In a case where processing by software is executed, a program in which a processing sequence is recorded can be installed and executed in a memory in a computer incorporated in dedicated hardware, or the program can be installed and executed in a general-purpose computer capable of executing various types of processing. For example, the program can be recorded in advance in a recording medium. In addition to being installed on a computer from a recording medium, the program can be received via a network such as a local area network (LAN) or the Internet and installed on a recording medium such as an internal hard disk or the like.

Furthermore, the various types of processing described in the specification are not only performed in time series according to the description, but may be performed in parallel or individually according to the processing capability of the apparatus that performs the processing or as necessary. Furthermore, in the present specification, a system is a logical set configuration of a plurality of devices, and is not limited to a system in which devices of configurations are in the same housing.

INDUSTRIAL APPLICABILITY

As described above, according to the configuration of one embodiment of the present disclosure, the traveling surface shape data of only the selection region selected on the basis of the target foot placement information of the moving apparatus and the search range region is generated and the foot placement position and the like of the moving apparatus are determined, so that the processing load is reduced and high-speed processing is enabled.

Specifically, for example, a data processing unit that analyzes detection information of a visual sensor and determines a movement route of the moving apparatus is provided, and the data processing unit generates traveling surface shape data such as three-dimensional point cloud (PC) data that enables analysis of a shape of a traveling surface of the moving apparatus. The data processing unit selects a generation target region of the traveling surface shape data on the basis of the target movement route information of the moving apparatus and a predetermined search range region, generates the traveling surface shape data in the selection region selected, and determines a movement route such as a foot placement position of the moving apparatus with reference to the generated traveling surface shape data.

With this configuration, the traveling surface shape data of only the selection region selected on the basis of the target foot placement information of the moving apparatus and the search range region is generated and the foot placement position and the like of the moving apparatus are determined, so that the processing load is reduced and high-speed processing is enabled.

REFERENCE SIGNS LIST

10 Four-legged robot
11 Main body portion
12 Visual sensor
13 Leg portion
14, 15 Joint portion
16 Ground contact portion
20 Two-legged robot
21 Main body portion
22 Visual sensor
23 Leg portion
24, 25 Joint portion
26 Ground contact portion
27 Arm portion
28, 29 Joint portion
30 Grip portion
100 Data processing unit
101 Three-dimensional point cloud (PC) generation unit
102 Three-dimensional point cloud (PC) synthesis unit 102
103 Map image generation unit
104 Time-series map image integration unit
105 Three-dimensional point cloud (PC) retransformation unit
106 Foot placement planning unit
107 Robot control unit
111 Target foot placement information
112 Search range information
120 Target foot placement region-limited three-dimensional point cloud data 151 Three-dimensional point cloud (PC) retransformation processing execution unit
152 Three-dimensional point cloud (PC) output region determination unit
153 Three-dimensional point cloud (PC) output region selection unit
161 Three-dimensional point cloud retransformation data
162 Three-dimensional point cloud output region selection information
171 Three-dimensional point cloud (PC) retransformation processing region determination unit
172 Three-dimensional point cloud (PC) retransformation processing execution unit
181 Retransformation processing region determination information
191 Three-dimensional point cloud (PC) retransformation & output region cutout processing execution unit
200 Data processing unit
201 Target speed information
202 Speed-corresponding search range information
220 Target speed-corresponding region-limited three-dimensional point cloud data
300 Data processing unit
301 Target foot placement information
320 Target foot placement position-inclusive image region-limited three-dimensional point cloud data
341 Three-dimensional point cloud (PC) generation target region selection unit
342 Processing target region selection processing & three-dimensional point cloud (PC) generation processing execution unit
350 Target foot placement position peripheral region-limited three-dimensional point cloud data
351 Three-dimensional point cloud (PC) generation target image region selection information
401 Target foot placement information
420 Target foot placement position peripheral region-limited three-dimensional point cloud data
500 Moving apparatus
510 Data processing unit
521 Storage unit
522 Memory
530 Display unit
540 Sensor IF
541 Sensor
550 Drive control unit
551 Drive unit
560 Communication unit
570 Bus
600 Server
610 Data processing unit
621 Communication unit
622 Storage unit
623 Memory
624 Display unit
630 Bus

The invention claimed is:

1. A moving apparatus, comprising:
a plurality of visual sensors configured to detect information; and
a central processing unit (CPU) configured to:
acquire the information of the plurality of visual sensors;
generate, based on the information of the plurality of visual sensors, a three-dimensional point cloud data corresponding to each visual sensor of the plurality of visual sensors;
synthesize the generated three-dimensional point cloud data corresponding to each visual sensor of the plurality of visual sensors to generate three-dimensional point cloud synthesis data;
generate a plurality of time-series map images based on the generated three-dimensional point cloud synthesis data and the information of the plurality of visual sensors at different timings;
integrate the generated plurality of time-series map images to generate a piece of time-series map integrated map data;
regenerate the three-dimensional point cloud data based on the generated piece of time-series map integrated map data;
generate, based on the regenerated three-dimensional point cloud data, traveling surface shape data that enables analysis of a shape of a traveling surface of the moving apparatus;
acquire target movement route information of the moving apparatus;
select, based on the acquired target movement route information of the moving apparatus, generation target region of the traveling surface shape data;
generate the traveling surface shape data in the selected generation target region;
determine one of a movement route or a moving direction of the moving apparatus with reference to the traveling surface shape data in the generation target region; and
control movement of the moving apparatus based on the determined one of the movement route or the moving direction of the moving apparatus.

2. The moving apparatus according to claim 1, wherein the CPU is further configured to select the generation target region of the traveling surface shape data based on the acquired target movement route information of the moving apparatus and a specific search range region.

3. The moving apparatus according to claim 1, wherein the moving apparatus is a walking type moving apparatus that moves by a plurality of legs,
the acquired target movement route information is target foot placement information of the walking type moving apparatus, and
the CPU is further configured to select the generation target region of the traveling surface shape data based on the target foot placement information and a specific search range region.

4. The moving apparatus according to claim 3, wherein the target foot placement information includes a target foot placement position,
the specific search range region is centered on the target foot placement position, and
the specific search range region is one of a circular region having a specific radius or a rectangular region having a specific area.

5. The moving apparatus according to claim 4, wherein the CPU is further configured to select one of a plurality of circular regions or a plurality of rectangular regions centered on the target foot placement position of each of a plurality of steps of each of a plurality of feet of the walking type moving apparatus as the generation target region of the traveling surface shape data,
the plurality of circular regions includes the circular region, and
the plurality of rectangular regions includes the rectangular region.

6. The moving apparatus according to claim 5, wherein
the specific radius of the circular region increases as a distance increases from a current position of the moving apparatus, and
the specific area of the rectangular region increases as the distance increases from the current position of the moving apparatus.

7. The moving apparatus according to claim 1, wherein the CPU is further configured to determine a course of the moving apparatus based on the regenerated three-dimensional point cloud data.

8. The moving apparatus according to claim 1, wherein
the CPU is further configured to select a sensor acquisition image based on the acquired target movement route information of the moving apparatus, and
the sensor acquisition image corresponds to a generation target of the traveling surface shape data.

9. The moving apparatus according to claim 8, wherein
the acquired information of the plurality of visual sensors corresponds to a plurality of distance images,
the CPU is further configured to select a distance image from the plurality of distance images based on the acquired target movement route information of the moving apparatus, and
the distance image corresponds to a generation target of the generated three-dimensional point cloud data.

10. The moving apparatus according to claim 1, wherein
the CPU is further configured to select an image region in a sensor acquisition image based on the acquired target movement route information of the moving apparatus, and
the sensor acquisition image corresponds to a generation target of the traveling surface shape data.

11. The moving apparatus according to claim 1, wherein
the acquired target movement route information includes target speed information of the moving apparatus, and
the CPU is further configured to select the generation target region of the traveling surface shape data based on the target speed information.

12. The moving apparatus according to claim 11, wherein the CPU is further configured to select the generation target region of the traveling surface shape data based on the target speed information of the moving apparatus and a specific search range region.

13. The moving apparatus according to claim 12, wherein
the moving apparatus is one of a walking type moving apparatus that moves by a foot, a wheel driving type moving apparatus that moves by a wheel, or a leg wheel type moving apparatus that is a hybrid of the walking type moving apparatus and the wheel driving type moving apparatus, and
the CPU is further configured to select the generation target region of the traveling surface shape data based on the target speed information of one of the walking type moving apparatus, the wheel driving type moving apparatus, or the leg wheel type moving apparatus, and the specific search range region.

14. The moving apparatus according to claim 1, wherein the CPU is further configured to:
select a region for the generated three-dimensional point cloud data based on the acquired target movement route information,
generate the three-dimensional point cloud data corresponding to the selected region.

15. A moving apparatus control method, comprising:
in a moving apparatus that includes a plurality of visual sensors and a central processing unit (CPU):
detecting information by the plurality of visual sensors;
acquiring, by the CPU, the information of the plurality of visual sensors;
generating, by the CPU, based on the information of the plurality of visual sensors, a three-dimensional point cloud data corresponding to each visual sensor of the plurality of visual sensors;
synthesizing, by the CPU, the generated three-dimensional point cloud data corresponding to each visual sensor of the plurality of visual sensors to generate three-dimensional point cloud synthesis data;
generating, by the CPU, a plurality of time-series map images based on the generated three-dimensional point cloud synthesis data and the information of the plurality of visual sensors at different timings;
integrating, by the CPU, the generated plurality of time-series map images to generate a piece of time-series map integrated map data;
regenerating, by the CPU, the three-dimensional point cloud data based on the generated piece of time-series map integrated map data;
generating, by the CPU, based on the regenerated three-dimensional point cloud data, traveling surface shape data that enables analysis of a shape of a traveling surface of the moving apparatus;
acquiring, by the CPU, target movement route information of the moving apparatus;
selecting, by the CPU, based on the acquired target movement route information of the moving apparatus, a generation target region of the traveling surface shape data;
generating, by the CPU, the traveling surface shape data in the selected generation target region;
determining, by the CPU, one of a movement route or a moving direction of the moving apparatus with reference to the traveling surface shape data in the generation target region; and
controlling, by the CPU, movement of the moving apparatus based on the determined one of the movement route or the moving direction of the moving apparatus.

* * * * *